(12) United States Patent
Allam et al.

(10) Patent No.: US 8,596,075 B2
(45) Date of Patent: Dec. 3, 2013

(54) SYSTEM AND METHOD FOR HIGH EFFICIENCY POWER GENERATION USING A CARBON DIOXIDE CIRCULATING WORKING FLUID

(75) Inventors: Rodney John Allam, Wiltshire (GB); Miles Palmer, Chapel Hill, NC (US); Glenn William Brown, Jr., Durham, NC (US)

(73) Assignees: Palmer Labs, LLC, Durham, NC (US); 8 Rivers Capital, LLC, Durham, NC (US)

( * ) Notice: Subject to any disclaimer, the term of this patent is extended or adjusted under 35 U.S.C. 154(b) by 0 days.

(21) Appl. No.: 12/872,777

(22) Filed: Aug. 31, 2010

(65) Prior Publication Data

US 2011/0179799 A1  Jul. 28, 2011

Related U.S. Application Data

(63) Continuation-in-part of application No. 12/714,074, filed on Feb. 26, 2010.

(60) Provisional application No. 61/299,272, filed on Jan. 28, 2010, provisional application No. 61/155,755, filed on Feb. 26, 2009.

(51) Int. Cl.
  *F02C 1/00* (2006.01)
  *F02C 7/08* (2006.01)

(52) U.S. Cl.
  USPC ............................. 60/772; 60/39.5; 60/39.52

(58) Field of Classification Search
  USPC .......... 60/39.12, 39.182, 39.464, 39.47, 39.5, 60/39.52, 734, 737, 753, 754, 772, 783, 60/805
  See application file for complete search history.

(56) References Cited

U.S. PATENT DOCUMENTS

| | | |
|---|---|---|
| 3,376,706 A | 4/1968 | Angelino |
| 3,503,208 A | 3/1970 | Schmidt |
| 3,736,745 A | 6/1973 | Karig |
| 3,837,788 A | 9/1974 | Craig et al. |
| 3,971,211 A | 7/1976 | Wethe et al. |
| 3,976,443 A | 8/1976 | Paull et al. |

(Continued)

FOREIGN PATENT DOCUMENTS

JP  2225905  9/1990

OTHER PUBLICATIONS

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

(Continued)

*Primary Examiner* — Ehud Gartenberg
*Assistant Examiner* — Arun Goyal
(74) *Attorney, Agent, or Firm* — Womble Carlyle Sandridge & Rice, LLP

(57) ABSTRACT

The present invention provides methods and system for power generation using a high efficiency combustor in combination with a $CO_2$ circulating fluid. The methods and systems advantageously can make use of a low pressure ratio power turbine and an economizer heat exchanger in specific embodiments. Additional low grade heat from an external source can be used to provide part of an amount of heat needed for heating the recycle $CO_2$ circulating fluid. Fuel derived $CO_2$ can be captured and delivered at pipeline pressure. Other impurities can be captured.

72 Claims, 12 Drawing Sheets

(56) References Cited

U.S. PATENT DOCUMENTS

| | | |
|---|---|---|
| 4,154,581 A | 5/1979 | Nack et al. |
| 4,191,500 A | 3/1980 | Oberg et al. |
| 4,193,259 A | 3/1980 | Muenger et al. |
| 4,206,610 A | 6/1980 | Santhanam |
| 4,461,154 A | 7/1984 | Allam |
| 4,498,289 A | 2/1985 | Osgerby |
| 4,522,628 A | 6/1985 | Savins |
| 4,602,483 A | 7/1986 | Wilks et al. |
| 4,702,747 A | 10/1987 | Meyer et al. |
| 4,721,420 A | 1/1988 | Santhanam et al. |
| 4,765,143 A | 8/1988 | Crawford et al. |
| 4,765,781 A | 8/1988 | Wilks et al. |
| 4,839,030 A | 6/1989 | Comolli et al. |
| 4,852,996 A | 8/1989 | Knop et al. |
| 4,881,366 A | 11/1989 | Nurse |
| 4,999,992 A | 3/1991 | Nurse |
| 4,999,995 A | 3/1991 | Nurse |
| 5,175,995 A | 1/1993 | Pak et al. |
| 5,247,791 A | 9/1993 | Pak et al. |
| 5,265,410 A | 11/1993 | Hisatome |
| 5,353,721 A * | 10/1994 | Mansour et al. ............. 110/345 |
| 5,520,894 A | 5/1996 | Heesink et al. |
| 5,590,519 A | 1/1997 | Almlöf et al. |
| 5,595,059 A | 1/1997 | Huber et al. |
| 5,692,890 A | 12/1997 | Graville |
| 5,709,077 A | 1/1998 | Beichel |
| 5,715,673 A | 2/1998 | Beichel |
| 5,724,805 A | 3/1998 | Golomb et al. |
| 5,802,840 A | 9/1998 | Wolf |
| 5,906,806 A | 5/1999 | Clark |
| 5,937,652 A | 8/1999 | Abdelmalek |
| 6,024,029 A | 2/2000 | Clark |
| 6,117,916 A | 9/2000 | Allam et al. |
| 6,148,602 A | 11/2000 | Demetri |
| 6,170,264 B1 | 1/2001 | Viteri et al. |
| 6,196,000 B1 | 3/2001 | Fassbender |
| 6,199,364 B1 * | 3/2001 | Kendall et al. ................. 60/776 |
| 6,202,574 B1 | 3/2001 | Liljedahl et al. |
| 6,209,307 B1 | 4/2001 | Hartman |
| 6,260,348 B1 | 7/2001 | Sugishita et al. |
| 6,263,661 B1 | 7/2001 | Van der Burgt et al. |
| 6,269,624 B1 | 8/2001 | Frutschi et al. |
| 6,298,664 B1 | 10/2001 | Åsen et al. |
| 6,333,015 B1 | 12/2001 | Lewis |
| 6,360,561 B2 | 3/2002 | Allam et al. |
| 6,389,814 B2 | 5/2002 | Viteri et al. |
| 6,430,916 B2 | 8/2002 | Sugishita et al. |
| 6,532,745 B1 | 3/2003 | Neary |
| 6,536,205 B2 | 3/2003 | Sugishita et al. |
| 6,543,214 B2 | 4/2003 | Sasaki et al. |
| 6,550,234 B2 | 4/2003 | Guillard |
| 6,598,398 B2 | 7/2003 | Viteri et al. |
| 6,612,113 B2 | 9/2003 | Guillard |
| 6,622,470 B2 | 9/2003 | Viteri et al. |
| 6,629,414 B2 | 10/2003 | Fischer |
| 6,637,183 B2 | 10/2003 | Viteri et al. |
| 6,684,643 B2 | 2/2004 | Frutschi |
| 6,764,530 B2 | 7/2004 | Iijima |
| 6,775,987 B2 | 8/2004 | Sprouse et al. |
| 6,802,178 B2 | 10/2004 | Sprouse et al. |
| 6,820,689 B2 | 11/2004 | Sarada |
| 6,824,710 B2 | 11/2004 | Viteri et al. |
| 6,871,502 B2 | 3/2005 | Marin et al. |
| 6,877,319 B2 | 4/2005 | Linder et al. |
| 6,877,322 B2 | 4/2005 | Fan |
| 6,898,936 B1 | 5/2005 | Ochs et al. |
| 6,910,335 B2 | 6/2005 | Viteri et al. |
| 6,918,253 B2 | 7/2005 | Fassbender |
| 6,945,029 B2 | 9/2005 | Viteri |
| 6,993,912 B2 | 2/2006 | Fischer |
| 7,007,474 B1 | 3/2006 | Ochs et al. |
| 7,007,486 B2 | 3/2006 | Sprouse et al. |
| 7,021,063 B2 | 4/2006 | Viteri |
| 7,022,168 B2 | 4/2006 | Schimkat et al. |
| 7,043,920 B2 | 5/2006 | Viteri et al. |
| 7,074,033 B2 | 7/2006 | Neary |
| 7,111,463 B2 | 9/2006 | Sprouse et al. |
| 7,124,589 B2 | 10/2006 | Neary |
| 7,147,461 B2 | 12/2006 | Neary |
| 7,191,587 B2 * | 3/2007 | Marin et al. ................. 60/39.17 |
| 7,192,569 B2 | 3/2007 | Stewart |
| 7,284,362 B2 | 10/2007 | Marin et al. |
| 7,299,637 B2 | 11/2007 | Becker |
| 7,303,597 B2 | 12/2007 | Sprouse et al. |
| 7,328,581 B2 | 2/2008 | Christensen et al. |
| 7,334,631 B2 | 2/2008 | Kato et al. |
| 7,360,639 B2 | 4/2008 | Sprouse et al. |
| 7,377,111 B2 | 5/2008 | Agnew |
| 7,387,197 B2 | 6/2008 | Sprouse et al. |
| 7,402,188 B2 | 7/2008 | Sprouse |
| 7,469,544 B2 | 12/2008 | Farhangi |
| 7,469,781 B2 | 12/2008 | Chataing et al. |
| 7,516,607 B2 | 4/2009 | Farhangi et al. |
| 7,516,609 B2 | 4/2009 | Agnew |
| 7,547,419 B2 | 6/2009 | Sprouse et al. |
| 7,547,423 B2 | 6/2009 | Sprouse et al. |
| 7,553,463 B2 | 6/2009 | Zauderer |
| 7,615,198 B2 | 11/2009 | Sprouse et al. |
| 7,717,046 B2 | 5/2010 | Sprouse et al. |
| 7,722,690 B2 | 5/2010 | Shires et al. |
| 7,731,783 B2 | 6/2010 | Sprouse et al. |
| 7,740,671 B2 | 6/2010 | Yows et al. |
| 7,740,672 B2 | 6/2010 | Sprouse |
| 7,814,975 B2 | 10/2010 | Hagen et al. |
| 7,826,054 B2 | 11/2010 | Zillmer et al. |
| 7,927,574 B2 | 4/2011 | Stewart |
| 2002/0121092 A1 | 9/2002 | Allam et al. |
| 2003/0131582 A1 | 7/2003 | Anderson et al. |
| 2004/0011057 A1 | 1/2004 | Huber |
| 2004/0123601 A1 | 7/2004 | Fan |
| 2005/0126156 A1 | 6/2005 | Anderson et al. |
| 2006/0242907 A1 | 11/2006 | Sprouse et al. |
| 2007/0122328 A1 | 5/2007 | Allam et al. |
| 2007/0180768 A1 * | 8/2007 | Briesch et al. .............. 48/197 R |
| 2007/0274876 A1 | 11/2007 | Chiu et al. |
| 2008/0010967 A1 | 1/2008 | Griffin et al. |
| 2008/0104958 A1 | 5/2008 | Finkenrath et al. |
| 2008/0115500 A1 | 5/2008 | MacAdam et al. |
| 2008/0166672 A1 | 7/2008 | Schlote et al. |
| 2008/0173584 A1 | 7/2008 | White et al. |
| 2008/0173585 A1 | 7/2008 | White et al. |
| 2008/0176174 A1 | 7/2008 | White et al. |
| 2008/0187877 A1 | 8/2008 | Fitzsimmons et al. |
| 2008/0190214 A1 | 8/2008 | Ubowski et al. |
| 2008/0226515 A1 | 9/2008 | Allam et al. |
| 2008/0309087 A1 | 12/2008 | Evulet et al. |
| 2009/0061264 A1 | 3/2009 | Agnew |
| 2009/0229271 A1 | 9/2009 | De Ruyck et al. |
| 2009/0301054 A1 | 12/2009 | Simpson et al. |
| 2010/0018218 A1 | 1/2010 | Riley et al. |
| 2010/0024378 A1 | 2/2010 | Ackermann et al. |
| 2010/0024381 A1 | 2/2010 | Ackermann et al. |
| 2010/0024433 A1 | 2/2010 | Ackermann et al. |
| 2010/0031668 A1 | 2/2010 | Kepplinger |
| 2010/0077752 A1 | 4/2010 | Papile |
| 2010/0263385 A1 | 10/2010 | Allam |
| 2011/0023539 A1 | 2/2011 | White et al. |
| 2011/0036011 A1 | 2/2011 | Sprouse et al. |
| 2011/0271713 A1 | 11/2011 | White et al. |

OTHER PUBLICATIONS

E.I. Yantovskii et al., "Computer Exergonomics of Power Plants Without Exhaust Gases," Energy Convers. Mgmt., Publ. 1992, vol. 33, No. 5-8, pp. 405-412.

Mathieu et al., "Sensitivity Analysis of the MATIANT Cycle", Energy Conversion & Management, 1999, pp. 1687-1700, vol. 40.

Combs, Jr. "An Investigation of the Supercritical CO2 Cycle (Feher Cycle) for Shipboard Application," 1977, *Submitted in Partial Fulfillment of the Requirements for the Degree of Ocean Engineer and the Degree of Master of Science in Mechanical Engineering at the Massachusetts Institute of Technology*, 148 pages.

(56) References Cited

OTHER PUBLICATIONS

Dostal et al., "A Supercritical Carbon Dioxide Cycle for Next Generation Nuclear Reactors," 2004, (*Research Paper*) *Advanced Nuclear Power Technology Program at MIT*, 326 pages.

Iantovski et al., "Highly Efficient Zero Emission CO2-Based Power Plant" *Energy Convers. Mgmt*, 1997, Suppl. pp. S141-S146, vol. 38.

Wall et al., "A Zero Emission Combustion Power Plant For Enhanced Oil Recovery," *Energy*, 1995, pp. 823-828, vol. 20, No. 8.

\* cited by examiner

SYSTEM AND METHOD FOR HIGH EFFICIENCY POWER GENERATION USING A CARBON DIOXIDE CIRCULATING WORKING FLUID

CROSS-REFERENCE TO RELATED APPLICATIONS

The present patent application claims priority to U.S. Provisional Patent Application No. 61/299,272, filed Jan. 28, 2010, and is a continuation-in-part U.S. patent application Ser. No. 12/714,074, filed Feb. 26, 2010, which claims priority to U.S. Provisional Patent Application No. 61/155,755, filed Feb. 26, 2009, the disclosures of which are incorporated herein by reference in their entirety.

FIELD OF THE INVENTION

The present invention is directed to systems and methods for generation of power, such as electricity, through use of a circulating fluid to transfer energy generated through high efficiency combustion of a fuel. Particularly, the system and method can use carbon dioxide as the circulating fluid.

BACKGROUND OF THE INVENTION

It is estimated that fossil fuels will continue to provide the bulk of the world's electric power requirements for the next 100 years while non-carbon power sources are developed and deployed. Known methods of power generation through combustion of fossil fuels and/or suitable biomass, however, are plagued by rising energy costs and an increasing production of carbon dioxide ($CO_2$) and other emissions. Global warming is increasingly seen as a potentially catastrophic consequence of increased carbon emissions by the developed and developing nations. Solar and wind power do not appear capable of replacing fossil fuel combustion in the near term, and nuclear power has dangers associated with both proliferation and nuclear waste disposal.

Conventional means of power production from fossil fuels or suitable biomass now are increasingly being burdened with a requirement for $CO_2$ capture at high pressure for delivery to sequestration sites. This requirement is proving difficult to fulfill, however, since present technology only provides for very low thermal efficiencies for even the best designs for $CO_2$ capture. Moreover, capital costs for achieving $CO_2$ capture are high, and this results in significantly higher electricity costs compared to systems that emit $CO_2$ into the atmosphere. Accordingly, there is an ever growing need in the art for systems and methods for high efficiency power generation allowing for a reduction in $CO_2$ emission and/or improved ease of sequestration of produced $CO_2$.

SUMMARY OF THE INVENTION

The present invention provides methods and system for power generation using a high efficiency combustor (e.g., a transpiration cooled combustor) in combination with a circulating fluid (e.g., a $CO_2$ circulating fluid). In particular, the circulating fluid can be introduced into the combustor along with a fuel and an oxidant for combustion such that a high pressure, high temperature fluid stream is produced comprising the circulating fluid and any combustion products. The fluid stream can be introduced into a power generation device, such as a turbine. Advantageously, the fluid stream can be maintained at a relatively high pressure during expansion in the turbine such that the pressure ratio across the turbine (i.e., the ratio of the pressure at the turbine inlet and the pressure at the turbine outlet) is less than about 12. The fluid stream can then be further processed for separation of the components of the fluid stream, which can include passing the fluid stream through a heat exchanger. In particular, the circulating fluid (at least a portion of which may be recycled from the fluid stream) can be passed through the same heat exchanger to heat the circulating fluid prior to introduction into the combustor. In such embodiments, it may be useful to operate the heat exchanger (e.g., through selection of a low grade heat source) such that heat exchanger has only a small temperature difference between the turbine exhaust and the recycle fluid at the hot end of the heat exchanger.

In certain aspects, the invention provides power production systems that can produce power at high efficiency with low capital cost and also can produce substantially pure $CO_2$ at pipeline pressure for sequestration. The $CO_2$ also may be recycled into the power production system.

The inventive systems and methods are characterized by the ability to use a wide variety of fuel sources. For example, the high efficiency combustor used according to the invention can make use of gaseous (e.g., natural gas or coal derived gases), liquid (e.g., hydrocarbons, bitumen) and solid (e.g., coal, lignite, pet-coke) fuels. Even further fuels, as otherwise described herein, could be used.

In other aspects, the methods and systems of the invention are particularly useful in that they can exceed the best efficiency of current coal fired power stations that do not provide for the capture of $CO_2$. Such current power stations can provide, at best, about 45% efficiency (lower heating value, or "LHV") with 1.7 inches mercury condenser pressure using a bituminous coal. The present system can exceed such efficiency while also delivering $CO_2$ for sequestration or other disposal at required pressures.

In still another aspect, the present invention provides the ability to reduce the physical size and capital cost of a power generation system compared to current technologies using a similar fuel. Thus, the methods and systems of the present invention can significantly reduce construction costs associated with power production systems.

Still further, the methods and systems of the present invention can provide for the recovery of virtually 100% of the $CO_2$ used and/or produced, especially $CO_2$ derived from carbon present in the fuel. Particularly, the $CO_2$ can be provided as a dried, purified gas at pipeline pressure. Moreover, the invention provides the ability to separately recover other fuel and combustion derived impurities for other use and/or disposal.

In one particular aspect, the present invention is directed to a method of power generation incorporating the use of a circulating fluid, such as $CO_2$. In specific embodiments, a method of power generation according to the invention can comprise introducing a carbon containing fuel, $O_2$, and a $CO_2$ circulating fluid into a transpiration cooled combustor. Specifically, the $CO_2$ can be introduced at a pressure of at least about 8 MPa (preferably at least about 12 MPa) and a temperature of at least about 200° C. (preferably at least about 400° C.). The method further can comprise combusting the fuel to provide a combustion product stream comprising $CO_2$. Particularly, the combustion product stream can have a temperature of at least about 800° C. Further, the method can comprise expanding the combustion product stream across a turbine to generate power, the turbine having an inlet for receiving the combustion product stream and an outlet for release of a turbine discharge stream comprising $CO_2$. Preferably, the pressure ratio of the combustion product stream at the inlet compared to the turbine discharge stream at the outlet can be less than about 12. In specific embodiments, it can be desirable for the $CO_2$ to be introduced into the combustor at a pressure of at least about 10 MPa, a pressure of at least about 20 MPa, a temperature of at least about 400° C., or a temperature of at least about 700° C. Even further possible processing parameters are described herein.

In some embodiments, the $CO_2$ circulating fluid can be introduced to the transpiration cooled combustor as a mixture with one or both of the $O_2$ and the carbon containing fuel. In other embodiments, the $CO_2$ circulating fluid can be introduced to the transpiration cooled combustor as all or part of a transpiration cooling fluid directed through one or more transpiration fluid supply passages formed in the transpiration cooled combustor. In specific embodiments, the $CO_2$ circulating fluid can be directed into the combustor only as the transpiration fluid.

The combustion may be characterized specifically by the actual combustion temperature. For example, combusting can be carried out at a temperature of at least about 1,500° C. In other embodiments, combusting can be carried out at a temperature of about 1,600° C. to about 3,300° C.

The invention also may be characterized by the purity of the $O_2$ in the $O_2$ stream. For example, in some embodiments, ambient air may be useful. In specific embodiments, however, it can be beneficial to purify the oxygen content. For example, the $O_2$ can be provided as a stream wherein the molar concentration of the $O_2$ is at least 85%. Even further specific concentrations are described herein.

In specific embodiments, the combustion product stream can have a temperature of at least about 1,000° C. Moreover, the combustion product stream can have a pressure that is at least about 90% of the pressure of the $CO_2$ introduced into the combustor or is at least about 95% of the pressure of the $CO_2$ introduced into the combustor.

In some embodiments, the pressure ratio of the combustion product stream at the inlet of the turbine compared to the turbine discharge stream at the outlet of the turbine can be about 1.5 to about 10 or can be about 2 to about 8. Even further possible ratios are provided herein.

The invention may be characterized by the ratio of the specific materials introduced into the combustion chamber. For example, the ratio of $CO_2$ in the $CO_2$ circulating fluid to carbon in the fuel introduced to the combustor, on a molar basis, can be about 10 to about 50 or can be about 10 to about 30. Even further possible ratios are provided herein.

The invention further may be characterized in that at least a portion of the $CO_2$ in the turbine discharge stream can be recycled and reintroduced into the combustor. At least a portion of the $CO_2$ may be discharged from the system (such as for sequestration or other disposal), for example through a pipeline.

In specific embodiments, the $CO_2$ in the turbine discharge stream can be in a gaseous state. Particularly, the turbine discharge stream can have a pressure of less than or equal to 7 MPa.

In other embodiments, the inventive methods further can comprise passing the turbine discharge stream through at least one heat exchanger that cools the turbine discharge stream and provides a $CO_2$ circulating fluid stream having a temperature of less than about 200° C. This can be useful for providing the $CO_2$ circulating fluid stream under conditions that can facilitate removal of one or more secondary components (i.e., components other than $CO_2$). In specific embodiments, this can comprise passing the turbine discharge stream through a series of at least two heat exchangers. More specifically, the first heat exchanger in the series can receive the turbine discharge stream and reduce the temperature thereof, the first heat exchanger being formed of a high temperature alloy that withstands a temperature of at least about 900° C.

The inventive methods also can comprise performing one or more separation steps on the $CO_2$ circulating fluid stream to remove one or more secondary components that are present in the circulating fluid stream in addition to $CO_2$, as noted above. Specifically, the one or more secondary components may comprise water.

The inventive methods also may comprise pressurizing a $CO_2$ stream. For example, after expanding of the combustion product stream and cooling of the turbine discharge stream, it can be beneficial to pressurize the stream for recycle back to the combustor. Specifically, the methods can comprise passing the $CO_2$ circulating fluid stream through one or more compressors (e.g., pumps) to pressurize the $CO_2$ circulating fluid stream to a pressure of at least about 8 MPa. This further may comprise passing the $CO_2$ circulating fluid stream through a series of at least two compressors to pressurize the $CO_2$ circulating fluid stream. In certain embodiments, the $CO_2$ circulating fluid stream can be pressurized to a pressure of at least about 15 MPa. Even further pressure ranges may be desirable, as otherwise described herein. In other embodiments, the pressurized $CO_2$ circulating fluid stream specifically can be provided in a supercritical fluid state. In some embodiments, at least a portion of the $CO_2$ in the pressurized $CO_2$ circulating fluid stream can be introduced into a pressurized pipeline for sequestration (or other disposal, as already noted above).

In addition to pressurizing, the inventive methods also can comprise heating the previously cooled $CO_2$ circulating fluid stream for introduction back into the combustor (i.e., recycling of the $CO_2$ circulating fluid stream). In some embodiments, this can comprise heating the pressurized $CO_2$ circulating fluid stream to a temperature of at least about 200° C., at least about 400° C., or at least about 700° C. In certain embodiments, the pressurized $CO_2$ circulating fluid stream can be heated to a temperature that is less than the temperature of the turbine discharge stream by no more than about 50° C. Even further possible temperature ranges are provided herein. Specifically, such heating can comprise passing the pressurized $CO_2$ circulating fluid stream through the same heat exchanger(s) used to cool the turbine discharge stream. Such heating also can comprise input of heat from an external source (i.e., other than heat re-captured from the heat exchangers). In specific embodiments, heating can comprise the use of heat withdrawn from an $O_2$ separation unit. Preferably, this additional heat is introduced at the cold end of the heat exchanger unit (or, when a series of heat exchangers is used, prior to the heat exchanger in the series working over the highest temperature range).

In certain embodiments, the invention can be characterized by nature of the combustion product stream, which can allow for the optional implementation of multiple turbines. For example, in some embodiments, the combustion product stream can be a reducing fluid comprising one or more combustible components (e.g., components selected from the group consisting of $H_2$, $CO$, $CH_4$, $H_2S$, $NH_3$, and combinations thereof). This may be controlled by the ratio of $O_2$ to fuel used. In some embodiments, the combustion product stream steam may contain fully oxidized components, such as $CO_2$, $H_2O$, and $SO_2$, as well as the reduced components listed above. The actual composition achieved can depend on the ratio of $O_2$ to fuel used in the feed to the transpiration combustor. More specifically, the turbine used in such embodiments can comprise two or more units each having an inlet and an outlet. In specific embodiments, the turbine units can be operated such that the operating temperature at the inlet of each unit is substantially the same. This can comprise adding an amount of $O_2$ to the fluid stream at the outlet of the first turbine unit (or the preceding turbine unit where three or more units are used). Provision of the $O_2$ can allow for combustion of the one or more combustible components described above, which raises the temperature of the stream prior to entry to the next turbine in the series. This results in the ability to maximize the power produced from the combustion gases in the presence of the circulating fluid.

In other embodiments, the turbine discharge stream can be an oxidizing fluid. For example, the turbine discharge stream may comprise an excess amount of $O_2$.

In some embodiments, the invention can be characterized by the state of the various streams. For example, after the step of expanding the combustion product stream across the turbine, the turbine discharge stream can be in a gaseous state. This gas can be passed through at least one heat exchanger to cool the gaseous turbine discharge stream for separation of the $CO_2$ from any secondary components. Thereafter, at least a portion of the separated $CO_2$ can be pressurized and transformed into a supercritical fluid state and again be passed through the same heat exchanger(s) to heat the $CO_2$ for recycling into the combustor. In specific embodiments, the temperature difference between the temperature of the turbine discharge stream entering the heat exchanger (or the first heat exchanger when a series is used) from the expanding step and the temperature of the heated, pressurized, supercritical fluid $CO_2$ exiting the same heat exchanger for recycling into the combustor can be less than about 50° C.

As noted above, the fluid stream exiting from the fuel combustor may comprise the $CO_2$ circulating fluid as well as one or more further components, such as combustion products. In some embodiments, it can be useful to recycle at least a portion of the $CO_2$ and reintroduce it into the fuel combustor. Thus, the circulating fluid can be a recycle fluid. Of course, $CO_2$ from an external source could be used as the circulating fluid. The turbine exhaust may be cooled in an economizer heat exchanger, and the withdrawn heat can be used to heat the high pressure recycle $CO_2$. The cooled turbine exhaust leaving the low temperature end of the heat exchanger can contain components derived from the fuel or the combustion process, such as $H_2O$, $SO_2$, $SO_3$, $NO$, $NO_2$, $Hg$, and $HCl$. In further embodiments, these components can be removed from the stream using suitable methods. Other components in this stream may comprise inert gaseous impurities derived from the fuel or oxidant such as $N_2$, Argon (Ar), and excess $O_2$. These may be removed by separate suitable processes. In further embodiments, the turbine exhaust must be at a pressure which is less than the condensing pressure of $CO_2$ in the turbine exhaust at the temperature of available cooling means so that no $CO_2$ liquid phase can form when the turbine exhaust is cooled as this will allow efficient separation of water as liquid from the gaseous $CO_2$ which will contain the minimal amount of water vapor to allow water to be condensed. In further embodiments, the purified $CO_2$ can now be compressed to produce the high pressure recycle $CO_2$ circulating fluid stream together with at least a portion of the $CO_2$ in the fluid representing oxidized carbon derived from carbon in the fuel feed to the combustor, which can be introduced into a pressurized pipeline for sequestration. The ability to transfer $CO_2$ directly from the combustion process into a pressurized pipeline with minimal further treatment or compression due to the high pressure of the turbine exhaust stream is a distinct advantage over conventional methods where $CO_2$ is recovered at close to atmospheric pressure (i.e., around 0.1 MPa) or is emitted to the atmosphere. Moreover, the $CO_2$ for sequestration according to the present invention may be transferred in a manner that is more efficient and economical than heretofore known.

The specific heat of the recycle $CO_2$ fluid entering the heat exchanger, ideally at above the critical pressure, is high and reduces as the temperature rises. It is particularly beneficial for at least a portion of the heat at the lowest temperature levels to be derived from an external source. This could for example be a low pressure steam supply which would provide heat on condensation. In further embodiments this source of heat could be derived from the operation of the air compressors used in the cryogenic air separation plant supplying oxidant to the combustor in the adiabatic mode with no intercooling and extraction of the heat of compression with a closed cycle stream of heat transfer fluid used to provide heat to the recycle $CO_2$ stream.

In one embodiment, a method of power generation according to the present invention can comprise the following steps:

introducing a fuel, $O_2$, and a $CO_2$ circulating fluid into a combustor, the $CO_2$ being introduced at a pressure of at least about 8 MPa and a temperature of at least about 200° C.;

combusting the fuel to provide a combustion product stream comprising $CO_2$, the combustion product stream having a temperature of at least about 800° C.;

expanding the combustion product stream across a turbine to generate power, the turbine having an inlet for receiving the combustion product stream and an outlet for release of a turbine discharge stream comprising $CO_2$, wherein the pressure ratio of the combustion product stream at the inlet compared to the turbine discharge stream at the outlet is less than about 12;

withdrawing heat from the turbine discharge stream by passing the turbine discharge stream through a heat exchange unit to provide a cooled turbine discharge stream;

removing from the cooled turbine discharge stream one or more secondary components that are present in the cooled turbine discharge stream in addition to $CO_2$ to provide a purified, cooled turbine discharge stream;

compressing the purified, cooled turbine discharge stream with a first compressor to a pressure above the $CO_2$ critical pressure to provide a supercritical $CO_2$ circulating fluid stream;

cooling the supercritical $CO_2$ circulating fluid stream to a temperature where its density is at least about 200 kg/m$^3$;

passing the supercritical, high density $CO_2$ circulating fluid through a second compressor to pressurize the $CO_2$ circulating fluid to the pressure required for input to the combustor;

passing the supercritical, high density, high pressure $CO_2$ circulating fluid through the same heat exchange unit such that the withdrawn heat is used to increase the temperature of the $CO_2$ circulating fluid;

supplying an additional quantity of heat to the supercritical, high density, high pressure $CO_2$ circulating fluid so that the difference between the temperature of the $CO_2$ circulating fluid exiting the heat exchange unit for recycle to the combustor and the temperature of the turbine discharge stream is less than about 50° C.; and recycling the heated, supercritical, high density $CO_2$ circulating fluid into the combustor.

In particular embodiments, the systems and methods may be particularly useful for combining with existing power systems and methods (e.g., convention coal fired power stations, nuclear reactors, and other systems and methods that may make use of conventional boiler systems). Thus, in some embodiments, between the expanding step and the withdrawing step described above, the inventive methods can comprise passing the turbine discharge stream through a second heat exchange unit. Such second heat exchange unit can use heat from the turbine discharge stream to heat one or more streams derived from a steam power system (e.g., a conventional boiler system, including coal fired power stations and nuclear reactor). The thus heated steam streams then can be passed through one or more turbines to generate power. The streams exiting the turbines can be processed by cycling back through the components of the conventional power system (e.g., the boiler).

In further embodiments, the inventive method may be characterized by one or more of the following:

cooling the turbine discharge stream to a temperature below its water dew point;

further cooling the turbine discharge stream against an ambient temperature cooling medium;

condensing water together with the one or more secondary components to form a solution comprising one or ore of $H_2SO_4$, $HNO_3$, HCl, and mercury;

pressurizing the cooled turbine discharge stream to a pressure of less than about 15 MPa;

withdrawing a product $CO_2$ stream from the supercritical, high density, high pressure $CO_2$ circulating fluid stream prior to passing through the heat exchange unit;

using as the fuel a stream of partial combustion products;

combusting a carbon containing fuel with $O_2$ in the presence of a $CO_2$ circulating fluid, the carbon containing fuel, $O_2$, and $CO_2$ circulating fluid being provided in ratios such that the carbon containing fuel is only partially oxidized to produce the partially oxidized combustion product stream comprising an incombustible component, $CO_2$, and one or more of $H_2$, CO, $CH_4$, $H_2S$, and $NH_3$;

providing the carbon containing fuel, $O_2$, and $CO_2$ circulating fluid in ratios such that the temperature of the partially oxidized combustion product stream is sufficiently low that all of the incombustible component in the stream is in the form of solid particles;

passing the partially oxidized combustion product stream through one or more filters;

using the filter to reduce the residual amount of incombustible component to less than about 2 mg/m$^3$ of the partially oxidized combustion product;

using coal, lignite, or petroleum coke as the fuel;

providing a particulate fuel as a slurry with $CO_2$;

In further embodiments, the invention may be described as relating to a method of power generation comprising the following steps:

introducing a carbon containing fuel, $O_2$, and a $CO_2$ circulating fluid into a transpiration cooled combustor, the $CO_2$ being introduced at a pressure of at least about 8 MPa and a temperature of at least about 200° C.;

combusting the fuel to provide a combustion product stream comprising $CO_2$, the combustion product stream having a temperature of at least about 800° C.;

expanding the combustion product stream across a turbine to generate power, the turbine having an inlet for receiving the combustion product stream and an outlet for release of a turbine discharge stream comprising $CO_2$, wherein the pressure ratio of the combustion product stream at the inlet compared to the turbine discharge stream at the outlet is less than about 12;

passing the turbine discharge stream through a series of at least two heat exchangers that withdraw heat from the turbine discharge stream and provide the $CO_2$ circulating fluid stream;

removing from the $CO_2$ circulating fluid stream one or more secondary components that are present in the circulating fluid stream in addition to $CO_2$;

passing the $CO_2$ circulating fluid stream through a series of at least two compressors that increases the pressure of the $CO_2$ circulating fluid to at least about 8 MPa and transforms the $CO_2$ in the circulating fluid from a gaseous state to a supercritical fluid state; and passing the supercritical $CO_2$ circulating fluid through the same series of at least two heat exchangers that uses the withdrawn heat to increase the temperature of the $CO_2$ circulating fluid to at least about 200° C. (or, optionally, to a temperature that is less than the temperature of the turbine discharge stream by no more than about 50° C.). This specifically may comprise introduction of additional heat from an external heat source (i.e., a source of heat not derived directly from the passage of the turbine discharge stream through the heat exchanger(s)).

In further embodiments, the invention may be characterized as providing a high efficiency method of generating power from combustion of a carbon containing fuel with no atmospheric release of $CO_2$. Specifically, the method can comprise the following steps:

introducing the carbon containing fuel, $O_2$, and a recycled $CO_2$ circulating fluid into a transpiration cooled combustor in a defined stoichiometric ratio, the $CO_2$ being introduced at a pressure of at least about 8 MPa and a temperature of at least about 200° C.;

combusting the fuel to provide a combustion product stream comprising $CO_2$, the combustion product stream having a temperature of at least about 800° C.;

expanding the combustion product stream across a turbine to generate power, the turbine having an inlet for receiving the combustion product stream and an outlet for release of a turbine discharge stream comprising $CO_2$, wherein the pressure ratio of the combustion product stream at the inlet compared to the turbine discharge stream at the outlet is less than about 12;

passing the turbine discharge stream through a series of at least two heat exchangers that withdraw heat from the turbine discharge stream and provide the $CO_2$ circulating fluid stream;

passing the $CO_2$ circulating fluid stream through a series of at least two compressors that increases the pressure of the $CO_2$ circulating fluid to at least about 8 MPa and transforms the $CO_2$ in the circulating fluid from a gaseous state to a supercritical fluid state;

passing the $CO_2$ circulating fluid stream through a separation unit wherein the stoichiometrically required amount of $CO_2$ is recycled and directed to the combustor and any excess $CO_2$ is withdrawn without atmospheric release; and passing the recycled $CO_2$ circulating fluid through the same series of at least two heat exchangers that uses the withdrawn heat to increase the temperature of the $CO_2$ circulating fluid to at least about 200° C. prior to introduction into the combustor (or, optionally, to a temperature that is less than the temperature of the turbine discharge stream by no more than about 50° C.);

wherein the efficiency of the combustion is greater than 50%, said efficiency being calculated as the ratio of the net power generated in relation to the total lower heating value thermal energy for the carbon containing fuel combusted to generate the power.

In another aspect, the invention can be described as provide a power generation system. Specifically, a power generation system according to the invention can comprise a transpiration cooled combustor, a power production turbine, at least one heat exchanger, and at least one compressor.

In specific embodiments, the transpiration cooled combustor can have at least one inlet for receiving a carbon-containing fuel, $O_2$, and a $CO_2$ circulating fluid stream. The combustor further can have at least one combustion stage that combusts the fuel in the presence of the $CO_2$ circulating fluid and provides a combustion product stream comprising $CO_2$ at a defined pressure (e.g., at least about 8 MPa) and temperature (e.g., at least about 800° C.).

The power production turbine can be in fluid communication with the combustor and can have an inlet for receiving the combustion product stream and an outlet for release of a turbine discharge stream comprising $CO_2$. The turbine can be adapted to control pressure drop such that the ratio of the pressure of the combustion product stream at the inlet compared to the turbine discharge stream at the outlet is less than about 12.

The at least one heat exchanger can be in fluid communication with the turbine for receiving the turbine discharge stream. The heat exchanger(s) can transfer heat from the turbine discharge stream to the $CO_2$ circulating fluid stream.

The at least one compressor can be in fluid communication with the at least one heat exchanger. The compressor(s) can be adapted for pressurizing the $CO_2$ circulating fluid stream to a desired pressure.

In addition to the foregoing, a power generation system according to the invention further can comprise one or more separation devices positioned between the at least one heat exchanger and the at least one compressor. Such separation device(s) can be useful for removal of one or more secondary components present in the $CO_2$ circulating fluid in addition to the $CO_2$.

Still further, the power generation system can comprise an $O_2$ separation unit that includes one or more components that generates heat. Thus, the power generation system also can comprise one or more heat transfer components that transfers heat from the $O_2$ separation unit to the $CO_2$ circulating fluid upstream from the combustor. Optionally, the power generation system can comprise an external heat source. This could for example be a low pressure steam supply which would provide heat on condensation. The power generation system thus could include one or more heat transfer components that transfers heat from the steam to the $CO_2$ circulating fluid upstream from the combustor.

In further embodiments, a power generation system of the invention may include one or more of the following:

a first compressor adapted to compress the $CO_2$ circulating fluid stream to a pressure that is above the $CO_2$ critical pressure;

a second compressor adapted to compress the $CO_2$ circulating fluid stream to a pressure required for input to the combustor;

a cooling device adapted to cool the $CO_2$ circulating fluid stream to a temperature where its density is greater than about 200 kg/m$^3$;

one or more heat transfer components that transfers heat from an external source to the $CO_2$ circulating fluid upstream from the combustor and downstream from the second compressor;

a second combustor located upstream from and in fluid communication with the transpiration cooled combustor;

one or more filters or separation devices located between the second combustor and the transpiration cooled combustor;

a mixing device for forming a slurry of a particulate fuel material with a fluidizing medium;

a milling device for particularizing a solid fuel.

In other embodiments, the present invention can provide a power generation system that may comprise the following: one or more injectors for providing fuel, a $CO_2$ circulating fluid, and an oxidant; a transpiration cooled combustor having at least one combustion stage that combusts the fuel and provides an exhaust fluid stream at a temperature of at least about 800° C. and a pressure of at least about 4 MPa (preferably at least about 8 MPa); a power production turbine having an inlet and an outlet and wherein power is produced as the fluid stream expands, the turbine being designed to maintain the fluid stream at a desired pressure such that the ratio of the pressure of the fluid stream at the inlet versus the outlet is less than about 12; a heat exchanger for cooling the fluid stream leaving the turbine outlet and for heating the $CO_2$ circulating fluid; and one or more devices for separating the fluid stream exiting the heat exchanger into $CO_2$ and one or more further components for recovery or disposal. In further embodiments, the power generation system may also comprise one or more devices for delivering at least a portion of the $CO_2$ separated from the fluid stream into a pressurized pipeline.

In specific embodiments, a system according to the invention may comprise one or more components as described herein retrofit with an conventional power production system, such as a coal fired power station, a nuclear reactor, or the like. For example, a power system could comprise two heat exchange units (e.g., a primary heat exchange unit and a secondary heat exchange unit). The primary heat exchange unit could be substantially a unit as otherwise described herein, and the secondary heat exchange unit could be a unit useful for transferring heat from the turbine discharge stream to one or more steam streams (e.g., from a boiler associated with the conventional power production system) to superheat the steam streams. Thus, a power generation system according to the invention may comprise a secondary heat exchange unit located between and in fluid communication with the turbine and the primary heat exchange unit. The power generation system likewise can comprise a boiler in fluid communication with the secondary heat exchange unit via at least one steam stream. Still further, the power generation system can comprise at least one further power production turbine having an inlet for receiving the at least one steam stream from the secondary heat exchange unit. Thus, the system may be described as comprising a primary power production turbine and a secondary power production turbine. The primary power production turbine may be the turbine in fluid communication with the inventive combustor. The secondary power production turbine may be the turbine in fluid communication with a steam stream, particularly a superheated steam stream that is superheated with heat from the discharge stream from the primary power production turbine. Such a system retrofit with one or more components from a convention power production system is described herein, particularly in relation to FIG. 12 and Example 2. The use of the terms primary power production turbine and secondary power production turbine should not be construed as limiting the scope of the invention and are only used to provide clarity of description.

In another aspect of the invention an external stream may be heated in the high temperature end of the heat exchanger by heat transfer from the cooling turbine exhaust stream and, as a result, the high pressure recycle stream will leave the heat exchanger and enter the combustor at a lower temperature. In this case, the amount of fuel burned in the combustor may be increased so that the turbine inlet temperature is maintained. The heating value of the extra fuel burned is equivalent to the extra heat load imposed on the heat exchanger.

In some embodiments, the invention can be characterized as providing a process plant producing shaft power from the circulation of a predominantly $CO_2$ circulating fluid. In further embodiments, the invention provides processes in which certain conditions may be met. In specific embodiments, the invention further may be characterized by one or more of the following actions or devices useful for carrying out such actions:

compressing the $CO_2$ circulating fluid to a pressure in excess of the critical pressure of $CO_2$;

directly combusting a solid, liquid, or gaseous hydro-carbonaceous fuel in substantially pure $O_2$ with provision for mixing a $CO_2$ rich supercritical recycle fluid to achieve a required power turbine inlet temperature—e.g., greater than about 500° C. (or other temperature range as described herein);

expanding a supercritical stream formed of combustion products and recycled $CO_2$ rich fluid in a turbine with production of shaft power, particularly expanding to a pressure that is above about 2 MPa and is below the pressure at which a $CO_2$ liquid phase appears when the fluid is cooled to a temperature consistent with the use of ambient temperature cooling means (e.g., about 7.3-7.4 MPa);

introducing a turbine exhaust into a heat exchanger in which the turbine exhaust is cooled, and the heat is transferred to a recycled $CO_2$ rich supercritical fluid;

cooling a $CO_2$ containing stream leaving a heat exchanger against an ambient temperature cooling means and separating a water liquid phase that contains at least minor concentrations of $CO_2$ and a gaseous $CO_2$ phase that contains at least a minor concentration of water vapor;

carrying out a water separation in a manner that allows a desired residence time (e.g., up to 10 seconds) with intimate contact between gaseous $CO_2$ and liquid water or a weak acid phase such that reactions involving $SO_2$, $SO_3$, $H_2O$, $NO$, $NO_2$, $O_2$, and/or Hg can take place resulting in the conversion of greater than 98% of sulfur present in a stream to $H_2SO_4$ and the conversion of greater than 90% of nitrogen oxides present in a stream to $HNO_3$, and for the conversion of greater than 80% of mercury in a stream to soluble mercury compounds;

separating non condensable components (such as $N_2$, Ar, and $O_2$) from a gaseous $CO_2$ phase by cooling to a temperature close to the $CO_2$ freezing point with a gas/liquid phase separation leaving the $N_2$, Ar, and $O_2$ predominantly in the gas phase;

compressing a purified gaseous $CO_2$ stream in a gas compressor to a pressure at which cooling by ambient temperature cooling means will yield a high density $CO_2$ fluid (e.g., with a density of at least about 200 kg/m$^3$, preferably at least about 300 kg/m$^3$, or more preferably at least about 400 kg/m$^3$);

cooling compressed $CO_2$ with ambient cooling means to form a high density $CO_2$ supercritical fluid (e.g., with a density of at least about 200 kg/m$^3$, preferably at least about 300 kg/m$^3$, or more preferably at least about 400 kg/m$^3$);

compressing a high density $CO_2$ fluid in a compressor to a pressure above the critical pressure of $CO_2$;

separating a high pressure $CO_2$ stream into two separate streams—one that enters the cold end of a heat exchanger and a second that is heated using an external heating source available at a temperature below about 250° C.;

facilitating efficient heat transfer (including the use of an optional external heat source) such that the difference between the temperature of a turbine discharge stream entering the hot end of a heat exchanger and the temperature of a recycle $CO_2$ circulating fluid leaving the hot end of the same heat exchanger is less than about 50° C. (or other temperature threshold as described herein);

compressing a $CO_2$ circulating fluid to a pressure of about 8 MPa to about 50 MPa (or other pressure range as described herein);

mixing of an $O_2$ stream with at least a portion of a recycled $CO_2$ circulating fluid stream and a carbon containing fuel stream to form a single fluid stream (or slurry if a powdered, solid fuel is used), which is below the auto-ignition temperature of the fuel, and the proportions of which are adjusted to give an adiabatic flame temperature of about 1,200° C. to 3,500° C. (or other temperature range as described herein);

mixing at least a portion of a recycled $CO_2$ circulating fluid with combustion products to form a mixed fluid stream at a temperature in the range of about 500° C. to 1,600° C. (or other temperature range as described herein);

producing a turbine discharge stream having a pressure of about 2 MPa to about 7.3 MPa (or other pressure range as described herein);

externally heating a portion of a high pressure $CO_2$ circulating fluid stream using heat of compression derived from the operation of one or more air compressors of a cryogenic $O_2$ plant (particularly in the adiabatic mode) and/or a $CO_2$ compressor (particularly in the adiabatic mode), the heat being transferred by circulation of a suitable heat transfer fluid (including the $CO_2$ fluid itself);

heating one or more external fluid streams in a heat exchanger with equivalent extra fuel being burned in a burner, wherein one or more of the external fluid streams may comprise steam, which can be super heated in the heat exchanger;

using heat supplied by condensing steam provided from an external source to externally heat a portion of a recycled $CO_2$ circulating fluid stream;

cooling in a heat exchanger a $CO_2$ containing stream (which leaves the cold end of the heat exchanger) to provide heat for heating an externally provided fluid stream;

providing an $O_2$ feed stream wherein the molar concentration of the $O_2$ is at least about 85% (or other concentration range as described herein);

operating a combustor such that the concentration of $O_2$ in a total gas stream leaving the combustor (i.e., a combustion product stream) and entering a turbine is greater than about 0.1% molar;

carrying out a power production process such that only one power producing turbine is used;

carrying out a power production process such that only one combustor is used to substantially completely combust the carbon containing fuel input into the combustor;

operating a combustor such that the quantity of $O_2$ in the $O_2$ stream entering the combustor is below the quantity required for stoichiometric combustion of the fuel stream entering the combustor and thus causing production of one or both of $H_2$ and carbon monoxide (CO) in the combustion product stream; and carrying out a process using two or more turbines each having a defined exit pressure wherein one or both of $H_2$ and CO are present in the discharge stream leaving the first turbine (and subsequent turbines, if applicable, with the exception of the final turbine in the turbine series) and part or all of the $H_2$ and CO is combusted by the addition of a stream of $O_2$ before the inlet of the second and subsequent turbines to raise the operating temperature of each of the second or more turbines to a higher value resulting in an excess $O_2$ in the exit stream from the last turbine, such excess being greater than bout 0.1% molar.

In further embodiments, the present invention may provide one or more of the following:

heating a $CO_2$ circulating fluid in a heat exchange system against the cooling turbine exhaust stream such that the turbine exhaust stream is cooled to a temperature below its water dew point;

cooling the turbine exhaust stream against an ambient temperature cooling medium and condensing water together with fuel and combustion derived impurities comprising $H_2SO_4$, HNO$_3$, HCl, and other impurities such as Hg and other metals in the form of ionic compounds in solution;

compressing the purified CO$_2$ circulating fluid to a pressure above its critical pressure but below 10 MPa in a first compressor;

cooling the circulating fluid to a point where its density is greater than 600 kg/m3;

compressing the high density CO$_2$ circulating fluid in a compressor to the pressure required to overcome pressure drop in the system and feed the circulating CO$_2$ fluid into the combustion chamber;

removing a product CO$_2$ product stream containing substantially all of the CO$_2$ formed by combustion of carbon in the fuel stream, the CO$_2$ stream being taken from either the discharge flow of the first compressor or the second compressor;

supplying an additional quantity of heat to the CO$_2$ circulating fluid at a temperature level which is above the water dew-point of the cooling turbine exhaust stream either directly to the heat exchanger or by heating a side-stream comprising part of the CO$_2$ circulating fluid so that the temperature difference between the circulating CO$_2$ fluid and the turbine exhaust at the hot end of the heat exchanger is less that 50° C.;

using a fuel comprising a carbon containing fuel having an incombustible residue which is partially oxidized with O$_2$ in a transpiration cooled combustor to produce a stream comprising H$_2$, CO, CH$_4$, H$_2$S, NH$_3$ and incombustible residue, the combustor being fed with part of the circulating CO$_2$ fluid to cool the partially oxidized combustion products to a temperature of 500° C. to 900° C. where the ash is present as solid particulate which can be completely removed from the outlet fluid stream by a filtration system;

providing for a temperature difference between the cooling turbine exhaust stream and the heating circulating CO$_2$ fluid stream at the point at which the side-stream flow remixes with the separately heated circulating CO$_2$ fluid flow that is between 10° C. and 50° C.;

providing for a pressure of the turbine exhaust stream leaving the cold end of the heat exchanger such that no liquid CO$_2$ is formed when this stream is cooled prior to water and impurity separation;

using least part of the turbine exhaust stream to superheat multiple steam streams derived from steam power systems associated with conventional boiler systems and nuclear reactors;

providing additional low level heat to the circulating CO$_2$ stream as steam at one or more pressure levels taken from an external steam source such as a power station;

using the expander exhaust stream leaving the cold end of the heat exchanger system to provide heating for at least part of the condensate leaving the steam condenser of the steam power generation system;

providing additional low level heat for the circulating CO$_2$ stream from the hot exhaust of an open cycle gas turbine;

passing a partially oxidized coal derived gas plus CO$_2$ as fuel to a second combustor for complete combustion;

operating a single combustor with an O$_2$ to fuel ratio such that part of the fuel is oxidized to oxidation products comprising CO$_2$, H$_2$O, and SO$_2$ and the rest of the fuel is oxidized to components comprising H$_2$, CO, and H$_2$S;

operating two turbines which over the total required pressure ratio with O$_2$ injected into the discharge flow of the first turbine to combust the reduced components to reheat the intermediate pressure flow to a higher temperature before it is expanded through the second turbine.

Even further embodiments are encompassed by the present invention as described in relation to the various figures and/or as disclosed in the further description of the invention provided herein.

BRIEF DESCRIPTION OF THE DRAWINGS

Figure 1:
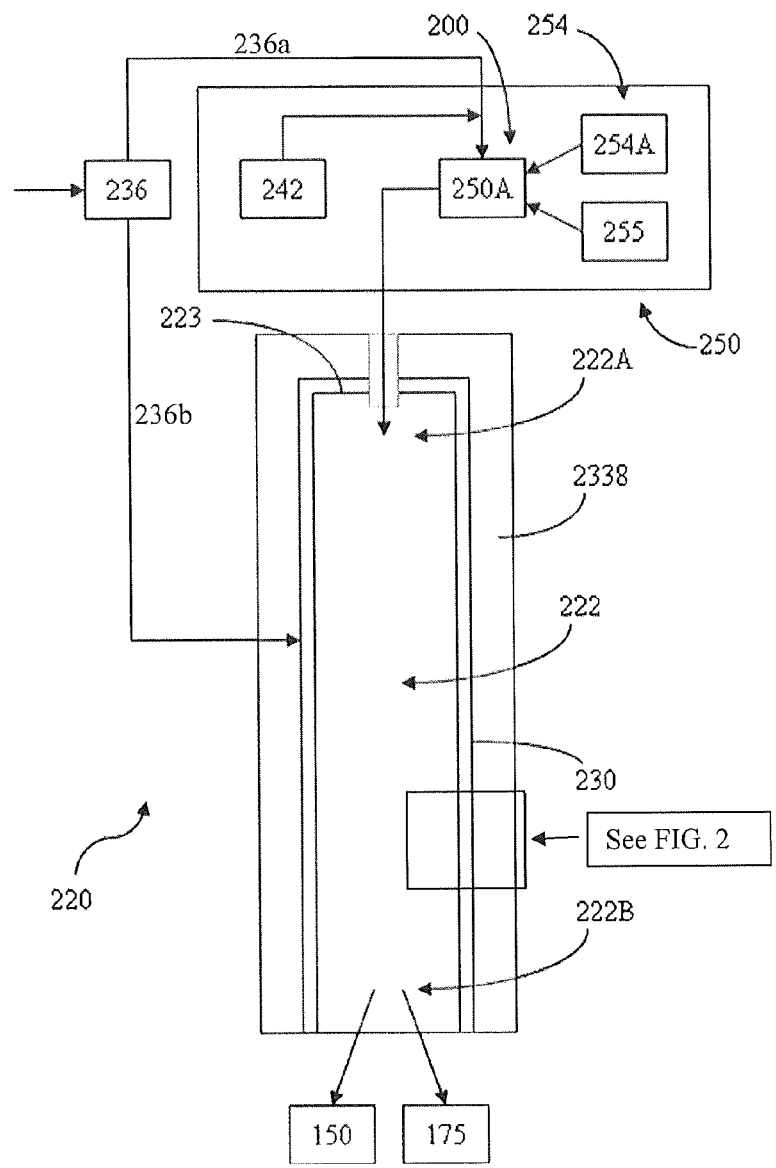
Figure 2:
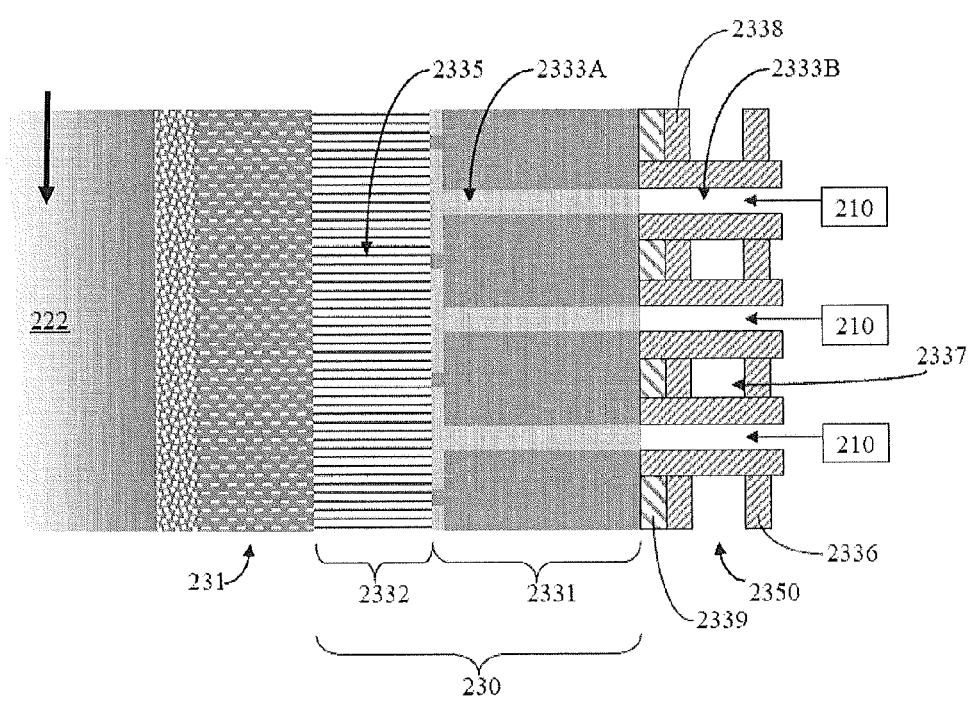
Figure 3:
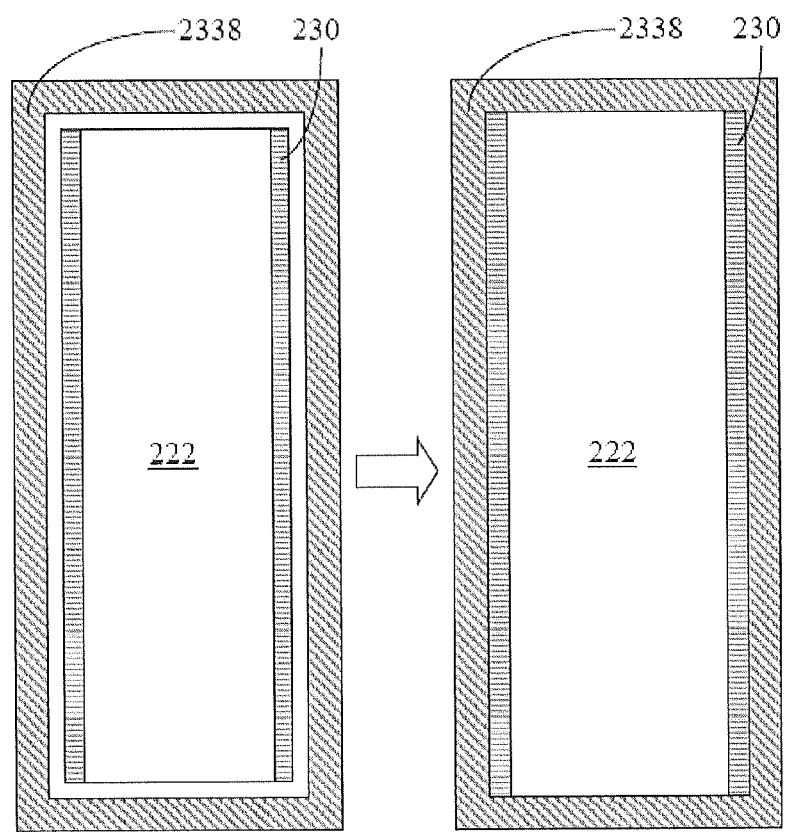
Figure 4:
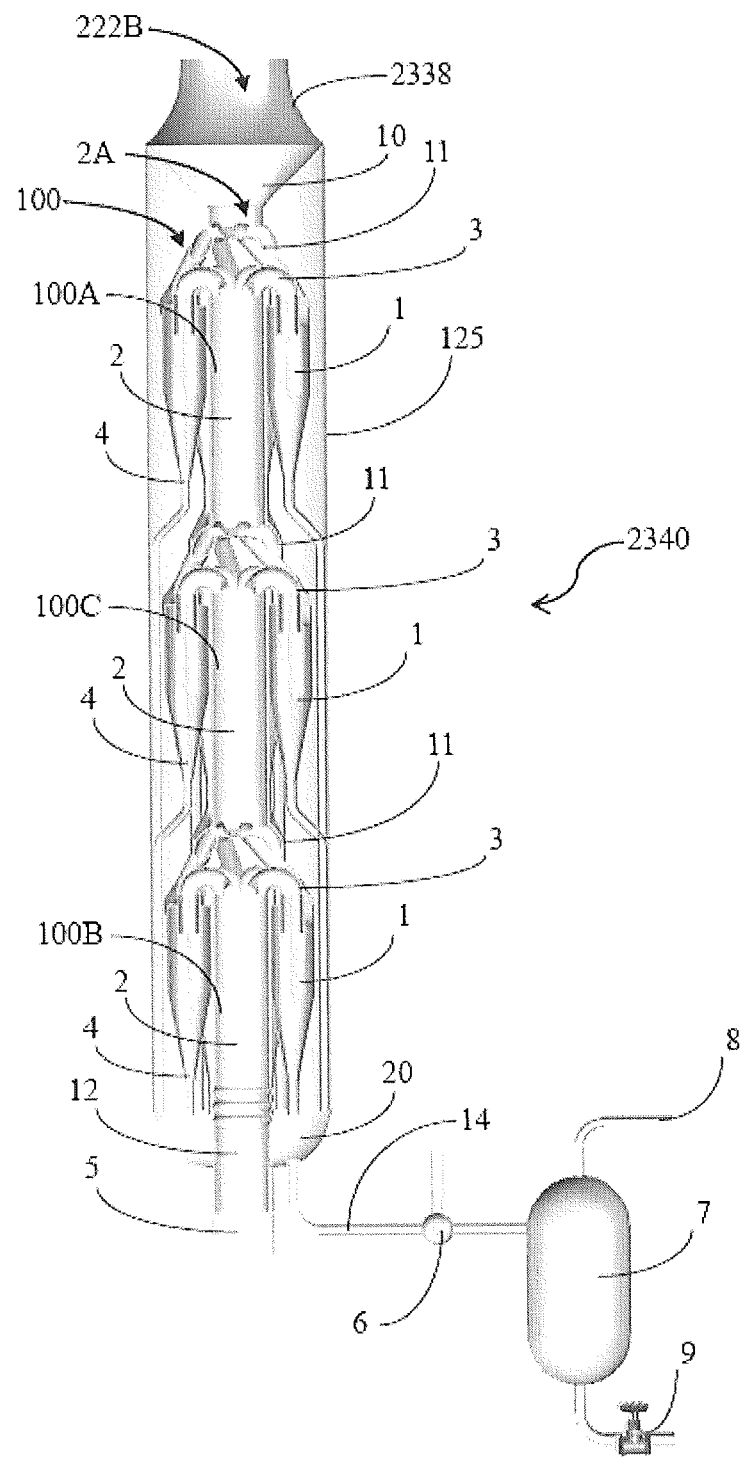
Figure 5:
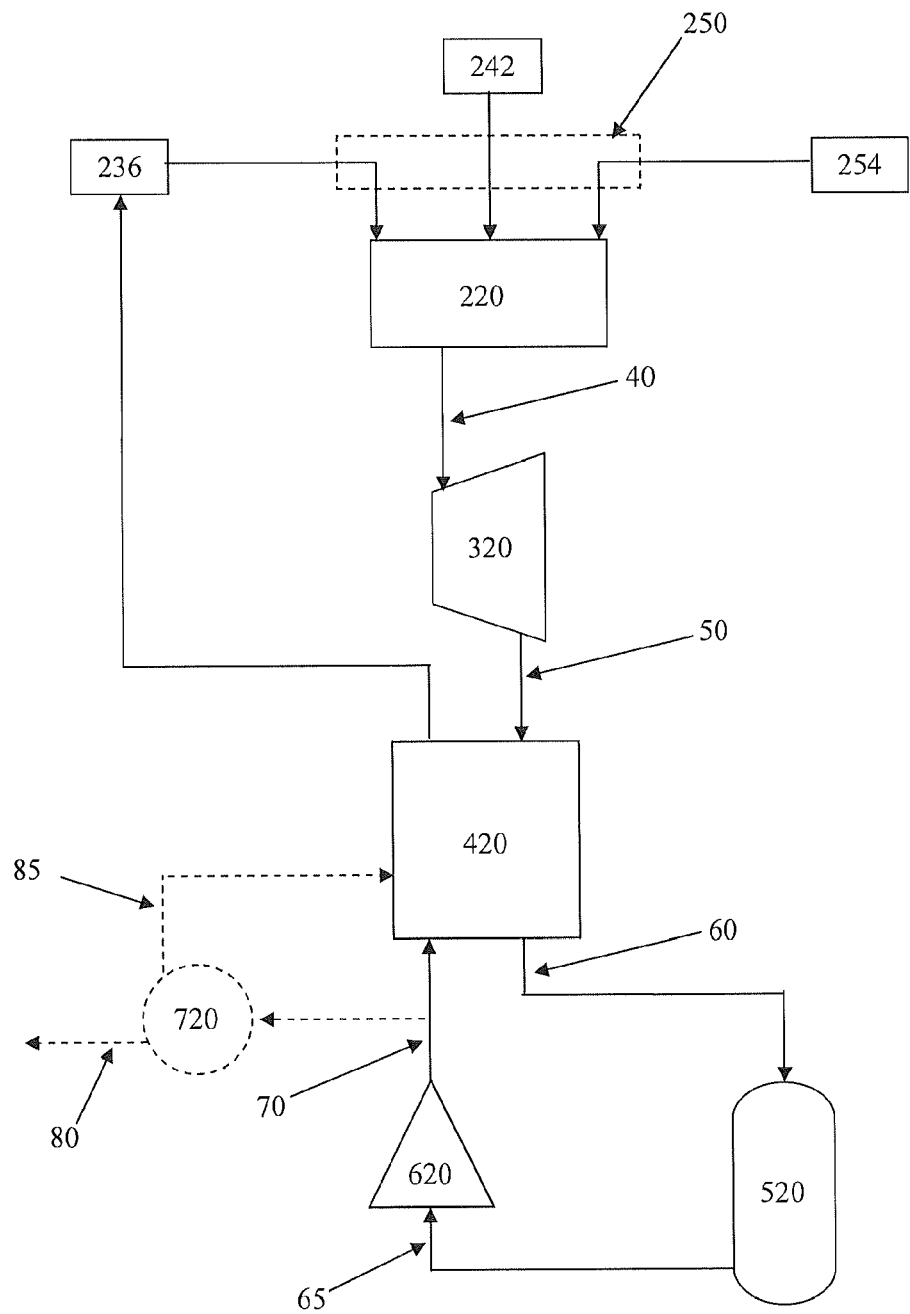
Figure 6:
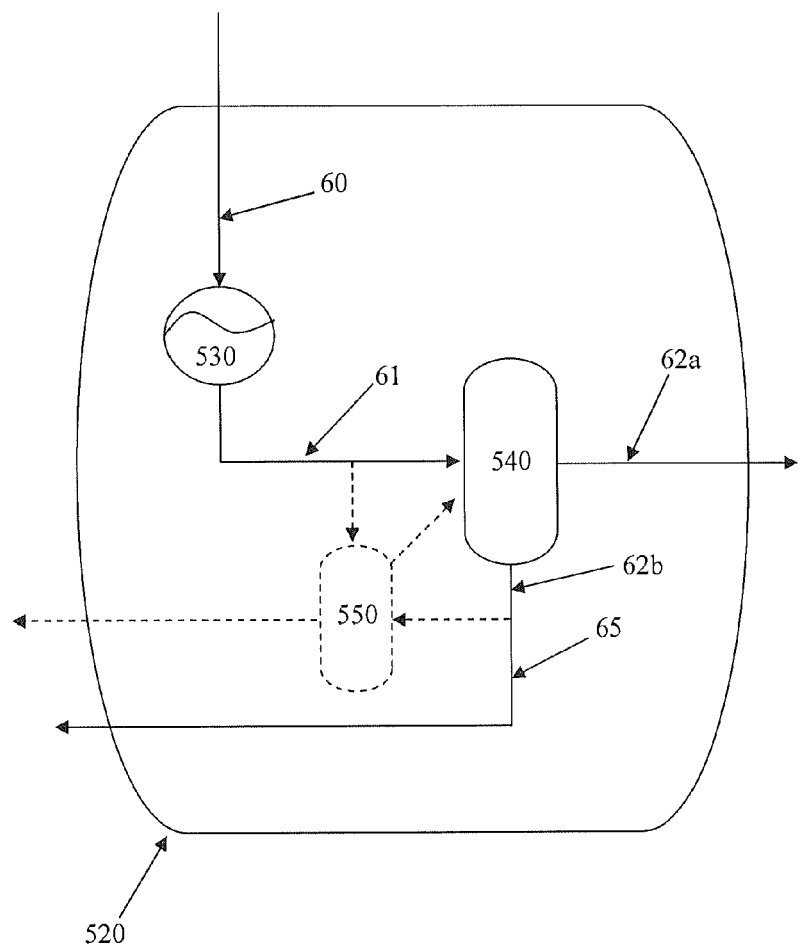
Figure 7:
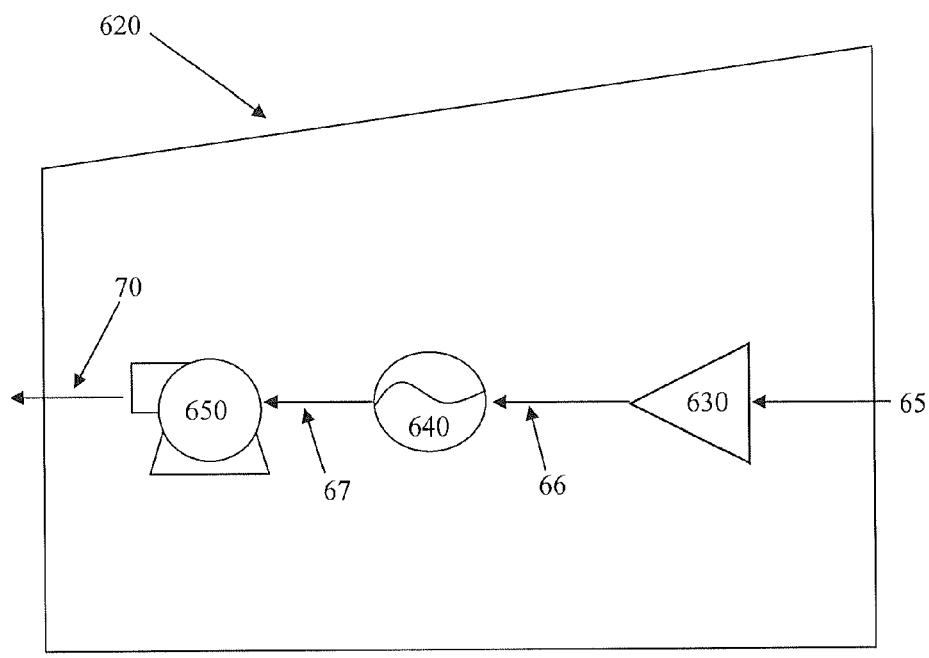
Figure 8:
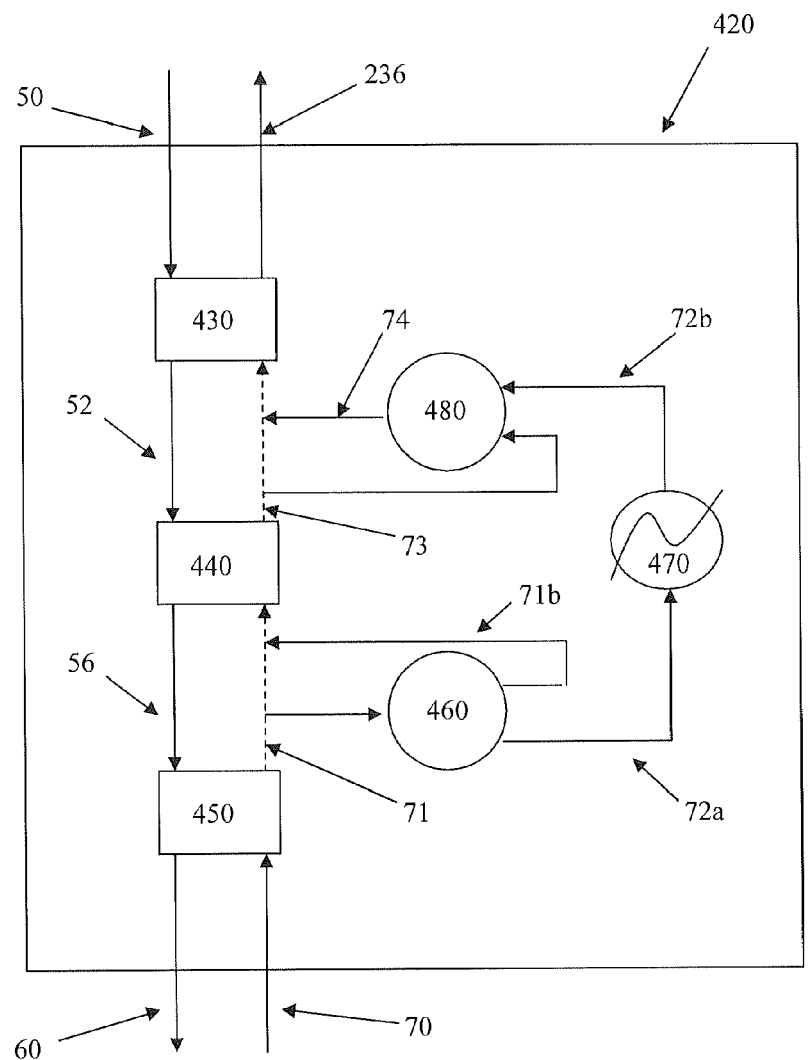
Figure 9:
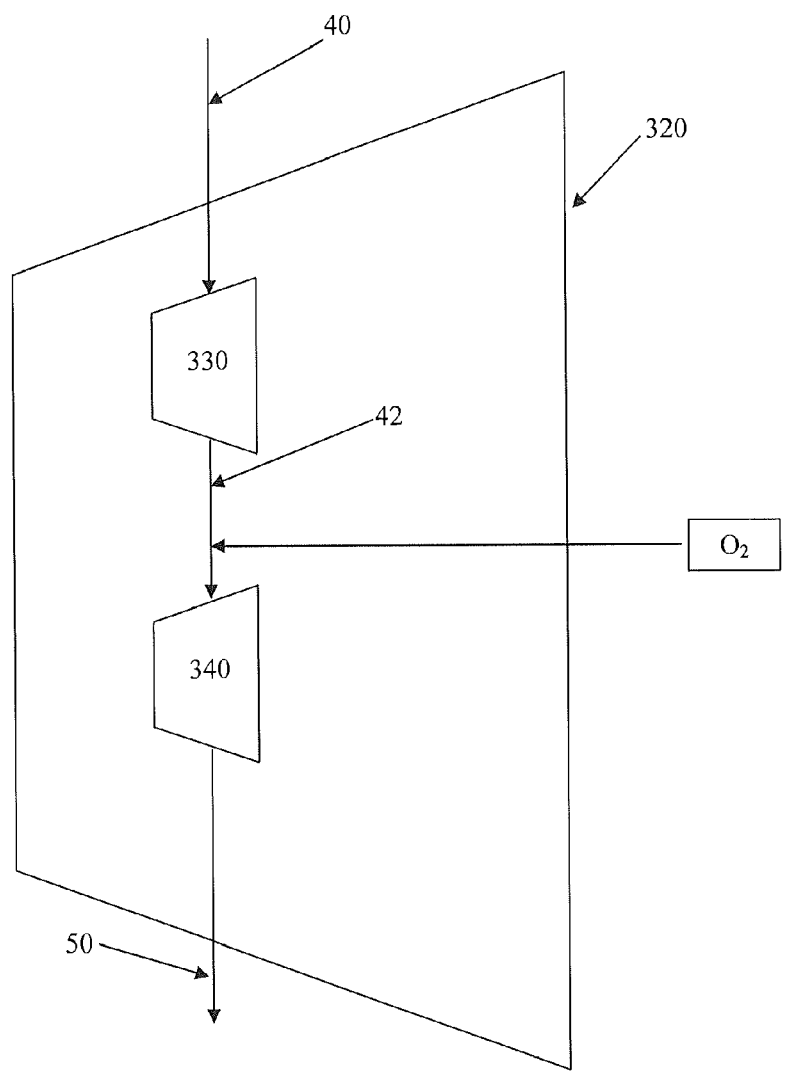
Figure 10:
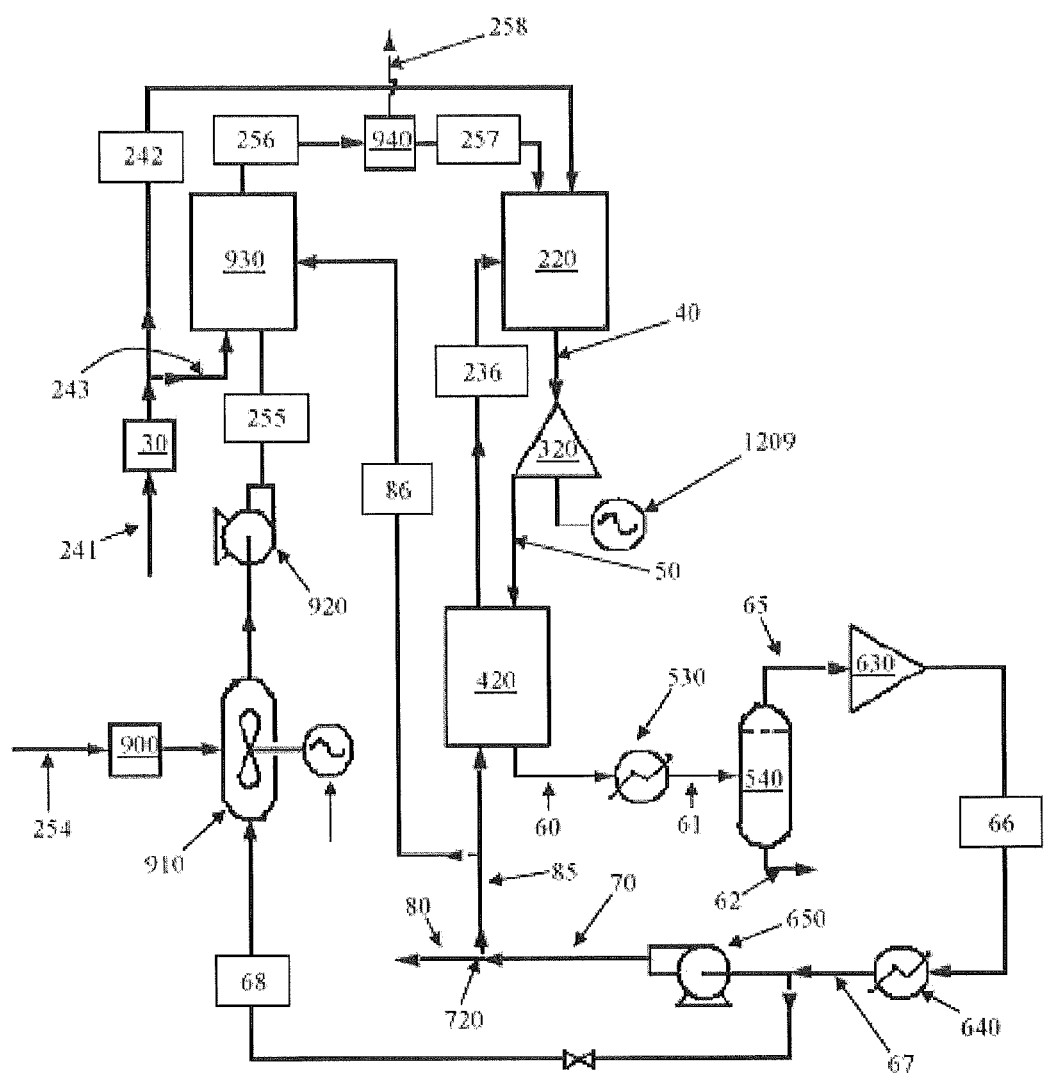
Figure 11:
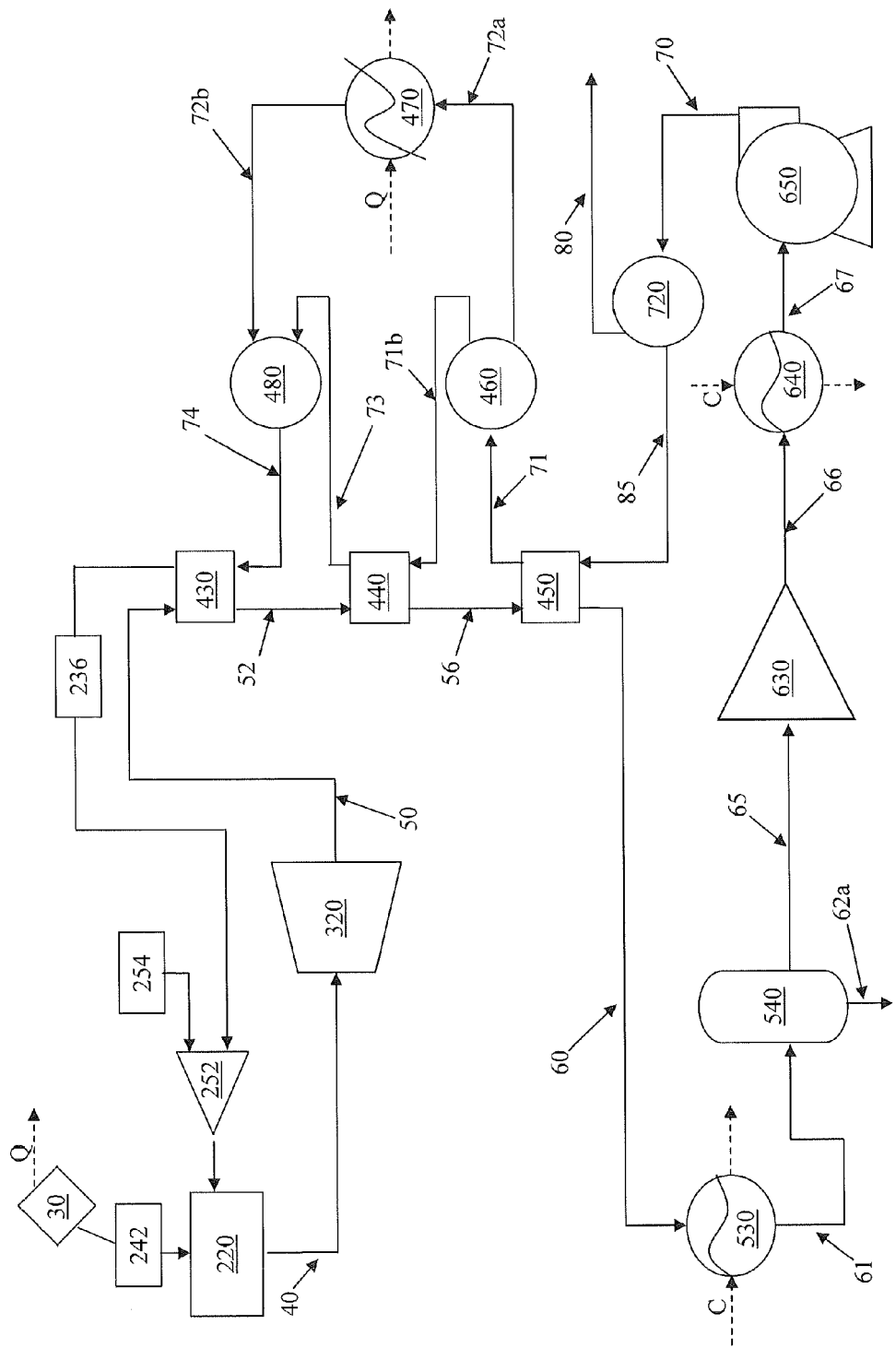
Figure 12:
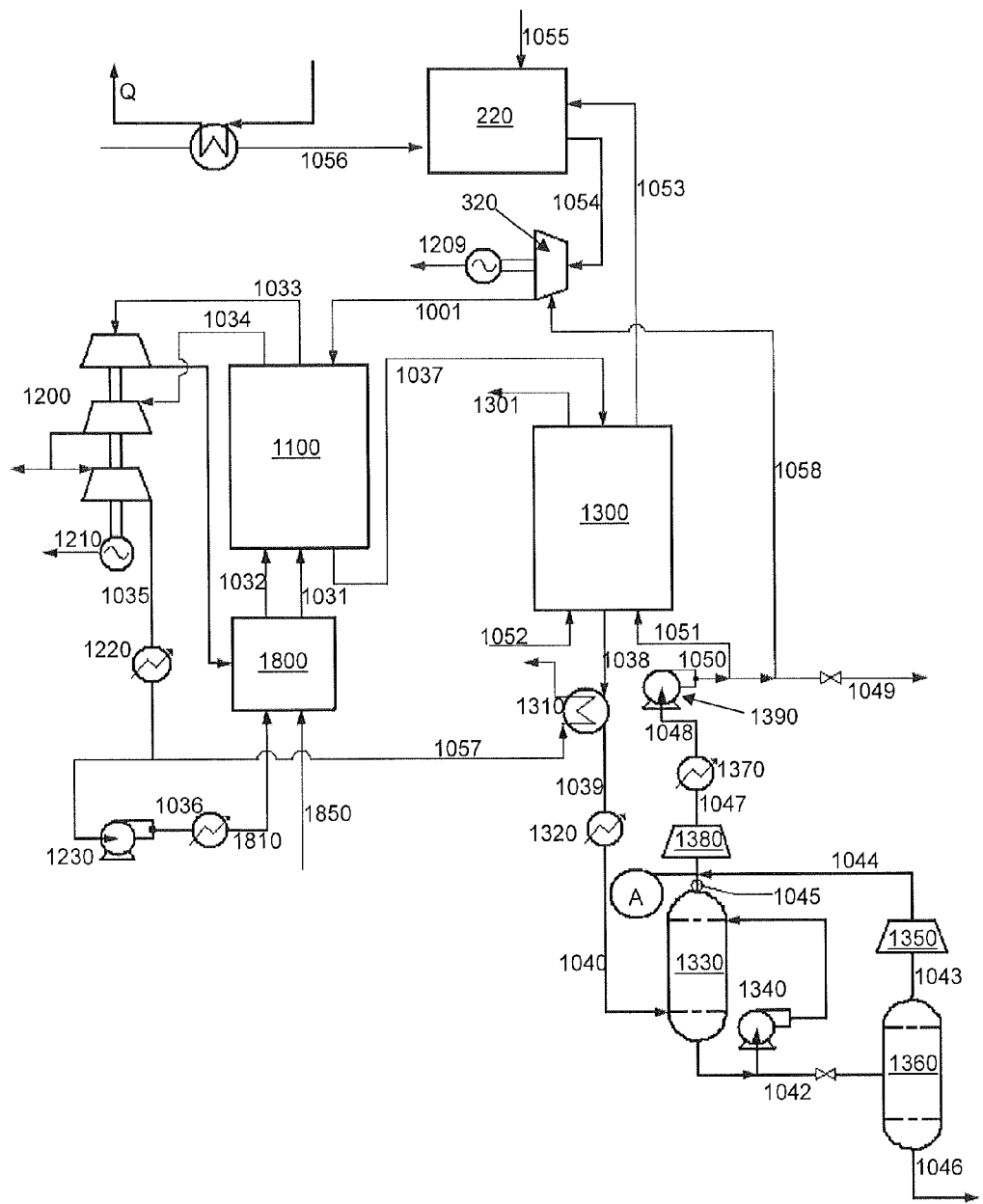

Having thus described the invention in general terms, reference will now be made to the accompanying drawings, which is not necessarily drawn to scale, and wherein:

FIG. 1 is a schematic illustration of a transpiration-cooled combustor apparatus that may be used according to certain embodiments of the present disclosure;

FIG. 2 is a schematic illustration of an exemplary cross-section of a wall of a transpiration member in a combustor apparatus that may be used in certain embodiments of the present disclosure;

FIG. 3A and FIG. 3B schematically illustrate a hot fit process for a transpiration member assembly of a combustor apparatus that may be used in certain embodiments of the present disclosure;

FIG. 4 schematically illustrates a combustion product contaminant removal apparatus that may be useful according to certain embodiments of the present disclosure;

FIG. 5 is a flow diagram illustrating a power cycle according to one embodiment of the present disclosure;

FIG. 6 is a flow diagram illustrating the flow of a CO$_2$ circulating fluid through a separation unit according to one embodiment of the present disclosure;

FIG. 7 is a flow diagram illustrating pressurization using a series of two or more compressors or pumps in a pressurization unit according to one embodiment of the present disclosure;

FIG. 8 is a flow diagram illustrating a heat exchanger unit according to one embodiment of the present disclosure wherein three individual heat exchangers are used in series;

FIG. 9 is a flow diagram illustrating a turbine unit utilizing two turbines operated in series in the reducing mode according to one embodiment of the present disclosure;

FIG. 10 is a flow diagram illustrating a system and method for power production according to one embodiment of the present invention using two combustors;

FIG. 11 is a flow diagram illustrating a specific example of a system and method for power production according to one embodiment of the present disclosure; and FIG. 12 is a flow diagram illustrating another example of a system and method for power production incorporating a conventional coal fired boiler according to an embodiment of the present disclosure.

DETAILED DESCRIPTION OF THE INVENTION

The invention now will be described more fully hereinafter through reference to various embodiments. These embodiments are provided so that this disclosure will be thorough and complete, and will fully convey the scope of the invention to those skilled in the art. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present invention provides systems and methods for producing power through use of a high efficiency fuel combustor (such as a transpiration cooled combustor) and an associated circulating fluid (such as a $CO_2$ circulating fluid). The circulating fluid is provided in the combustor along with an appropriate fuel, any necessary oxidant, and any associated materials that may be useful for efficient combustion. In specific embodiments, the methods can be carried out using a combustor that operates at very high temperatures (e.g., in the range of about 1,600° C. to about 3,300° C., or other temperature ranges as disclosed herein), and the presence of the circulating fluid can function to moderate the temperature of a fluid stream exiting the combustor so that the fluid stream can be utilized in energy transfer for power production. Specifically, a combustion product stream can be expanded across at least one turbine to generate power. The expanded gas stream can be cooled to remove various components from the stream, such as water, and heat withdrawn from the expanded gas stream can be used to heat the $CO_2$ circulating fluid. The purified circulating fluid stream can then be pressurized and heated for recycle through the combustor. If desired, part of the $CO_2$ from the combustion product stream (i.e., arising from $CO_2$ formed by combustion of the carbon containing fuel in the presence of oxygen) can be drawn off for sequestration or other disposal, such as transfer to a $CO_2$ pipeline. The system and methods can make use of specific process parameters and components to maximize efficiency of the system and method, particularly while avoiding releasing $CO_2$ to the atmosphere. As particularly described herein, the circulating fluid is exemplified by the use of $CO_2$ as the circulating fluid. While use of a $CO_2$ circulating fluid is an advantageous embodiment according to the invention, such disclosure should not be construed as necessarily limiting the scope of the circulating fluid that may be used in the invention unless otherwise stated.

In certain embodiments, a power generation system according to the invention can uses a circulating fluid comprising predominantly $CO_2$. In other words, the chemical nature of the circulating fluid immediately prior to input into the combustor is such that the circulating fluid comprises predominately $CO_2$. In this sense, the word "predominately" can mean the fluid comprises at least about 90% by molar concentration, at least about 91% by molar concentration, at least about 92% by molar concentration, at least about 93% by molar concentration, at least about 94% by molar concentration, at least about 95% by molar concentration, at least about 96% by molar concentration, at least about 97% by molar concentration, at least about 98% by molar concentration, or at least about 99% by molar concentration $CO_2$. The circulating fluid immediately prior to entering the combustor preferably comprises substantially only $CO_2$. In this sense, the phrase "substantially only" can mean at least about 99.1% by molar concentration, at least about 99.25% by molar concentration, at least about 99.5% by molar concentration, at least about 99.75% by molar concentration, at least about 99.8% by molar concentration, or at least about 99.9% by molar concentration $CO_2$. In the combustor, the $CO_2$ can comingle with one or more further components that can be derived from the fuel, any oxidant, and any derivatives from the fuel combustion. Thus, the circulating fluid exiting the combustor, which can be described herein as a combustion product stream, may comprise $CO_2$ along with lesser amounts of other materials, such as $H_2O$, $O_2$, $N_2$, Ar, $SO_2$, $SO_3$, NO, $NO_2$, HCl, Hg, and traces of other components that can be derived from the combustion process (e.g., particulates, such as ash or liquefied ash), including further combustibles. As described in greater detail below, the combustion process can be controlled such that the nature of the fluid stream can be either reducing or oxidizing, which can provide particularly described benefits.

The systems and methods of the invention can incorporate one or more combustors useful for combustion of a suitable fuel, as described herein. Preferably, at least one combustor used according to the present invention is a high efficiency combustor capable of providing substantially complete combustion of a fuel at a relatively high combustion temperature. High temperature combustion can be particularly useful to provide for substantially complete combustion of the fuel and thus maximize efficiency. In various embodiments, high temperature combustion can mean combustion at a temperature of at least about 1,200° C., at least about 1,300° C., at least about 1,400° C., at least about 1,500° C., at least about 1,600° C., at least about 1,750° C., at least about 2,000° C., at least about 2,500° C., or at least about 3,000° C. In further embodiments, high temperature combustion can mean combustion at a temperature of about 1,200° C. to about 5,000° C., about 1,500° C. to about 4,000° C., about 1,600° C. to about 3,500° C., about 1,700° C. to about 3,200° C., about 1,800° C. to about 3,100° C., about 1,900° C. to about 3,000° C., or about 2,000° C. to about 3,000° C.

In certain embodiments, high temperature combustion according to the invention may be carried out using a transpiration cooled combustor. One example of a transpiration cooled combustor that may be used in the invention is described in U.S. patent application Ser. No. 12/714,074, filed Feb. 26, 2010, the disclosure of which is incorporated herein by reference in its entirety. In some embodiments, a transpiration cooled combustor useful according to the invention may include one or more heat exchange zones, one or more cooling fluids, and one or more transpiration fluids.

The use of a transpiration cooled combustor according to the present invention is particularly advantageous over the known art around fuel combustion for power production. For example, the use of transpiration cooling can be useful to prevent corrosion, fouling, and erosion in the combustor. This further allows the combustor to work in a sufficiently high temperature range to afford complete or at least substantially complete combustion of the fuel that is used. These, and further advantages, are further described herein.

In one particular aspect, a transpiration cooled combustor useful according to the invention can include a combustion chamber at least partially defined by a transpiration member, wherein the transpiration member is at least partially surrounded by a pressure containment member. The combustion chamber can have an inlet portion and an opposing outlet portion. The inlet portion of the combustion chamber can be configured to receive the carbon containing fuel to be combusted within the combustion chamber at a combustion temperature to form a combustion product. The combustion chamber can be further configured to direct the combustion product toward the outlet portion. The transpiration member can be configured to direct a transpiration substance therethrough toward the combustion chamber for buffering interaction between the combustion product and the transpiration member. In addition, the transpiration substance may be introduced into the combustion chamber to achieve a desired outlet temperature of the combustion product. In particular embodiments, the transpiration substance can at least partially comprise the circulating fluid.

The walls of the combustion chamber may be lined with a layer of porous material through which is directed and flows the transpiration substance, such as $CO_2$ and/or $H_2O$.

In still further aspects, the inner transpiration member 2332 may extend from the inlet portion 222A to the outlet portion 222B of the transpiration member 230. In some instances, the perforated/porous structure of the inner transpiration member 2332 may extend substantially completely (axially) from the inlet portion 222A to the outlet portion 222B such that the transpiration fluid 210 is directed into substantially the entire length of the combustion chamber 222. That is, substantially the entirety of the inner transpiration member 2332 may be configured with a perforated/porous structure such that substantially the entire length of the combustion chamber 222 is transpiration-cooled. More particularly, in some aspects, the cumulative perforation/pore area may be substantially equal to the surface area of the inner transpiration member 2332. In still other aspects, the perforations/pores may be spaced apart at an appropriate density such that substantially uniform distribution of the transpiration substance from the inner transpiration member 2332 into the combustion chamber 222 is achieved (i.e., no "dead spots" where the flow or presence of the transpiration substance 210 is lacking). In one example, a square inch of the inner transpiration member 2332 may include an array of perforations/pores on the order of 250× 250 per square inch, so as to provide about 62,500 pores/in$^2$, with such perforations/pores being spaced about 0.004 inches (about 0.1 mm) apart. The ratio of pore area to total wall area (% porosity) may be for example about 50%. The pore array may be varied over a wide range to adapt to other system design parameters, such as the desired pressure drop versus flow rate across the transpiration member. Array sizes of about 10×10 to about 10,000×10,000 per inch with porosity percentages of about 10% to about 80% can utilized in some examples.

The flow of the transpiration substance through this porous transpiration layer, and optionally through additional provisions, can be configured to achieve a desired total exit fluid stream outlet temperature from the combustor. In some embodiments, as further described herein, such temperature can be in the range of about 500° C. to about 2,000° C. This flow may also serve to cool the transpiration member to a temperature below the maximum allowable operational temperature of the material forming the transpiration member. The transpiration substance may also serve to prevent impingement of any liquid or solid ash materials or other contaminants in the fuel which might corrode, foul, or otherwise damage the walls. In such instances, it may be desirable to use a material for the transpiration member with a reasonable thermal conductivity so that incident radiant heat can be conducted radially outwards through the porous transpiration member and then be intercepted by convective heat transfer from the surfaces of the porous layer structure to the fluid passing radially inwards through the transpiration layer. Such a configuration may allow the subsequent part of the stream directed through the transpiration member to be heated to a temperature in a desirable range, such as about 500° C. to about 1,000° C., while simultaneously maintaining the temperature of the porous transpiration member within the design range of the material used therefor. Suitable materials for the porous transpiration member may include, for example, porous ceramics, refractory metal fiber mats, hole-drilled cylindrical sections, and/or sintered metal layers or sintered metal powders. A second function of the transpiration member may be to ensure a substantially even radially inward flow of transpiration fluid, as well as longitudinally along the combustor, to achieve good mixing between the transpiration fluid stream and the combustion product while promoting an even axial flow of along the length of the combustion chamber. A third function of the transpiration member can be to achieve a velocity of diluent fluid radially inward so as to provide a buffer for or otherwise intercept solid and/or liquid particles of ash or other contaminants within the combustion products from impacting the surface of the transpiration layer and causing blockage or other damage. Such a factor may only be of importance, for example, when combusting a fuel, such as coal, having a residual inert non-combustible residue. The inner wall of the combustor pressure vessel surrounding the transpiration member may also be insulated to isolate the high temperature transpiration fluid stream within the combustor.

One embodiment of a combustor apparatus capable of use according to the present invention is schematically illustrated in FIG. 1, the combustor apparatus being generally indicated by the numeral 220. In this example, the combustor apparatus 220 may be configured to combust a particulate solid such as coal to form a combustion product, though any other suitable combustible carbon containing material, as disclosed herein, may also be used as a fuel. The combustion chamber 222 may be defined by a transpiration member 230, which is configured to direct a transpiration fluid therethrough into the combustion chamber 222 (i.e., to facilitate transpiration cooling and/or to buffer interaction between the combustion product and the transpiration member 230). One skilled in the art will appreciate that the transpiration member 230 may be substantially cylindrical, so as to define a substantially cylindrical combustion chamber 222 having an inlet portion 222A and an opposing outlet portion 222B. The transpiration member 230 may be at least partially surrounded by a pressure containment member 2338. The inlet portion 222A of the combustion chamber 222 may be configured to receive a fuel mixture from a mixing arrangement, generally indicated by the numeral 250. In other embodiments, such mixing arrangement may be absent, and one or more of the materials input into the combustor may be separately added via independent inlets. According to particular embodiments, the fuel mixture can be combusted within the combustion chamber 222 at a particular combustion temperature to form a combustion product, wherein the combustion chamber 222 is further configured to direct the combustion product toward the outlet portion 222B. A heat removal device 2350 (see, e.g., FIG. 2) may be associated with the pressure containment member 2338 and configured to control a temperature thereof. In particular instances, the heat removal device 2350 may comprise a heat transfer jacket at least partially defined by a wall 2336 opposing the pressure containment member 2338, wherein a liquid may be circulated in water-circulating jackets 2337 defined therebetween. In one embodiment, the circulated liquid may be water.

In one particular aspect, the porous inner transpiration member 2332 is thus configured to direct the transpiration fluid into the combustion chamber 222, such that the transpiration substance 210 enters the combustion chamber 222 at a substantially right angle (90°) with respect to the inner surface of the inner transpiration member 2332. Among other advantages, the introduction of the transpiration substance 210 at the substantially right angle with respect to the inner transpiration member 2332 may facilitate or otherwise enhance the effect of directing slag liquid or solid droplets or other contaminants or hot combustion fluid vortices away from the inner surface of the inner transpiration member 2332. The lack of contact between the slag liquid or solid droplets may prevent the coalescence of said droplets into large droplets or masses, which is known in the prior art to occur upon contact between droplets or particles and solid walls. The introduction of the transpiration substance 210 at the substantially right angle with respect to the inner transpiration member 2332 may facilitate or otherwise enhance the effect of preventing the formation of combustion fluid vortices with sufficient velocity perpendicular to and in proximity to the inner transpiration member which may impinge on and damage the inner transpiration member. In such instances, the outer transpiration member 2331, the pressure containment member 2338, the heat transfer jacket 2336 and/or the insulation layer 2339 may be configured, either individually or in combination, to provide a "manifold" effect (i.e., to provide a substantially uniformly distributed supply) with regard to the delivery of the transpiration substance/fluid 210 to and through the inner transpiration member 2332 and into the combustion chamber 222. That is, a substantially uniform supply (in terms of flow rate, pressure, or any other suitable and appropriate measure) of the transpiration substance 210 into the combustion chamber 222 may be achieved by configuring the outer transpiration member 2331, the pressure containment member 2338, the heat transfer jacket 2336 and/or the insulation layer 2339 to provide a uniform supply of the transpiration substance 210 to the inner transpiration member 2332, or the supply of the transpiration substance 210 about the outer surface of the inner transpiration member 2332 may be particularly customized and configured such that a substantially uniform distribution of the transpiration substance 210 within the combustion chamber 222 is achieved. Such substantially uniform distribution may prevent the formation of hot combustion fluid vortices which may otherwise form by interaction of non-uniform transpiration flow with the combustion fluid flow and which vortices may impinge on and damage the inner transpiration member.

The mixing arrangement 250 (when present) can be configured to mix a carbonaceous fuel 254 with enriched oxygen 242 and a circulating fluid 236 to form a fuel mixture 200. The carbonaceous fuel 254 may be provided in the form of a solid carbonaceous fuel, a liquid carbonaceous fuel, and/or a gaseous carbonaceous fuel. The enriched oxygen 242 may be oxygen having a molar purity of greater than about 85%. The enriched oxygen 242 may be supplied, for example, by any air separation system/technique known in the art, such as, for example, a cryogenic air separation process, or a high temperature ion transport membrane oxygen separation process (from air), could be implemented. The circulating fluid 236 may be carbon dioxide, as described herein. In instances where the carbonaceous fuel 254 is a particulate solid, such as powdered coal 254A, the mixing arrangement 250 may be further configured to mix the particulate solid carbonaceous fuel 254A with a fluidizing substance 255. According to one aspect, the particulate solid carbonaceous fuel 254A may have an average particle size of between about 50 microns and about 200 microns. According to yet another aspect, the fluidizing substance 255 may comprise water and/or liquid $CO_2$ having a density of between about 450 kg/m$^3$ and about 1100 kg/m$^3$. More particularly, the fluidizing substance 255 may cooperate with the particulate solid carbonaceous fuel 254A to form a slurry 250A having, for example, between about 25 weight % and about 55 weight % of the particulate solid carbonaceous fuel 254A. Though the oxygen 242 is shown in FIG. 1 as being mixed with the fuel 254 and the circulating fluid 236 prior to introduction to the combustion chamber 222, one skilled in the art will appreciate that, in some instances, the oxygen 242 may be separately introduced into the combustion chamber 222, as necessary or desired.

The mixing arrangement 250, in some aspects, may comprise, for example, an array of spaced apart injection nozzles (not shown) arranged about an end wall 223 of the transpiration member 230 associated with the inlet portion 222A of the cylindrical combustion chamber 222. Injecting the fuel/fuel mixture into the combustion chamber 222 in this manner may provide, for example, a large surface area of the injected fuel mixture inlet stream which may, in turn, facilitate rapid heat transfer to the injected fuel mixture inlet stream by radiation. The temperature of the injected fuel mixture may thus be rapidly increased to the ignition temperature of the fuel and may thus result in a compact combustion. The injection velocity of the fuel mixture may be in the range, for example, of between about 10 msec and about 40 msec, though these values may depend on many factors, such as the configuration of the particular injection nozzles. Such an injection arrangement may take many different forms. For example, the injection arrangement may comprise an array of holes, for instance, in the range of between about 0.5 mm and about 3 mm diameter, wherein the fuel injected would be injected therethrough at a velocity of between about 10 m/s and about 40 m/s.

As more particularly shown in FIG. 2, the combustion chamber 222 can be defined by the transpiration member 230, which may be at least partially surrounded by a pressure containment member 2338. In some instances, the pressure containment member 2338 may further be at least partially surrounded by a heat transfer jacket 2336, wherein the heat transfer jacket 2336 can cooperate with the pressure containment member 2338 to define one or more channels 2337 therebetween, through which a low pressure water stream may be circulated. Through an evaporation mechanism, the circulated water may thus be used to control and/or maintain a selected temperature of the pressure containment member 2338, for example, in a range of about 100° C. to about 250° C. In some aspects, an insulation layer 2339 may be disposed between the transpiration member 230 and the pressure containment member 2338.

In some instances, the transpiration member 230 may comprise, for example, an outer transpiration member 2331 and an inner transpiration member 2332, the inner transpiration member 2332 being disposed opposite the outer transpiration member 2331 from the pressure containment member 2338, and defining the combustion chamber 222. The outer transpiration member 2331 may be comprised of any suitable high temperature-resistant material such as, for example, steel and steel alloys, including stainless steel and nickel alloys. In some instances, the outer transpiration member 2331 may be configured to define first transpiration fluid supply passages 2333A extending therethrough from the surface thereof adjacent to the insulation layer 2339 to the surface thereof adjacent to the inner transpiration member 2332. The first transpiration fluid supply passages 2333A may, in some instances, correspond to second transpiration fluid supply passages 2333B defined by the pressure containment member 2338, the heat transfer jacket 2336 and/or the insulation layer 2339. The first and second transpiration fluid supply passages 2333A, 2333B may thus be configured to cooperate to direct a transpiration fluid therethrough to the inner transpiration member 2332. In some instances, as shown, for example, in FIG. 1, the transpiration fluid 210 may comprise the circulating fluid 236, and may be obtained from the same source associated therewith. The first and second transpiration fluid supply passages 2333A, 2333B may be insulated, as necessary, for delivering the transpiration fluid 210 (i.e., $CO_2$) in sufficient supply and at a sufficient pressure such that the transpiration fluid 210 is directed through the inner transpiration member 2332 and into the combustion chamber 222. Such measures involving the transpiration member 230 and associated transpiration fluid 210, as disclosed herein, may allow the combustor apparatus 220 to operate at the relatively high pressures and relatively high temperatures otherwise disclosed herein.

In this regard, the inner transpiration member 2332 may be comprised of, for example, a porous ceramic material, a perforated material, a laminate material, a porous mat comprised of fibers randomly orientated in two dimensions and ordered in the third dimension, or any other suitable material or combinations thereof exhibiting the characteristics required thereof as disclosed herein, namely multiple flow passages or pores or other suitable openings 2335 for receiving and directing the transpiration fluid through the inner transpiration member 2332. Non-limiting examples of porous ceramic and other materials suitable for such transpiration-cooling systems include aluminum oxide, zirconium oxide, transformation-toughened zirconium, copper, molybdenum, tungsten, copper-infiltrated tungsten, tungsten-coated molybdenum, tungsten-coated copper, various high temperature nickel alloys, and rhenium-sheathed or coated materials. Sources of suitable materials include, for example CoorsTek, Inc., (Golden, Colo.) (zirconium); UltraMet Advanced Materials Solutions (Pacoima, Calif.) (refractory metal coatings); Orsam Sylvania (Danvers, Mass.) (tungsten/copper); and MarkeTech International, Inc. (Port Townsend, Wash.) (tungsten). Examples of perforated materials suitable for such transpiration-cooling systems include all of the above materials and suppliers (where the perforated end structures may be obtained, for example, by perforating an initially nonporous structure using methods known in the manufacturing art). Examples of suitable laminate materials include all of the above materials and suppliers (where the laminate end structures may be obtained, for example, by laminating nonporous or partially porous structures in such a manner as to achieve the desired end porosity using methods known in the manufacturing art).

FIGS. 3A and 3B illustrate that, in one aspect of a combustor apparatus 220, the structure defining the combustion chamber 222 may be formed through a "hot" interference fit between the transpiration member 230 and the surrounding structure, such as the pressure containment member 2338 or the insulation layer 2339 disposed between the transpiration member 230 and the pressure containment member 2338. For example, when relatively "cold," the transpiration member 230 may be dimensioned to be smaller, radially and/or axially, with respect to the surrounding pressure containment member 2338. As such, when inserted into the pressure containment member 2338, a radial and/or axial gap may be present therebetween (see, e.g., FIG. 3A). Of course, such dimensional differences may facilitate insertion of the transpiration member 230 into the pressure containment member 2338. However, when heated, for example, toward the operational temperature, the transpiration member 230 may be configured to expand radially and/or axially to reduce or eliminate the noted gaps (see, e.g., FIG. 3B). In doing so, an interference axial and/or radial fit may be formed between the transpiration member 230 and the pressure containment member 2338. In instances involving a transpiration member 230 with an outer transpiration member 2331 and an inner transpiration member 2332, such an interference fit may place the inner transpiration member 2332 under compression. As such, suitable high temperature resistant brittle materials, such as a porous ceramic, may be used to form the inner transpiration member 2332.

With the inner transpiration member 2332 thus configured, the transpiration substance 210 may comprise, for example, carbon dioxide (i.e., from the same source as the circulating fluid 236) directed through the inner transpiration member 2332 such that the transpiration substance 210 forms a buffer layer 231 (i.e., a "vapor wall") immediately adjacent to the inner transpiration member 2332 within the combustion chamber 222, wherein the buffer layer 231 may be configured to buffer interaction between the inner transpiration member 2332 and the liquefied incombustible elements and heat associated with the combustion product. That is, in some instances, the transpiration fluid 210 can be delivered through the inner transpiration member 2332, for example, at least at the pressure within the combustion chamber 222, wherein the flow rate of the transpiration fluid 210 (i.e., $CO_2$ stream) into the combustion chamber 222 is sufficient for the transpiration fluid 210 to mix with and cool the combustion products to form an exit fluid mixture at a sufficient temperature with respect to the inlet requirement of the subsequent downstream process (i.e., a turbine may require an inlet temperature, for instance, of about 1,225° C.), but wherein the exit fluid mixture remains sufficiently high to maintain slag droplets or other contaminants in the fuel in a fluid or liquid state. The liquid state of the incombustible elements of the fuel may facilitate, for example, separation of such contaminants from the combustion product in liquid form, preferably in a free flowing, low viscosity form, which will be less likely to clog or otherwise damage any removal system implemented for such separation. In practice, such requirements may depend on various factors such as the type of solid carbonaceous fuel (i.e., coal) employed and the particular characteristics of the slag formed in the combustion process. That is, the combustion temperature within the combustion chamber 222 can be such that any incombustible elements in the carbonaceous fuel are liquefied within the combustion product.

In particular aspects, the porous inner transpiration member 2332 is thus configured to direct the transpiration fluid and into the combustion chamber 222 in a radially inward manner so as to form a fluid barrier wall or buffer layer 231 about the surface of the inner transpiration member 2332 defining the combustion chamber 222 (see, e.g., FIG. 2). The surface of the inner transpiration member 2332 is also heated by combustion product. As such, the porous inner transpiration member 2332 may be configured to have a suitable thermal conductivity such that the transpiration fluid 210 passing through the inner transpiration member 2332 is heated, while the porous inner transpiration member 2332 is simultaneously cooled, resulting in the temperature of the surface of the inner transpiration member 2332 defining the combustion chamber 222 being, for example, about 1,000° C. in the region of the highest combustion temperature. The fluid barrier wall or buffer layer 231 formed by the transpiration fluid 210 in cooperation with the inner transpiration member 2332 thus buffers interaction between the inner transpiration member 2332 and the high temperature combustion products and the slag or other contaminant particles and, as such, buffers the inner transpiration member 2332 from contact, fouling, or other damage. Further, the transpiration fluid 210 may be introduced into the combustion chamber 222 via the inner transpiration member 2332 in such a manner so as to regulate an exit mixture of the transpiration fluid 210 and the combustion product about the outlet portion 222B of the combustion chamber 222 at a desired temperature (e.g., about 500° C. to about 2,000° C.).

In specific embodiments, the combustor apparatus 220 thus may be configured as a high efficiency, transpiration-cooled combustor apparatus capable of providing relatively complete combustion of a fuel 254 at a relatively high operating temperature as described herein. Such a combustor apparatus 220 may, in some instances, implement one or more cooling fluids, and/or one or more transpiration fluids 210. In association with the combustor apparatus 220, additional components may also be implemented. For example, an air separation unit may be provided for separating $N_2$ and $O_2$, and a fuel injector device may be provided for receiving $O_2$ from the air separation unit and combining the $O_2$ with a $CO_2$ circulating fluid, and a fuel stream comprising a gas, a liquid, a supercritical fluid, or a solid particulate fuel slurried in a high density $CO_2$ fluid.

In another aspect, the transpiration-cooled combustor apparatus 220 may include a fuel injector for injecting a pressurized fuel stream into the combustion chamber 222 of the combustor apparatus 220, wherein the fuel stream may comprise a processed carbonaceous fuel 254, a fluidizing medium 255 (which may comprise the circulating fluid 236, as discussed herein), and oxygen 242. The oxygen (enriched) 242 and the $CO_2$ circulating fluid 236 can be combined as a homogeneous supercritical mixture. The quantity of oxygen present may be sufficient to combust the fuel and produce combustion products having a desired composition. The combustor apparatus 220 may also include a combustion chamber 222, configured as a high pressure, high temperature combustion volume, for receiving the fuel stream, as well as a transpiration fluid 210 entering the combustion volume through the walls of a porous transpiration member 230 defining the combustion chamber 222. The feed rate of the transpiration fluid 210 may be used to control the combustor apparatus outlet portion/turbine inlet portion temperature to a desired value and/or to cool the transpiration member 230 to a temperature compatible with the material forming the transpiration member 230. The transpiration fluid 210 directed through the transpiration member 230 provides a fluid/buffer layer at the surface of the transpiration member 230 defining the combustion chamber 222, wherein the fluid/buffer layer may prevent particles of ash or liquid slag resulting from certain fuel combustion from interacting with the exposed walls of the transpiration member 230.

The combustion chamber 222 may further be configured such that the fuel stream (and the circulating fluid 236) can be injected or otherwise introduced into the combustion chamber 222 at a pressure greater than the pressure at which combustion occurs. The combustor apparatus 220 may include a pressure containment member 2338 at least partially surrounding the transpiration member 230 defining the combustion chamber 230, wherein an insulating member 2339 can be disposed between the pressure containment member 2338 and the transpiration member 230. In some instances, a heat removal device 2350, such as a jacketed water cooling system defining water-circulating jackets 2337, may be engaged with the pressure containment member 2338 (i.e., externally to the pressure containment member 2338 forming the "shell" of the combustor apparatus 220). The transpiration fluid 210 implemented in connection with the transpiration member 230 of the combustor apparatus 220 can be, for example, $CO_2$ mixed with minor quantities of $H_2O$ and/or an inert gas, such as $N_2$ or argon. The transpiration member 230 may comprise, for example, a porous metal, a ceramic, a composite matrix, a layered manifold, any other suitable structure, or combinations thereof. In some aspects, the combustion within the combustion chamber 222 can produce a high pressure, high temperature combustion product stream, which may be subsequently directed to a power-producing apparatus, such as a turbine, for expansion in relation thereto, as more fully described herein.

The relatively high pressures implemented by embodiments of a combustor apparatus as disclosed herein, may function to concentrate the energy produced thereby to a relatively high intensity in a minimal volume, essentially resulting in a relatively high energy density. The relatively high energy density allows downstream processing of this energy to be performed in a more efficient manner than at lower pressures, and thus provides a viability factor for the technology. Aspects of the present disclosure may thus provide an energy density at orders of magnitude greater than existing power plants (i.e., by 10-100 fold). The higher energy density increases the efficiency of the process, but also reduces the cost of the equipment needed to implement the energy transformation from thermal energy to electricity, by reducing the size and mass of the equipment, thus the cost of the equipment.

As otherwise discussed herein, the combustor apparatus used in the inventive methods and systems can be useful for combustion of a variety of different carbon containing fuel sources. In specific embodiments, the carbon containing fuel can be substantially completely combusted such that no liquid or solid incombustible materials are included in the combustion product stream. In some embodiments, however, a solid carbon containing fuel (e.g., coal) that may be used in the invention may result in the presence of incombustible materials. In specific embodiments, the combustor apparatus may include the capability of achieving a combustion temperature which causes the incombustible elements in the solid carbon containing fuel to be liquefied during the combustion process. In such instances, provisions for removing the liquefied incombustible elements may be applied. Removal may be accomplished, for example, using cyclone separators, impingement separators, or beds of graded refractory granular filters arranged in an annular configuration, or combinations thereof. In particular embodiments, the droplets may be removed from the high temperature circulating fluid stream by a series of cyclone separators such as, for example, a separator apparatus 2340 as shown in FIG. 4. Generally, aspects of such a cyclonic separator implemented by the present disclosure may comprise a plurality of serially-arranged centrifugal separator devices 100, including an inlet centrifugal separator device 100A configured to receive the combustion product/exit fluid stream and the liquefied incombustible elements associated therewith, and an outlet centrifugal separator device 100B configured to exhaust the combustion product/exit fluid stream having the liquefied incombustible elements substantially removed therefrom. Each centrifugal separator device 100 includes a plurality of centrifugal separator elements or cyclones 1 operably arranged in parallel about a central collector pipe 2, wherein each centrifugal separation element, or cyclone 1, is configured to remove at least a portion of the liquefied incombustible elements from the combustion product/exit fluid stream, and to direct the removed portion of the liquefied incombustible elements to a sump 20. Such a separator apparatus 2340 may be configured to operate at an elevated pressure and, as such, may further comprise a pressure-containing housing 125 configured to house the centrifugal separator devices and the sump. According to such aspects, the pressure-containing housing 125 may be an extension of the pressure containment member 2338 also surrounding the combustor apparatus 220, or the pressure-containing housing 125 may be a separate member capable of engaging the pressure containment member 2338 associated with the combustor apparatus 220. In either instance, due to the elevated temperature experienced by the separator apparatus 2340 via the exit fluid stream, the pressure-containing housing 125 may also include a heat-dispersion system, such as a heat transfer jacket having a liquid circulated therein (not shown), operably engaged therewith for removing heat therefrom. In some aspects, a heat recovery device (not shown) may be operably engaged with the heat transfer jacket, wherein the heat recovery device may be configured to receive the liquid circulated in the heat transfer jacket and to recover thermal energy from that liquid.

In particular embodiments, the (slag removal) separator apparatus 2340, shown in FIG. 4, can be configured to be serially disposed with the combustor apparatus 220 about the outlet portion 222B thereof for receiving the exit fluid stream/combustion products therefrom. The transpiration-cooled exit fluid stream from the combustor apparatus 220, with the liquid slag (incombustible elements) droplets therein, can be directed to enter a central collector provision 2A of the inlet centrifugal separator device 100A via a conical reducer 10. In one aspect, the separator apparatus 2340 may include three centrifugal separator devices 100A, 100B, 100C (though one skilled in the art will appreciate that such a separator apparatus may include one, two, three, or more centrifugal separator devices, as necessary or desired). In this instance, the three centrifugal separator devices 100A, 100B, 100C operably arranged in series provides a 3 stage cyclonic separation unit. Each centrifugal separator device includes, for example, a plurality of centrifugal separator elements (cyclones 1) arranged about the circumference of the corresponding central collector pipe 2. The central collector provisions 2A and the central collector pipes 2 of the inlet centrifugal separator device 100A, and the medial centrifugal separator device 100C are each sealed at the outlet end thereof. In those instances, the exit fluid stream is directed into branch channels 11 corresponding to each of the centrifugal separator elements (cyclones 1) of the respective centrifugal separator device 100. The branch channels 11 are configured to engage the inlet end of the respective cyclone 1 to form a tangential inlet therefor (which causes, for instance, the exit fluid stream entering the cyclone 1 to interact with the wall of the cyclone 1 in a spiral flow). The outlet channel 3 from each cyclone 1 is then routed into the inlet portion of the central collector pipe 2 of the respective centrifugal separator device 100. At the outlet centrifugal separator device 100B, the exit fluid stream (having the incombustible elements substantially separated therefrom) is directed from the central collector pipe of the outlet centrifugal separator device 100B and via a collector pipe 12 and an outlet nozzle 5, such that the "clean" exit fluid stream can then be directed to a subsequent process, such as that associated with the transformation apparatus. The exemplary three stage cyclonic separation arrangement thus allows removal of slag down to, for example, below 5 ppm by mass in the exit fluid stream.

At each stage of the separator apparatus 2340, the separated liquid slag is directed from each of the cyclones 1 via outlet tubes 4 which extend toward a sump 20. The separated liquid slag is then directed into an outlet nozzle or pipe 14 extending from the sump 20 and the pressure-containing housing 125 for removal and/or recovery of components therefrom. In accomplishing the removal of the slag, the liquid slag may be directed though a water-cooled section 6 or otherwise through a section having a high pressure, cold water connection, wherein interaction with the water causes the liquid slag to solidify and/or granulate. The mixture of solidified slag and water may then be separated in a vessel (collection provision) 7 into a slag/water fluid mixture which can be removed, particularly following pressure reduction, through a suitable valve 9, while any residual gas may be removed via a separate line 8. A pair of vessels with associated systems operating in sequence can allow for continuous operation of the system in some embodiments.

Since the separator apparatus 2340 can be implemented in conjunction with the relatively high temperature combustion product stream (i.e., at a temperature sufficient to maintain the incombustible elements in liquid form with a relatively low viscosity), it may be desirable, in some instances, that surfaces of the separator apparatus 2340 exposed to one of the combustion product/exit fluid stream and the liquefied incombustible elements associated therewith be comprised of a material configured to have at least one of a high temperature resistance, a high corrosion resistance, and a low thermal conductivity. Examples of such materials may include zirconium oxide and aluminum oxide, though such examples are not intended to be limiting in any manner. As such, in certain aspects, the separator apparatus 2340 can be configured to substantially remove the liquefied incombustible elements from the combustion product/exit fluid stream and to maintain the incombustible elements in a low viscosity liquid form at least until removal thereof from the sump 20. Of course, in embodiments where a non-solid fuel is used and incombustible materials are not included in the combustion product stream, the addition of the slag separator can be unnecessary.

In some embodiments, the separator apparatus 2340 may be used to separate particulate solid ash residue from the combustion of any fuel which produces an incombustible solid residue, such as coal. For example, the coal could be ground to a desired size (e.g., a size such that less than 1% by weight of the particulate or powdered coal comprises particles greater than 100 μm in size) and slurried with liquid $CO_2$. In specific embodiments, the liquid $CO_2$ could be at a temperature of about −40° C. to about −18° C. The slurry may comprise about 40% to about 60% by weight of coal. The slurry then can be pressurized to the required combustion pressure. Referring to FIG. 1, the recycle stream 236 could be split in relation to the mode of entry into the combustor 220. A first portion (stream 236a) could be input to the combustor 220 via the mixing arrangement 250, and a second portion (stream 236b) could be input to the combustor 220 by being passed through the transpiration cooling layer 230. As described above it is possible to operate the burner 220 with a ratio of $O_2$ to fuel which results in the formation of a reducing gas mixture (e.g., comprising $H_2$, $CH_4$, CO, $H_2S$, and/or $NH_3$). The portion of stream 236 entering the combustor through the transpiration cooling layer 230 can be used to cool the mixture of the combustion gases and the $CO_2$ circulating fluid to a temperature substantially below the ash solidification temperature (e.g., in the range of about 500° C. to about 900° C. The total gas stream 5 from the separator apparatus 2340 can be passed through a filtration unit, which reduces the residual solid ash particulate level to a very low value (e.g., below about 2 mg/m$^3$ of gas passing through the filter). This cleaned gas can then be combusted in a second combustor where it can be diluted with a further portion of the recycle fluid stream 236. In such embodiments, the recycle fluid stream 236 could be apportioned between the two combustors, as necessary.

Any carbon containing material may be used as a fuel according to the present invention. In particular, because of the high pressures and high temperatures maintained by the oxygen-fueled combustor apparatus used in the inventive methods and systems, useful fuels include, but are not limited to, various grades and types of coal, wood, oil, fuel oil, natural gas, coal-based fuel gas, tar from tar sands, bitumen, biomass, algae, graded combustible solid waste refuse, asphalt, used tires, diesel, gasoline, jet fuel (JP-5, JP-4), gases derived from the gasification or pyrolysis of hydro-carbonaceous material, ethanol, solid and liquid biofuels. This may be considered an important departure from prior art systems and methods. For example, known art systems for combustion of solid fuels, such as coal, require considerably different designs than systems for combustion of non-solid fuels, such as natural gas.

The fuels can be suitably processed to allow for injection into the combustion apparatus at sufficient rates and at pressures above the pressure within the combustion chamber. Such fuels may be in liquid, slurry, gel, or paste form with appropriate fluidity and viscosity at ambient temperatures or at elevated temperatures. For example, the fuel may be provided at a temperature of about 30° C. to about 500° C., about 40° C. to about 450° C., about 50° C. to about 425° C., or about 75° C. to about 400° C. Any solid fuel materials may be ground or shredded or otherwise processed to reduce particles sizes, as appropriate. A fluidization or slurrying medium can be added, as necessary, to achieve a suitable form and to meet flow requirements for high pressure pumping. Of course, a fluidization medium may not be needed depending upon the form of the fuel (i.e., liquid or gas). Likewise, the circulated circulating fluid may be used as the fluidization medium, in some embodiments.

Transpiration fluids suitable in a combustor useful according to the invention can include any fluid capable of flowing in sufficient quantity and pressure through the inner liner to form the vapor wall. In the present embodiment, $CO_2$ can be an ideal transpiration fluid in that the vapor wall formed has good thermal insulating properties as well as visible and UV light absorption properties. $CO_2$ can be used as a supercritical fluid. Other examples of transpiration fluid include $H_2O$, cooled combustion product gases recycled from downstream, oxygen, hydrogen, natural gas, methane, and other light hydrocarbons. Fuels may especially be used as transpiration fluids during startup of the combustor to achieve appropriate operating temperatures and pressures in the combustor prior to injection of the main fuel source. Fuels may also be used as transpiration fluids to adjust the operating temperature and pressure of the combustor during switchover between main fuel sources, such as when switching from coal to biomass as the primary fuel. In some embodiments, two or more transpiration fluids can be used. Further, different transpiration fluids can be used in different positions along the combustor. For example, a first transpiration fluid can be used in a high temperature heat exchange zone and a second transpiration fluid can be used in a lower temperature heat exchange zone. The transpiration fluid can be optimized for the temperature and pressure conditions of the combustion chamber where the transpiration fluid forms the vapor wall. In the present example the transpiration fluid is preheated recycle $CO_2$.

In one aspect, the present invention provides methods of power generation. Specifically, the methods make use of a $CO_2$ circulating fluid that is preferably recycled through the method, as described herein. The inventive methods also make use of high efficiency combustors, such as a transpiration cooled combustor, as described above. In certain embodiments, the methods generally can be described in relation to the flow diagram shown in FIG. 5. As seen therein, a combustor 220 is provided, and various inputs are provided therein. A carbon containing fuel 254 and $O_2$ 242 (as necessary) can be introduced into the combustor 220 along with a circulating fluid 236 ($CO_2$ in the present embodiment). A mixing arrangement 250 illustrated by a dashed line indicates that this component is optionally present. Specifically, any combination of two or all three materials (fuel, $O_2$, and $CO_2$ circulating fluid) may be combined in the mixing arrangement 250 prior to introduction into the combustor 220.

In various embodiments, it can be desirable for the materials entering the combustor to exhibit specific physical characteristics that can facilitate desirable, efficient operation of the power generation method. For example, in certain embodiments, it can be desirable for the $CO_2$ in the $CO_2$ circulating fluid to be introduced into the combustor at a defined pressure and/or temperature. Specifically, it can be beneficial for the $CO_2$ introduced into the combustor to have a pressure of at least about 8 MPa. In further embodiments, the $CO_2$ introduced into the combustor can be at a pressure of at least about 10 MPa, at least about 12 MPa, at least about 14 MPa, at least about 15 MPa, at least about 16 MPa, at least about 18 MPa, at least about 20 MPa, at least about 22 MPa, at least about 24 MPa, or at least about 25 MPa. In other embodiments, the pressure can be about 8 MPa to about 50 MPa, about 12 MPa to about 50 MPa, about 15 MPa to about 50 MPa, about 20 MPa to about 50 MPa, about 22 MPa to about 50 MPa, about 22 MPa to about 45 MPa, about 22 MPa to about 40 MPa, about 25 MPa to about 40 MPa, or about 25 MPa to about 35 MPa. Further, it can be beneficial for the $CO_2$ introduced into the combustor to have a temperature of at least about 200° C. In further embodiments, the $CO_2$ introduced into the combustor can be at a temperature of at least about 250° C., at least about 300° C., at least about 350° C., at least about 400° C., at least about 450° C., at least about 500° C., at least about 550° C., at least about 600° C., at least about 650° C., at least about 700° C., at least about 750° C., at least about 800° C., at least about 850° C., or at least about 900° C.

In some embodiments, it can be desirable for the fuel introduced into the combustor to be provided under specific conditions. For example, in certain embodiments, it can be desirable for the carbon containing fuel to be introduced into the combustor at a defined pressure and/or temperature. In some embodiments, the carbon containing fuel can be introduced into the combustor under conditions that are identical or substantially similar to the conditions of the $CO_2$ circulating fluid. The phrase "substantially similar conditions" can mean a condition parameter that is within 5%, within 4%, within 3%, within 2%, or within 1% of the referenced condition parameter described herein (e.g., the condition parameter for the $CO_2$ circulating fluid). In certain embodiments, the carbon containing fuel may be mixed with the $CO_2$ circulating fluid prior to introduction into the combustor. In such embodiments, it would be expected that the carbon containing fuel and the $CO_2$ circulating fluid would be under identical or substantially similar conditions (which specifically may encompass the conditions described in relation to the $CO_2$ circulating fluid). In other embodiments, the carbon containing fuel may be introduced to the combustor separately from the $CO_2$ circulating fluid. In such cases, the carbon containing fuel still may be introduced at a pressure as described in relation to the $CO_2$ circulating fluid. In some embodiments, it may be useful to maintain the carbon containing fuel at a temperature that is different than the temperature of the $CO_2$ circulating fluid prior to introduction to the combustor. For example, the carbon containing fuel could be introduced to the combustor at a temperature of about 30° C. to about 800° C., about 35° C. to about 700° C., about 40° C. to about 600° C., about 45° C. to about 500° C., about 50° C. to about 400° C., about 55° C. to about 300° C., about 60° C. to about 200° C., about 65° C. to about 175° C., or about 70° C. to about 150° C.

In other embodiments, it can be desirable for the $O_2$ introduced into the combustor to be provided under specific conditions. Such conditions may be incident to the method of providing the $O_2$. For example, it can be desirable to provide the $O_2$ at a specific pressure. Specifically, it can be beneficial for the $O_2$ introduced into the combustor to have a pressure of at least about 8 MPa. In further embodiments, the $O_2$ introduced into the combustor can be at a pressure of at least about 10 MPa, at least about 12 MPa, at least about 14 MPa, at least about 15 MPa, at least about 16 MPa, at least about 18 MPa, at least about 20 MPa, at least about 22 MPa, at least about 24 MPa, at least about 25 MPa, at least about 30 MPa, at least about 35 MPa, at least about 40 MPa, at least about 45 MPa, or at least about 50 MPa. Provision of the $O_2$ can encompass the use of an air separator (or oxygen separator), such as a cryogenic $O_2$ concentrator, an $O_2$ transport separator, or any similar apparatus such as an $O_2$ ion transport separator for separating $O_2$ from ambient air. Separately, or in combination therewith, the provision of the $O_2$ can include pressurizing the $O_2$ to achieve the desired pressure, as described above. Such action can cause heating of the $O_2$. In some embodiments, it may be desirable for the $O_2$ to be at a desired temperature that is different from the temperature achieved inherently by pressurizing the gas. For example, it may be desirable for the $O_2$ to be provided to the combustor at a temperature of 30° C. to about 900° C., about 35° C. to about 800° C., about 40° C. to about 700° C., about 45° C. to about 600° C., about 50° C. to about 500° C., about 55° C. to about 400° C., about 60° C. to about 300° C., about 65° C. to about 250° C., or about 70° C. to about 200° C. Moreover, in some embodiments, the $O_2$ can be introduced into the combustor under conditions that are identical or substantially similar to the conditions of the $CO_2$ circulating fluid and/or the carbon containing fuel. This may arise from mixing of the various components prior to introduction into the combustor or may arise from specific methods of preparing the $O_2$ for introduction into the combustor. In particular embodiments, the $O_2$ may be combined with an amount of $CO_2$ in a defined molar proportion so that the $O_2$ may be provided at the same temperature as the $CO_2$ circulating fluid stream. For example, the combination could be carried out at a temperature below 100° C. while the $CO_2$ is at a supercritical pressure. This eliminates danger of combustion associated with heating pure $O_2$ alone due to the diluting effect of the $CO_2$. Such mixture could be at a $CO_2/O_2$ ratio of about 1:2 to about 5:1, about 1:1 to about 4:1, or about 1:1 to about 3:1.

In some embodiments, it can be useful for the $O_2$ supplied to the combustor to be substantially purified (i.e., upgraded in terms of the molar content of $O_2$ in relation to other components naturally present in air). In certain embodiments, the $O_2$ can have a purity of greater than about 50% molar, greater than about 60% molar, greater than about 70% molar, greater than about 80% molar, greater than about 85% molar, greater than about 90% molar, greater than about 95% molar, greater than about 96% molar, greater than about 97% molar, greater than about 98% molar, greater than about 99% molar, or greater than about 99.5% molar. In other embodiments, the $O_2$ can have a molar purity of about 85% to about 99.6% molar, about 85% to about 99% molar, about 90% to about 99% molar, about 90% to about 98% molar, or about 90% to about 97% molar. Overall $CO_2$ recovery from the carbon in the fuel favors the use of higher purities in the range of at least about 99.5% molar.

The $CO_2$ circulating fluid can be introduced to the combustor at the inlet of the combustor along with the $O_2$ and the carbon containing fuel. As described above in relation to a transpiration cooled combustor, however, the $CO_2$ circulating fluid also can be introduced to the transpiration cooled combustor as all or part of the transpiration cooling fluid directed into the transpiration member through one or more transpiration fluid supply passages formed in the transpiration cooled combustor. In some embodiments according to the invention, the $CO_2$ circulating fluid can be introduced into the combustor at the inlet of the combustor (i.e., along with the $O_2$ and the fuel), and the $CO_2$ circulating fluid also can be introduced into the combustor through the transpiration member as all or part of the transpiration cooling fluid. In other embodiments, the $CO_2$ circulating fluid can be introduced into the combustor only through the transpiration member as all or part of the transpiration cooling fluid (i.e., no $CO_2$ being introduced into the combustor inlet with the $O_2$ and the fuel).

In some embodiments, the invention may be characterized in relation to the ratio of the various components introduced into the combustion chamber. In order to achieve maximum efficiency of combustion it can be useful to combust the carbon containing fuel at a high temperature. The temperature of combustion and the temperature of the combustion product stream leaving the combustor, however, may need to be controlled within defined parameters. To this end, it can be useful to provide the $CO_2$ circulating fluid at a specific ratio to the fuel so that combustion temperature and/or the turbine inlet temperature can be controlled within the desired range while also maximizing the amount of energy that can be converted to power. In specific embodiments, this can be achieved by adjusting the ratio of the $CO_2$ circulating fluid stream to the carbon in the fuel. The desired ratio can be influenced by the desired turbine inlet temperature as well as the temperature difference between the inlet and outlet streams at the hot end of the heat exchanger, as is more fully described herein. The ratio specifically can be described as the molar ratio of the $CO_2$ in the $CO_2$ circulating fluid to the carbon present in the carbon containing fuel. For determining the molar amount of $CO_2$ introduced into the combustor, in some embodiments, the entire content of $CO_2$ provided to the combustor (i.e., introduced at the inlet with the fuel and the $O_2$, as well as any $CO_2$ used as a transpiration cooling fluid) is included in the calculation. In specific embodiments, however, the calculation may be based solely on the molar amount of $CO_2$ introduced at the combustor inlet (i.e., excluding any $CO_2$ used as a transpiration cooling fluid). In embodiments wherein the $CO_2$ is introduced into the combustor only as a transpiration cooling fluid, the calculation is based upon the content of $CO_2$ introduced into the combustor as the transpiration cooling fluid. Thus, the ratio may be described as the molar content of $CO_2$ input to the combustor inlet in relation to the carbon in the fuel input to the combustor. Alternately, the ratio may be described as the molar content of $CO_2$ input to the combustor through the transpiration cooling fluid in relation to the carbon in the fuel input to the combustor.

In certain embodiments, the ratio of $CO_2$ circulating fluid to carbon in the fuel introduced into the combustor, on a molar basis, can be about 10 to about 50 (i.e., about 10 moles of $CO_2$ per 1 mole of carbon in the fuel to about 50 moles of $CO_2$ per 1 mole of carbon in the fuel). In further embodiments, the ratio of $CO_2$ in the circulating fluid to carbon in the fuel can be about 15 to about 50, about 20 to about 50, about 25 to about 50, about 30 to about 50, about 15 to about 45, about 20 to about 45, about 25 to about 45, about 30 to about 45, about 15 to about 40, about 20 to about 40, about 25 to about 40, or about 30 to about 40. In other embodiments, the ratio of $CO_2$ in the circulating fluid to carbon in the fuel can be at least about 5, at least about 10, at least about 15, at least about 20, at least about 25, or at least about 30.

The molar ratio of $CO_2$ introduced into the combustor to carbon present in the carbon containing fuel can have an important impact on overall system thermal efficiency. This impact on efficiency also may be impacted by the design and function of further components of the system, including the heat exchanger, the water separator, and the pressurization unit. The combination of the various elements of the system and method described herein leads to the ability to achieve high thermal efficiency at the specific $CO_2/C$ ratios described herein. Previously known systems and methods that do not include the various elements described herein typically would require a $CO_2/C$ molar ratio that is significantly lower than used in the present invention to achieve efficiencies approaching those achieved herein. The present invention, however, has identified highly effective systems and methods for recycling $CO_2$ that enables the use of $CO_2/C$ molar ratios that greatly exceed those that can be used in the known art.

The use of high $CO_2/C$ molar ratios according to the present invention further is advantageous for diluting impurities in the combustion stream. The corrosive or erosive effects of impurities (e.g., chlorides and sulfur) on system components are thus greatly diminished. High chloride and/or high sulfur coal presently cannot be used in known systems because the combustion products from such coal (which includes HCl and $H_2SO_4$) are too corrosive and erosive for the power plant components to withstand. Many other impurities (e.g., solid ash particles and volatile materials containing elements such as lead, iodine, antimony, and mercury) also can cause sever internal damage to power plant components at high temperatures. The dilutive effect of the recycled $CO_2$ can greatly ameliorate or eliminate the deleterious effects of such impurities on power plant components. The selection of $CO_2/C$ molar ratios then can involve a complex consideration of effects on efficiency and plant component erosion and corrosion and of the design of the $CO_2$ recycle system components and function. The present invention enables the highly efficient recycle of $CO_2$ and thus the increased $CO_2/C$ molar ratios with a high thermal efficiency that could not have been predicted by the known art. The high $CO_2/C$ molar ratios thus convey at least the aforementioned advantages.

Similarly, it can be useful to control the content of $O_2$ introduced into the combustor. This particularly can depend upon the nature of the operation of the combustor. As more fully described herein, the methods and systems of the invention can allow for operation in a fully oxidizing mode, a fully reducing mode, or variations of both. In a fully oxidizing mode, the amount of $O_2$ provided to the combustor preferably would be at least a stoichiometric amount necessary to achieve complete oxidization of the carbon containing fuel. In certain embodiments, the amount of $O_2$ provided would be in excess of the noted stoichiometric amount by at least about 0.1% molar, at least about 0.25% molar, at least about 0.5% molar, at least about 1% molar, at least about 2% molar, at least about 3% molar, at least about 4% molar, or at least about 5% molar. In other embodiments, the amount of $O_2$ provided would be in excess of the noted stoichiometric amount by about 0.1% to about 5% molar, about 0.25% to about 4% molar, or about 0.5% to about 3% molar. In a fully reducing mode, the amount of $O_2$ provided to the combustor preferably would be a stoichiometric amount necessary to convert the carbon containing fuel to the components $H_2$, CO, $CH_4$, $H_2S$, and $NH_3$ plus an excess of at least about 0.1% molar, at least about 0.25% molar, at least about 0.5% molar, at least about 1% molar, at least about 2% molar, at least about 3% molar, at least about 4% molar, or at least about 5% molar. In other embodiments, the amount of $O_2$ provided would be in excess of the noted stoichiometric amount by about 0.1% to about 5% molar, about 0.25% to about 4% molar, or about 0.5% to about 3% molar.

The methods of the invention can, in some embodiments, be characterized in relation to the physical state of the $CO_2$ throughout the various steps in the process. $CO_2$ is recognized as existing in various states depending upon the physical conditions of the material. $CO_2$ has a triple point at 0.518 MPa and $-56.6°$ C., but $CO_2$ also has a critical pressure and temperature of 7.38 MPa and 31.1° C. Beyond this critical point, $CO_2$ exists as a supercritical fluid, and the present invention has realized the ability to maximize power generation efficiency by keeping the $CO_2$ in a specified state at specific points in the cycle. In specific embodiments, the $CO_2$ introduced into the combustor is preferably in the form of a supercritical fluid.

Efficiency of a power generating system or method typically is understood to describe the ratio of energy output by the system or method to energy input into the system or method. In the case of a power production system or method, efficiency often is described as the ratio of electricity or power (e.g., in megawatts or Mw) output to the customer grid to the total lower heating value thermal energy of the fuel combusted to generate the electricity (or power). This ratio then may be referred to as the net system or method efficiency (on an LHV basis). This efficiency can take into account all of the energy required for internal system or method processes, including production of purified oxygen (e.g., via an air separation unit), pressurization of $CO_2$ for transport to a pressurized pipeline, and other system or method conditions requiring energy input.

In various embodiments, the systems and methods of the present invention can make use of predominantly $CO_2$ as a working fluid in a cycle in which a carbon containing fuel is combusted (i.e., in a combustor) in substantially pure $O_2$ at a pressure in excess of the critical pressure of $CO_2$ to produce a combustion product stream. This stream is expanded across a turbine and is then passed through a recuperator heat exchanger. In the heat exchanger, the turbine exhaust preheats a recycle $CO_2$ circulating fluid in a supercritical state. This preheated, recycled $CO_2$ circulating fluid is input into the combustor where it mixes with the products from combustion of the carbon containing fuel to give a total flow at a defined maximum turbine inlet temperature. The invention can provide excellent efficiency at least in part because of the recognition of the benefits of minimizing the temperature difference at the hot end of the recuperator heat exchanger. This minimization can be achieved by using a low temperature level heat source to heat a portion of the recycle $CO_2$ prior to introduction to the combustor. At these lower temperature levels, the specific heat and density of the supercritical $CO_2$ is very high, and this extra heating can allow the turbine exhaust flow to preheat the $CO_2$ to a much higher temperature, and this can significantly reduce the temperature difference at the hot end of the recuperator heat exchanger. Useful low temperature heat sources in specific embodiments are the air compressors used in the cryogenic air separation plant operated adiabatically or the hot exhaust flow from a conventional gas turbine. In specific embodiments of the present invention, the temperature difference at the hot end of the recuperator heat exchanger is less than about 50° C., and preferably in the range of about 10° C. to about 30° C. The use of a low pressure ratio (e.g., below about 12) is a further factor which can increase efficiency. The use of $CO_2$ as a working fluid coupled with the low pressure ratio reduces the energy loss in raising the pressure of the cooled turbine exhaust to the recycle pressure. A further advantage is the ability to produce the quantity of carbon in the fuel converted to $CO_2$ as a high pressure fluid above the supercritical pressure of $CO_2$ at pipeline pressure (typically about 10 MPa to about 20 MPa) with very little additional parasitic power consumption at near 100% carbon capture from the fuel. Such system and method parameters are further described herein in even greater detail.

Returning to FIG. 5, the carbon containing fuel 254 introduced to the combustor 220 along with the $O_2$ 242 and the $CO_2$ circulating fluid 236 is combusted to provide a combustion product stream 40. In specific embodiments, the combustor 220 is a transpiration cooled combustor, such as described above. Combustion temperature can vary depending upon the specific process parameters—e.g., the type of carbon containing fuel used, the molar ratio of $CO_2$ to carbon in the fuel as introduced into the combustor, and/or the molar ratio of $CO_2$ to $O_2$ introduced into the combustor. In specific embodiments, the combustion temperature is a temperature as described above in relation to the description of the transpiration cooled combustor. In particularly preferred embodiments, combustion temperatures in excess of about 1,300° C., as described herein, may be advantageous.

It also can be useful to control combustion temperature such that the combustion product stream leaving the combustor has a desired temperature. For example, it can be useful for the combustion product stream exiting the combustor to have a temperature of at least about 700° C., at least about 750° C., at least about 800° C., at least about 850° C., at least about 900° C., at least about 950° C., at least about 1,000° C., at least about 1,050° C., at least about 1,100° C., at least about 1,200° C., at least about 1,300° C., at least about 1,400° C., at least about 1,500° C., or at least about 1,600° C. In some embodiments, the combustion product stream may have a temperature of about 700° C. to about 1,600° C., about 800° C. to about 1,600° C., about 850° C. to about 1,500° C., about 900° C. to about 1,400° C., about 950° C. to about 1,350° C., or about 1,000° C. to about 1,300° C.

As described above, the pressure of the $CO_2$ throughout the power production cycle can be a critical parameter to maximize power cycle efficiency. While it can be important for the materials introduced into the combustor to have a specifically defined pressure, it likewise can be important for the combustion product stream to have a defined pressure. Specifically, the pressure of the combustion product stream can be related to the pressure of the $CO_2$ circulating fluid that is introduced into the combustor. In specific embodiments the pressure of the combustion product stream can be at least about 90% of the pressure of the $CO_2$ introduced into the combustor—i.e., in the circulating fluid. In further embodiments, the pressure of the combustion product stream can be at least about 91%, at least about 92%, at least about 93%, at least about 94%, at least about 95%, at least about 96%, at least about 97%, at least about 98%, or at least about 99% of the pressure of the $CO_2$ introduced into the combustor.

The chemical makeup of the combustion product stream exiting the combustor can vary depending upon the type of carbon containing fuel used. Importantly, the combustion product stream will comprise $CO_2$ that will be recycled and reintroduced into the combustor or further cycles, as more fully described below. Moreover, excess $CO_2$ (including $CO_2$ produced by combustion of the fuel) can be withdrawn from the $CO_2$ circulating fluid (particularly at a pressure suitable for direct transfer to a $CO_2$ pipeline) for sequestration or other disposal that does not include release to the atmosphere. In further embodiments, the combustion product stream may comprise one or more of water vapor, $SO_2$, $SO_3$, HCl, NO, $NO_2$, Hg, excess $O_2$, $N_2$, Ar, and possibly other contaminants that may be preset in the fuel that is combusted. These materials present in the combustion product stream may persist in the $CO_2$ circulating fluid stream unless removed, such as by processes described herein. Such materials present in addition to the $CO_2$ may be referred to herein as "secondary components."

As seen in FIG. 5, the combustion product stream 40 can be directed to a turbine 320 wherein the combustion product stream 40 is expanded to generate power (e.g., via a generator to produce electricity, which is not shown in the illustration). The turbine 320 can have an inlet for receiving the combustion product stream 40 and an outlet for release of a turbine discharge stream 50 comprising $CO_2$. Although a single turbine 320 is shown in FIG. 5, it is understood that more than one turbine may be used, the multiple turbines being connected in series or optionally separated by one or more further components, such as a further combustion component, a compressing component, a separator component, or the like.

Again, process parameters may be closely controlled in this step to maximize cycle efficiency. Existing natural gas power plant efficiency is critically dependent on turbine inlet temperatures. For example, extensive work has been done at great cost to achieve turbine technology allowing for inlet temperatures as high as about 1,350° C. The higher the turbine inlet temperature, the higher the plant efficiency, but also the more expensive the turbine is, and potentially, the shorter its lifetime. Some utilities are balking at paying the higher prices and having the risk of shorter life as well. Although the present invention can make use of such turbines to even further increase efficiency in some embodiments, such is not required. In specific embodiments, the present systems and methods can achieve the desired efficiency while using turbine inlet temperature in a much lower range, as described above. Thus, the invention may be characterized in terms of achieving a specific efficiency, as described herein, while providing a combustion product stream to a turbine inlet at a defined temperature, as described herein, which may be significantly less than temperatures recognized in the art as necessary to achieve the same efficiency with the same fuel.

As noted above, the combustion product stream 40 leaving the combustor 220 preferably has a pressure that is closely aligned to the pressure of the $CO_2$ circulating fluid 236 entering the combustor 220. In specific embodiments, the combustion product stream 40 is thus at a temperature and pressure such that the $CO_2$ present in the stream is in a supercritical fluid state. When the combustion product stream 40 is expanded across the turbine 320, the pressure of the stream is reduced. Preferably, this pressure drop is controlled such that the pressure of the combustion product stream 40 is in a defined ratio with the pressure of the turbine discharge stream 50. In certain embodiments, the pressure ratio of the combustion product stream at the inlet of the turbine compared to the turbine discharge stream at the out of the turbine is less than about 12. This can be defined as the inlet pressure ($I_p$); to outlet pressure ($O_p$) ratio (i.e., $I_p/O_p$). In further embodiments, the pressure ratio can be less than about 11, less than about 10, less than about 9, less than about 8, or less than about 7. In other embodiments, the inlet pressure to outlet pressure ratio a the turbine can be about 1.5 to about 12, about 2 to about 12, about 3 to about 12, about 4 to about 12, about 2 to about 11, about 2 to about 10, about 2 to about 9, about 2 to about 8, about 3 to about 11, about 3 to about 10, about 3 to about 9, about 3 to about 9, about 4 to about 11, about 4 to about 10, about 4 to about 9, or about 4 to about 8.

In specific embodiments, it can be desirable for the turbine discharge stream to be under conditions such that the $CO_2$ in the stream is no longer in a supercritical fluid state but is rather in a gaseous state. For example, providing the $CO_2$ in a gaseous state can facilitate removal of any secondary components. In some embodiments, the turbine discharge stream has a pressure that is below the pressure where the $CO_2$ would be in a supercritical state. Preferably, the turbine discharge stream has a pressure that is less than about 7.3 MPa, is less than or equal to about 7 MPa, less than or equal to about 6.5 MPa, less than or equal to about 6 MPa, less than or equal to about 5.5 MPa, less than or equal to about 5 MPa, less than or equal to about 4.5 MPa, less than or equal to about 4 MPa, less than or equal to about 3.5 MPa, less than or equal to about 3 MPa, less than or equal to about 2.5 MPa, less than or equal to about 2 MPa, or less than or equal to about 1.5 MPa. In other embodiments, the pressure of the turbine discharge stream can be about 1.5 MPa to about 7 MPa, about 3 MPa to about 7 MPa, or about 4 MPa to about 7 MPa. Preferably, the pressure of the turbine discharge stream is less than the $CO_2$ condensing pressure at the cooling temperatures to be encountered by the stream (e.g., ambient cooling). Thus, it is preferable according to the invention that the $CO_2$ downstream from the turbine 320 (and preferably upstream from the pressurization unit 620) be maintained in a gaseous state and not allowed to reach conditions wherein liquid $CO_2$ may form.

Although passage of the combustion product stream through the turbine may lead to some amount of temperature decrease, the turbine discharge stream typically will have a temperature that could hinder removal of any secondary components present in the combustion product stream. For example, the turbine discharge stream may have a temperature of about 500° C. to about 1,000° C., about 600° C. to about 1,000° C., about 700° C. to about 1,000° C., or about 800° C. to about 1,000° C. Because of the relatively high temperature of the combustion product stream, it can be beneficial for the turbine to be formed of materials capable of withstanding such temperatures. It also may be useful for the turbine to comprise a material that provides good chemical resistance to the type of secondary materials that may be present in the combustion product stream.

In some embodiments, it thus can be useful to pass the turbine discharge stream 50 through at least one heat exchanger 420 that cools the turbine discharge stream 50 and provides a $CO_2$ circulating fluid stream 60 having a temperature in a defined range. In specific embodiments, the $CO_2$ circulating fluid 60 leaving the heat exchanger 420 (or the final heat exchanger in the series when two or more heat exchangers are used) has a temperature of less than about 200° C., less than about 150° C., less than about 125° C., less than about 100° C., less than about 95° C., less than about 90° C., less than about 85° C., less than about 80° C., less than about 75° C., less than about 70° C., less than about 65° C., less than about 60° C., less than about 55° C., less than about 50° C., less than about 45° C., or less than about 40° C.

As noted above, it can be beneficial for the pressure of the turbine discharge to have a pressure in a specific ratio with the pressure of the combustion product stream. In specific embodiments, the turbine discharge stream will be directly passed through the one or more heat exchangers described herein without passing through any further components of the system. Thus, the pressure ratio also may be described in relation to the ratio of the pressure of the combustion product stream as it exits the combustor compared to the pressure of the stream entering the hot end of the heat exchanger (or the first heat exchanger when a series of heat exchangers is used). Again, this pressure ratio preferably is less than about 12. In further embodiments, the pressure ratio of the combustion product stream to the stream entering the heat exchanger can be less than about 11, less than about 10, less than about 9, less than about 8, or less than about 7. In other embodiments, this pressure ratio can be about 1.5 to about 10, about 2 to about 9, about 2 to about 8, about 3 to about 8, or about 4 to about 8.

While the use of a transpiration cooled combustor allows for high heat combustion, the systems and methods of the present invention can be characterized by the ability to also provide a turbine discharge stream to a heat exchanger (or series or heat exchangers) at a temperature that is sufficiently low to reduce costs associated with the system, increase the lifespan of the heat exchanger(s), and improve performance and reliability of the system. In specific embodiments, the hottest working temperature for a heat exchanger in a system or method according to the present invention is less than about 1,100° C., less than about 1,000° C., less than about 975° C., less than about 950° C., less than about 925° C. or less than about 900° C.

In certain embodiments, it can be particularly useful for the heat exchanger 420 to comprise at least two heat exchangers in series for receiving the turbine discharge stream 50 and cool it to a desired temperature. The type of heat exchanger used can vary depending upon the conditions of the stream entering the heat exchanger. For example, the turbine discharge stream 50 may be at a relatively high temperature, as described above, and it may thus be useful for the heat exchanger directly receiving the turbine discharge stream 50 to be formed from high performance materials designed to withstand extreme conditions. For example, the first heat exchanger in the heat exchanger series may comprise an INCONEL® alloy or similar material. Preferably, the first heat exchanger in the series comprises a material capable of withstanding a consistent working temperature of at least about 700° C., at least about 750° C., at least about 800° C., at least about 850° C., at least about 900° C., at least about 950° C., at least about 1,000° C., at least about 1,100° C., or at least about 1,200° C. It also may be useful for one or more of the heat exchangers to comprise a material that provides good chemical resistance to the type of secondary materials that may be present in the combustion product stream. INCONEL® alloys are available from Special Metals Corporation, and some embodiments can include austenitic nickel-chromium-based alloys. Examples of alloys that may be useful include INCONEL® 600, INCONEL® 601, INCONEL® 601GC, INCONEL® 603XL, INCONEL® 617, INCONEL® 625, INCONEL® 625LCF, INCONEL® 686, INCONEL® 690, INCONEL® 693, INCONEL® 706, INCONEL® 718, INCONEL® 718SPF™, INCONEL® 722, INCONEL® 725, INCONEL® 740, INCONEL® X-750, INCONEL® 751, INCONEL® MA754, INCONEL® MA758, INCONEL® 783, INCONEL® 903, INCONEL® N06230, INCONEL® C-276, INCONEL® G-3, INCONEL® HX, INCONEL® 22. An example of a favorable heat exchanger design is a diffusion bonded compact plate heat exchanger with chemically milled fins in the plates manufactured in a high temperature material, such as one of the alloys described above. Suitable heat exchangers can include those available under the tradename HEATRIC® (available from Meggitt USA, Houston, Tex.).

The first heat exchanger in the series preferably can sufficiently transfer heat from the turbine discharge stream such that one or more further heat exchangers present in the series can be formed of more conventional materials—e.g., stainless steel. In specific embodiments, at least two heat exchangers or at least three heat exchangers are used in a series to cool the turbine discharge stream to the desired temperature. The usefulness of using multiple heat exchangers in a series particularly can be seen in the description below regarding transfer of the heat from the turbine discharge stream to the $CO_2$ circulating fluid to re-heat the circulating fluid prior to introduction into the combustor.

In some embodiments, the methods and systems may be characterized as being a single stage combustion method or system. This can be achieved though use of a high efficiency combustor, such as a transpiration cooled combustor described above. Essentially, the fuel can be substantially completely combusted in the single combustor such that it is unnecessary to provide a series of combustors to completely combust the fuel. Accordingly, in some embodiments, the inventive methods and systems can be described such that the transpiration cooled combustor is the only combustor. In further embodiments, the methods and systems can be described such that the combustion occurs only in the single transpiration cooled combustor prior to passage of the discharge stream into the heat exchanger. In still further embodiments, the methods and systems can be described such that the turbine discharge stream is passed directly into the heat exchanger without passage through a further combustor.

After cooling, the $CO_2$ circulating fluid stream 60 exiting the at least one heat exchanger 420 can undergo further processing to separate out any secondary components remaining in the $CO_2$ circulating fluid stream 60 from combustion of the fuel. As shown in FIG. 5, the circulating fluid stream 60 can be directed to one or more separation units 520. As discussed in greater detail below, the present invention can be particularly characterized by the ability to provide a high efficiency method of generating power from combustion of a carbon containing fuel with no atmospheric release of $CO_2$. This can be achieved, at least in part, by using the $CO_2$ formed in combustion of the carbon containing fuel as the circulating fluid in the power production cycle. In some embodiments, though, the continuous combustion and recycling of $CO_2$ as the circulating fluid may cause an accumulation of $CO_2$ in the system. In such cases, it can be useful to withdraw at least a portion of the $CO_2$ from the circulating fluid (e.g., an amount approximately equivalent to the quantity of $CO_2$ derived from combustion of the carbon containing fuel). Such withdrawn $CO_2$ can be disposed of by any suitable method. In specific embodiments, the $CO_2$ may be directed to a pipeline for sequestration or disposal by suitable means, as further described below.

It can be a requirement of a $CO_2$ pipeline system specification that the $CO_2$ entering the pipeline be substantially free of water to prevent corrosion of the carbon steel used for the pipeline. Although "wet" $CO_2$ could be input directly into a stainless steel $CO_2$ pipeline, this is not always possible and, in fact, it can be more desirable to use a carbon steel pipeline because of cost concerns. Accordingly, in certain embodiments, water present in the $CO_2$ circulating fluid (e.g., water formed during combustion of the carbon-containing fuel and persisting in the combustion product stream, the turbine discharge stream, and the $CO_2$ circulating fluid stream) can be removed mostly as a liquid phase from the cooled $CO_2$ circulating fluid stream. In specific embodiments, this can be achieved by providing the $CO_2$ circulating fluid (e.g., in a gaseous state) at a pressure that is less than the point at which $CO_2$ present in the gas mixture is liquefied when the gas mixture is cooled to the lowest temperature achieved with ambient temperature cooling means. For example, the $CO_2$ circulating fluid particularly can be provided at a pressure of less than 7.38 MPa during separation of secondary components therefrom. An even lower pressure may be required if cooling means at a temperature in the low ambient range or substantially less than ambient are used. This allows for separation of water as a liquid and also minimizes contamination of the purified $CO_2$ circulating stream 65 leaving the separation unit. This also can limit the turbine discharge pressure to a value which is less than the critical pressure of the turbine exhaust gas. The actual pressure can depend upon the temperature of the available ambient cooling means. For example, if the water separation takes place at 30° C., then a pressure of 7 MPa allows for a 0.38 MPa margin to the $CO_2$ condensing pressure. In some embodiments, the $CO_2$ circulating fluid leaving the heat exchanger and entering the separation unit may be provided at a pressure of about 2 MPa to about 7 MPa, about 2.25 MPa to about 7 MPa, about 2.5 MPa to about 7 MPa, about 2.75 MPa to about 7 MPa, about 3 MPa to about 7 MPa, about 3.5 MPa to about 7 MPa, about 4 MPa to about 7 MPa, or about 4 MPa to about 6 MPa. In other embodiments, the pressure may be substantially the same as the pressure at the turbine outlet.

In specific embodiments, the purified $CO_2$ circulating stream 65 after water separation comprises no water vapor or substantially no water vapor. In some embodiments, the purified $CO_2$ circulating stream can be characterized as comprising water vapor in an amount of only less than 1.5% on a molar basis, less than 1.25% on a molar basis, less than 1% on a molar basis, less than 0.9% on a molar basis, or less than 0.8% on a molar basis, less than 0.7% on a molar basis, less than 0.6% on a molar basis, less than 0.5% on a molar basis, less than 0.4% on a molar basis, less than 0.3% on a molar basis, less than 0.2% on a molar basis, or less than 0.1% on a molar basis. In some embodiments, the purified $CO_2$ circulating fluid stream can comprise water vapor only in an amount of about 0.01% to about 1.5% on a molar basis, about 0.01% to about 1% on a molar basis, about 0.01% to about 0.75% on a molar basis, about 0.01% to about 0.5% on a molar basis, about 0.01% to about 0.25% on a molar basis, about 0.05% to about 0.5% on a molar basis, or about 0.05% to about 0.25% on a molar basis.

It can be highly advantageous to provide the $CO_2$ circulating fluid at the above-defined temperature and pressure conditions to facilitate separation of secondary components, such as water. In other words, the present invention can particularly provide for maintaining the $CO_2$ circulating fluid under desired conditions such that the $CO_2$ and the water in the $CO_2$ circulating fluid prior to separation are in desired states that facilitate separation. By providing the $CO_2$ circulating fluid at a pressure as described above, the temperature of the fluid stream can be decreased to a point where water in the stream will be in a liquid state and thus be more easily separable from the gaseous $CO_2$.

In certain embodiments, it can be desirable to provide further drying conditions so that the purified $CO_2$ circulating fluid is completely or substantially free of water. As noted above, separation of water from the $CO_2$ circulating fluid based on phase differences in the materials can leave a minor portion (i.e., low concentration) of water remaining in the $CO_2$ circulating fluid. In some embodiments, it may be acceptable to continue with the $CO_2$ circulating fluid having the minor portion of water remaining therein. In other embodiments, it can be useful to subject the $CO_2$ circulating fluid to further treatment to facilitate removal of all or part of the remaining water. For example, low concentration of water may be removed by desiccant dryers or other means that would suitable in light of the present disclosure.

Providing the $CO_2$ circulating fluid to the separation units at the defined pressure can be particularly beneficial for again maximizing efficiency of the power cycle. Specifically, providing the $CO_2$ circulating fluid at the defined pressure range can allow for the purified $CO_2$ circulating fluid in the gas phase to be compressed to a high pressure with minimal total power consumption. As described below, such pressurization can be required so that part of the purified $CO_2$ circulating fluid can be recycled to the combustor and part can be supplied at a required pipeline pressure (e.g., about 10 MPa to about 20 MPa). This further illustrates the benefits of minimizing the inlet to outlet pressure ratio of the expansion turbine, as described above. This functions to increase the overall cycle efficiency and also to allow for the discharge pressure from the turbine to be in the desirable range described above for separation of water and other secondary components from the $CO_2$ circulating fluid.

One embodiment of the flow of the $CO_2$ circulating fluid through a separation unit 520 is illustrated in FIG. 6. As seen therein, the $CO_2$ circulating fluid stream 60 from the heat exchanger can be passed through a cold water heat exchanger 530 that uses water to further remove heat from the $CO_2$ circulating fluid 60 (or any similarly functioning device) and discharge a mixed phase $CO_2$ circulating fluid 61 wherein the $CO_2$ remains a gas and the water in the $CO_2$ circulating fluid is converted to a liquid phase. For example, the passage of the $CO_2$ circulating fluid 60 through the cold water heat exchanger 530 can cool the $CO_2$ circulating fluid to a temperature of less than about 50° C., less than about 55° C., less than about 40° C., less than about 45° C., less than about 40° C., or less than about 30° C. Preferably, the pressure of the $CO_2$ circulating fluid is substantially unchanged by passage through the cold water heat exchanger 530. The mixed phase $CO_2$ circulating fluid 61 this is directed to a water separation unit 540 wherein a liquid water stream 62*a* is discharged from the separator 520. Also exiting the water separation unit 540 is the enriched $CO_2$ circulating fluid stream 62*b*. This enriched stream can directly exit the separator 520 as the purified $CO_2$ circulating fluid stream 65. In alternate embodiments (as illustrated by the streams and component represented by dashed lines), the enriched $CO_2$ circulating fluid stream 62*b* may be directed to one or more additional separation units 550 for removal of further secondary components, as more fully described below. In specific embodiments, any further secondary components of the $CO_2$ circulating fluid can be removed after removal of water. The $CO_2$ circulating fluid then exits the one or more additional separator units as the purified $CO_2$ circulating fluid 65. In some embodiments, however, the mixed phase $CO_2$ circulating fluid 61 may first be directed for removal of one or more secondary components prior to removal of water, and the partially purified stream may then be directed to the water separation unit 540. One of skill with the knowledge of the present disclosure would be capable of envisioning the various combinations of separators that may be desirable, and all such combinations are intended to be incorporated by the present invention.

As noted above, in addition to water, the $CO_2$ circulating fluid may contain other secondary components, such as fuel-derived, combustion-derived, and oxygen-derived impurities. Such secondary components also can be removed from the cooled, gaseous $CO_2$ circulating fluid in and around the same time as water separation. For example, in addition to water vapor, secondary components such as $SO_2$, $SO_3$, HCl, NO, $NO_2$, Hg, and excess $O_2$, $N_2$ and Ar can be removed. These secondary components of the $CO_2$ circulating fluid (often recognized as impurities or contaminants) can all be removed from the cooled $CO_2$ circulating fluid using appropriate methods (e.g., methods defined in U.S. Patent Application Publication No. 2008/0226515 and European Patent Application Nos. EP1952874 and EP1953486, which are incorporated herein by reference in their entirety). The $SO_2$ and $SO_3$ can be converted 100% to sulfuric acid, while >95% of the NO and $NO_2$ can be converted to nitric acid. Any excess $O_2$ present in the $CO_2$ circulating fluid can be separated as an enriched stream for optional recycle to the combustor. Any inert gases present (e.g., $N_2$ and Ar) can be vented at low pressure to the atmosphere. In certain embodiments, the $CO_2$ circulating fluid can be thus purified such that the $CO_2$ derived from the carbon in the fuel that is combusted can be ultimately delivered as a high density, pure stream. In specific embodiments, the purified $CO_2$ circulating fluid can comprise $CO_2$ in a concentration of at least 98.5% molar, at least 99% molar, at least 99.5% molar, or at least 99.8% molar. Moreover, the $CO_2$ circulating fluid can be provided at a desired pressure for direct input into a $CO_2$ pipeline—e.g., at least about 10 MPa, at least about 15 MPa, or at least about 20 MPa.

To summarize the foregoing, combustion of the carbon containing fuel 254 in the presence of $O_2$ 242 and a $CO_2$ circulating fluid 236 in a transpiration cooled combustor 220 can form a combustion product stream 40 having a relatively high temperature and pressure. This combustion product stream 40 comprising a relatively large amount of $CO_2$ can be passed through a turbine 320 to expand the combustion product stream 40, thereby decreasing the pressure of the stream and generating power. The turbine discharge stream 50 leaving the outlet of the turbine 320 is at a decreased pressure but still retains a relatively high temperature. Because of contaminants and impurities in the combustion product stream, it is beneficial to separate out such contaminants and impurities prior to recycling the $CO_2$ circulating fluid back into the system. To achieve this separation, the turbine discharge stream 50 is cooled by passage through the one or more heat exchangers 420. Separation of the secondary products (e.g., water and any other contaminants and impurities) can be achieved as described above. In order to recycle the $CO_2$ circulating fluid back into the combustor, it is necessary to both re-heat and re-pressurize the $CO_2$ circulating fluid. In certain embodiments, the present invention can be particularly characterized by the implementation of specific process steps to maximize efficiency of the power generation cycle while simultaneously preventing discharge of pollutants (e.g., $CO_2$) into the atmosphere. This particularly can be seen in relation the re-heating and re-pressurizing of the cooled and purified $CO_2$ circulating fluid exiting the separation unit.

As further illustrated in FIG. 5, the purified $CO_2$ circulating fluid 65 leaving the one or more separation units 520 can be passed through one or more pressurization units 620 (e.g., pumps, compressors, or the like) to increase the pressure of the purified $CO_2$ circulating fluid 65. In certain embodiments, the purified $CO_2$ circulating fluid 65 can be compressed to a pressure of at least about 7.5 MPa or at least about 8 MPa. In some embodiments, a single pressurization unit can be used to increase the pressure of the purified $CO_2$ circulating fluid to the desired pressure described herein for introduction into the combustor 220.

In specific embodiments, pressurization can be carried out using a series of two or more compressors (e.g., pumps) in the pressurization unit 620. One such embodiment is shown in FIG. 7, wherein the purified $CO_2$ circulating fluid 65 is passed through a first compressor 630 to compress the purified $CO_2$ circulating fluid 65 to a first pressure (which preferably is above the critical pressure of the $CO_2$) and thus form stream 66. Stream 66 can be directed to a cold water heat exchanger 640 that withdraws heat (e.g., heat formed by the pressurizing action of the first compressor) and forms stream 67, which preferably is at a temperature that is near ambient. Stream 67 can be directed to a second compressor 650 that is used to pressurize the $CO_2$ circulating fluid to a second pressure that is greater than the first pressure. As described below, the second pressure can be substantially similar to the pressure desired for the $CO_2$ circulating fluid when input (or recycled) to the combustor.

In specific embodiments, the first compressor 630 can be used to increase the pressure of the purified $CO_2$ circulating fluid 65 such that the purified $CO_2$ circulating fluid is transformed from a gaseous state to a supercritical fluid state. In specific embodiments, the purified $CO_2$ circulating fluid can be pressurized in the first compressor 630 to a pressure of about 7.5 MPa to about 20 MPa, about 7.5 MPa to about 15 MPa, about 7.5 MPa to about 12 MPa, about 7.5 MPa to about 10 MPa, or about 8 MPa to about 10 MPa. The stream 66 exiting the first compressor 630 (which is in a supercritical fluid state) is then passed through the cold water heat exchanger 640 (or any similarly functioning device) that can cool the $CO_2$ circulating fluid to a temperature sufficient to form a high density fluid that can more efficiently be pumped to an even greater pressure. This can be significant in light of the large volume of $CO_2$ that is being recycled for use as the circulating fluid. Pumping a large volume of $CO_2$ in the supercritical fluid state can be a significant energy drain on the system. The present, however, realizes the beneficial increase in efficiency that can be provided by densifying the $CO_2$ and thus reducing the total volume of supercritical $CO_2$ that is pumped back to the combustor for recycle. In specific embodiments, the $CO_2$ circulating fluid can be provided at a density of at least about 200 $kg/m^3$, at least about 250 $kg/m^3$, at least about 300 $kg/m^3$, at least about 350 $kg/m^3$, at least about 400 $kg/m^3$, at least about 450 $kg/m^3$, at least about 500 $kg/m^3$, at least about 550 $kg/m^3$, at least about 600 $kg/m^3$, at least about 650 $kg/m^3$, at least about 700 $kg/m^3$, at least about 750 kg/m3, at least about 800 $kg/m^3$, at least about 850 $kg/m^3$, at least about 900 $kg/m^3$, at least about 950 $kg/m^3$, or at least about 1,000 $kg/m^3$ after discharge from the cold water heat exchanger 640 (and prior to passage through the heat exchanger unit 420 for heating). In further embodiments, the density may be about 150 $kg/m^3$ to about 1,1,100 $kg/m^3$, about 200 $kg/m^3$ to about 1,000 $kg/m^3$, about 400 $kg/m^3$ to about 950 $kg/m^3$, about 500 $kg/m^3$ to about 900 $kg/m^3$, or about 500 $kg/m^3$ to about 800 $kg/m^3$.

In specific embodiments, passage of the stream 66 through the cold water heat exchanger 640 can cool the $CO_2$ circulating fluid to a temperature of less than about 60° C., less than about 50° C., less than about 40° C., or less than about 30° C. In other embodiments, the temperature of the $CO_2$ circulating fluid leaving the coldwater heat exchanger 640 as stream 67 can be about 15° C. to about 50° C., about 20° C. to about 45° C., or about 20° C. to about 40° C. The $CO_2$ circulating fluid in stream 67 entering the second compressor 650 preferably is under conditions that facilitate the energy efficient pumping of the stream to a desired pressure as described herein for introduction of the $CO_2$ circulating fluid into the combustor. For example, the pressurized, supercritical $CO_2$ circulating fluid stream 70 can be further pressurized to a pressure of at least about 12 MPa, at least about 15 MPa, at least about 16 MPa, at least about 18 MPa, at least about 20 MPa, or at least about 25 MPa. In some embodiments, the pressurized, supercritical $CO_2$ circulating fluid stream 70 can be further pressurized to a pressure of about 15 MPa to about 50 MPa, about 20 MPa to about 45 MPa, or about 25 MPa to about 40 MPa. Any type of compressor capable of working under the noted temperatures and capable of achieving the described pressures can be used, such as a high pressure multi-stage pump.

The pressurized $CO_2$ circulating fluid stream 70 leaving the one or more pressurization units 620 can be directed back to the heat exchangers previously used to cool the turbine discharge stream 50. As shown in FIG. 5, the pressurized $CO_2$ circulating fluid stream 70 first may be passed through a stream splitter 720 that forms $CO_2$ pipeline fluid stream 80 and $CO_2$ circulating fluid stream 85 (which would be substantially identical to $CO_2$ circulating fluid stream 70 except for the actual amount of $CO_2$ present in the stream). Thus, in some embodiments, at least a portion of the $CO_2$ in the pressurized $CO_2$ circulating fluid stream is introduced into a pressurized pipeline for sequestration. The amount of $CO_2$ removed from the $CO_2$ circulating fluid stream and directed to the pipeline (or other sequestration or disposal means) can vary depending upon the desired content of $CO_2$ to be introduced into the combustor to control combustion temperature and the actual content of $CO_2$ present in the combustion discharge stream exiting the combustor. In some embodiments, the amount of $CO_2$ withdrawn as described above can be substantially the amount of $CO_2$ formed from the combustion of the carbon containing fuel in the combustor.

To achieve a high efficiency operation, it can be beneficial for the $CO_2$ circulating fluid leaving the pressurization unit 620 to be heated to a temperature at which the super-critical fluid has a much lower specific heat. This is equivalent to providing a very large heat input over a comparatively low temperature range. The use of an external heat source (e.g., a relatively low temperature heat source) to provide additional heating for a portion of the recycled $CO_2$ circulating fluid allows the heat exchanger unit 420 to operate with a small temperature difference between turbine exhaust stream 50 and the recycled $CO_2$ circulating fluid stream 236 at the hot end of the heat exchanger unit 420 (or the first heat exchanger when a series of two or more heat exchangers is used). In specific embodiments, passage of the pressurized $CO_2$ circulating fluid through the one or more heat exchangers can be useful for heating the pressurized $CO_2$ circulating fluid stream to a desired temperature for entry of the pressurized $CO_2$ circulating fluid stream into the combustor. In certain embodiments, the pressurized $CO_2$ circulating fluid stream is heated to a temperature of at least about 200° C., at least about 300° C., at least about 400° C., at least about 500° C., at least about 600° C., at least about 700° C., or at least about 800° C. prior to input of the $CO_2$ circulating fluid stream into the combustor. In some embodiments, heating may be to a temperature of about 500° C. to about 1,200° C., about 550° C. to about 1,000° C., or about 600° C. to about 950° C.

FIG. 8 illustrates one embodiment of a heat exchange unit 420 wherein three individual heat exchangers are used in series to withdraw heat from the turbine discharge stream 50 to provide a $CO_2$ circulating fluid stream 60 under suitable conditions for removal of secondary components and simultaneously add heat to the pressurized, supercritical $CO_2$ circulating fluid stream 70 (or 85) prior to recycling and introduction of the $CO_2$ circulating fluid stream 236 into the combustor. As further described below, the present systems and methods may be retrofitted to conventional power systems (e.g., coal fired power plants) to increase efficiency and/or output thereof. In some embodiments, the heat exchange unit 420 described as follows may thus be referred to as the primary heat exchange unit in such a retrofit where a secondary heat exchange unit also is used (as illustrated in FIG. 12). The secondary heat exchange unit thus could be one or more heat exchangers used to superheat a steam stream, for example. The use of the terms primary heat exchange unit and secondary heat exchange unit should not be construed as limiting the scope of the invention and are only used to provide clarity of description.

In the embodiments encompassed by FIG. 8, the turbine discharge stream 50 enters the heat exchanger series 420 by first passing through the first heat exchanger 430 to provide stream 52, which will have a lower temperature than the temperature of the turbine discharge stream 50. The first heat exchanger 430 may be described as a high temperature heat exchanger as it receives the hottest stream in the series—i.e., the turbine discharge stream 50—and thus transfers heat in the highest temperature range in the heat exchanger series 420. As described above, the first heat exchanger 430 receiving the relatively high temperature turbine discharge stream 50 can comprise special alloys or other materials useful to make the heat exchanger suitable for withstanding the noted temperatures. The temperature of the turbine discharge stream 50 can be significantly reduced by passage through the first heat exchanger 430 (which also can apply to other embodiments where less than three or more than three individual heat exchangers are used). In certain embodiments, the temperature of the stream 52 leaving the first heat exchanger 430 can be lower than the temperature of the turbine discharge stream 50 by at least about 100° C., at least about 200° C., at least about 300° C., at least about 400° C., at least about 450° C., at least about 500° C., at least about 550° C., at least about 575° C., or at least about 600° C. In specific embodiments, the temperature of stream 52 may be about 100° C. to about 800° C., about 150° C. to about 600° C., or about 200° C. to about 500° C. In preferred embodiments, the pressure of the stream 52 leaving the first heat exchanger 430 is substantially similar to the pressure of the turbine discharge stream 50. Specifically, the pressure of the stream 52 leaving the first heat exchanger 430 can be at least 90%, at least 91%, at least 92%, at least 93%, at least 94%, at least 95%, at least 96%, at least 97%, at least 98%, at least 99%, at least 99.5%, or at least 99.8% of the pressure of the turbine discharge stream 50.

The stream 52 leaving the first heat exchanger 430 is passed through the second heat exchanger 440 to produce stream 56, which has a temperature that is less than the temperature of the stream 52 entering the second heat exchanger 440. The second heat exchanger 440 may be described as an intermediate temperature heat exchanger as it transfers heat in an intermediate temperature range (i.e., a range less than the first heat exchanger 430 but greater than the third heat exchanger 450). In some embodiments, the temperature difference between the first stream 52 and the second stream 56 can be substantially less than the temperature difference between the turbine discharge stream 50 and the stream 52 leaving the first heat exchanger 430. In some embodiments, the temperature of the stream 56 leaving the second heat exchanger 440 can be lower than the temperature of the stream 52 entering the second heat exchanger 440 by about 10° C. to about 200° C., about 20° C. to about 175° C., about 30° C. to about 150° C., or about 40° C. to about 140° C. In specific embodiments, the temperature of stream 56 may be about 75° C. to about 600° C., about 100° C. to about 400° C., or about 100° C. to about 300° C. Again, it can be preferred for the pressure of the stream 56 leaving the second heat exchanger 440 to be substantially similar to the pressure of the stream 52 entering the second heat exchanger 440. Specifically, the pressure of the stream 56 leaving the second heat exchanger 440 can be at least 90%, at least 91%, at least 92%, at least 93%, at least 94%, at least 95%, at least 96%, at least 97%, at least 98%, at least 99%, at least 99.5%, or at least 99.8% of the pressure of the stream 52 entering the second heat exchanger 440.

The stream 56 leaving the second heat exchanger 440 is passed through the third heat exchanger 450 to produce the $CO_2$ circulating fluid stream 60, which has a temperature that is less than the temperature of the stream 56 entering the third heat exchanger 450. The third heat exchanger 450 may be described as a low temperature heat exchanger as it transfers heat in the lowest temperature range of the heat transfer series 420. In some embodiments, the temperature of the $CO_2$ circulating fluid stream 60 leaving the third heat exchanger 450 can be lower than the temperature of the stream 56 entering the third heat exchanger 450 by about 10° C. to about 250° C., about 15° C. to about 200° C., about 20° C. to about 175° C., or about 25° C. to about 150° C. In specific embodiments, the temperature of stream 60 may be about 40° C. to about 200° C., about 40° C. to about 100° C., or about 40° C. to about 90° C. Again, it can be preferred for the pressure of the $CO_2$ circulating fluid stream 60 leaving the third heat exchanger 450 to be substantially similar to the pressure of the stream 56 entering the third heat exchanger 450. Specifically, the pressure of the $CO_2$ circulating fluid stream 60 leaving the third heat exchanger 450 can be at least 90%, at least 91%, at least 92%, at least 93%, at least 94%, at least 95%, at least 96%, at least 97%, at least 98%, at least 99%, at least 99.5%, or at least 99.8% of the pressure of the stream 56 entering the third heat exchanger 450.

The $CO_2$ circulating fluid stream 60 leaving the third heat exchanger 450 (and thus leaving the heat exchanger unit 420 in general) can be directed to the one or more separation units 520, as described above. Also as described above, the $CO_2$ circulating fluid stream can undergo one or more types of separation to remove secondary components from the stream, which is then pressurized for return to the combustor as the recycled, circulating fluid (optionally having a portion of the $CO_2$ separated out for entry into a $CO_2$ pipeline or other means of sequestration or disposal without venting to the atmosphere).

Returning to FIG. 8, the pressurized $CO_2$ circulating fluid stream 70 (or 85 if first passed through a separation apparatus, as shown in FIG. 5), can be directed back through the same series of three heat exchangers so that the heat originally withdrawn via the heat exchangers can be used to impart heat to the pressurized $CO_2$ circulating fluid stream 70 prior to entry into the combustor 220. Typically, heat imparted to the pressurized $CO_2$ circulating fluid stream 70 by passage through the three heat exchangers (450, 440, and 430) can be relatively proportional to the amount of heat withdrawn by the heat exchangers as described above.

In certain embodiments, the invention may be characterized by the temperature difference of the streams exiting and entering the cold end of the heat exchanger (or the last heat exchanger in a series). Referring to FIG. 8, this specifically may relate to the temperature difference of streams 60 and 70. This temperature difference of the streams at the cold end of the heat exchanger (of the last heat exchanger in a series) specifically is greater than zero and may be in the range of about 2° C. to about 50° C., about 3° C. to about 40° C., about 4° C. to about 30° C., or about 5° C. to about 20° C.

In some embodiments, the pressurized $CO_2$ circulating fluid stream 70 can be passed directly through the three heat exchangers in series. For example, the pressurized $CO_2$ circulating fluid stream 70 (i.e., at a relatively low temperature) can pass through the third heat exchanger 450 to form stream 71 at an increased temperature, which can be passed directly through the second heat exchanger 440 to form stream 73 at an increased temperature, which can be passed directly through the first heat exchanger 430 to form the high temperature, pressurized $CO_2$ circulating fluid stream 236 that can be directed to the combustor 220.

In particular embodiments, however, the present invention can be characterized by the use of an external heat source to further increase the temperature of the recycled $CO_2$ circulating fluid. For example, as illustrated in FIG. 8, after passage of the pressurized $CO_2$ circulating fluid stream 70 through the third heat exchanger 450, the formed stream 71, instead of passing directly to the second heat exchanger 440 can be passed through a splitting component 460 that splits stream 71 into two streams 71b and 72a. Stream 71b can be passed through the second heat exchanger 440 as otherwise described above. Stream 72a can be passed through a side heater 470 that can be used to impart an additional amount of heat to the pressurized $CO_2$ circulating fluid stream 70 in addition to the heat imparted by the heat exchangers themselves.

The relative amounts of the pressurized $CO_2$ circulating fluid from the stream 71 that are directed to the second heat exchanger 440 and the side heater 470 can vary depending upon the working conditions of the system and the desired final temperature of the pressurized $CO_2$ circulating fluid stream for entry into the combustor 220. In certain embodiments, the molar ratio of $CO_2$ in the stream 71b directed to the second heat exchanger 440 and the stream 72a directed to the side heater 470 can be about 1:2 to about 20:1 (i.e., about 1 mole of $CO_2$ in stream 71b per 2 moles of $CO_2$ in stream 72a to about 20 moles of $CO_2$ in stream 71b per 1 mole of $CO_2$ in stream 72a). In further embodiments, the molar ratio of $CO_2$ in the stream 71b directed to the second heat exchanger 440 and the stream 72a directed to the side heater 470 can be about 1:1 to about 20:1, about 2:1 to about 16:1, about 2:1 to about 12:1, about 2:1 to about 10:1, about 2:1 to about 8:1, or about 4:1 to about 6:1.

The side heater can comprise any apparatus useful for imparting heat to the $CO_2$ circulating fluid. In some embodiments, the energy (i.e., heat) provided by the side heater can be input into the system from an outside source. In particular embodiments according to the invention, however, the efficiency of the cycle can be increased by utilizing waste heat that is generated at one or more points in the cycle. For example, production of $O_2$ for input into the combustor can produce heat. Known air separation units can generate heat as a by-product of the separation process. Moreover, it can be useful for the $O_2$ to be provided at an increased pressure, such as described above, and such pressurization of the gas can also generate heat as a by-product. For example, $O_2$ may be produced by the operation of a cryogenic air separation process in which the oxygen is pressurized in the process by pumping liquid oxygen that is efficiently heated to ambient temperature conserving refrigeration. Such a cryogenic pumped oxygen plant can have two air compressors, both of which can be operated adiabatically with no inter-stage cooling so that the hot, pressurized air can be cooled down to a temperature that is close to and/or greater than the temperature of the stream that is heated by the external source (e.g., stream 72a in FIG. 8). In known art settings, such heat is unutilized or can actually be a drain on the system as secondary cooling systems are required to eliminate the by-product heat. In the present invention, however, a coolant may be used to withdraw the generated heat from the air separation process and provide the heat to the side heater illustrated in FIG. 8. In other embodiments, the side heater could itself be the air separation unit (or an associated device), and the $CO_2$ circulating fluid (e.g., stream 72a in FIG. 8) could itself be directly circulated through a coolant system on or associated with the air separation unit to withdraw the heat generated in the air separation process. More specifically, the added heat can be obtained by operating the $CO_2$ compressor adiabatically and removing the heat of compression in after-coolers against a circulating heat transfer fluid which transfers the heat of compression to heat part of the high pressure $CO_2$ circulating fluid or by direct heat transfer to the high pressure recycled $CO_2$ circulating fluid stream (e.g., stream 72a in FIG. 8). Further, the addition of such heat is not necessarily limited to the position described in relation to FIG. 8 but could be input to the cycle at any point after separation of the secondary components from the $CO_2$ circulating fluid (but preferably before passage of the $CO_2$ circulating fluid through the heat exchanger directly upstream from the input into the combustor). Of course, any similar method of utilizing waste generated in the power production cycle also would be encompassed by the present disclosure, such as using a supply of steam at a suitable condensing temperature or the hot exhaust gas from a conventional open cycle gas turbine.

The amount of heat imparted by the side heater 470 can vary depending upon the materials and apparatuses used as well as the ultimate temperature to be achieved for the $CO_2$ circulating fluid stream 236 for entry into the combustor 220. In some embodiments, the side heater 470 effectively increases the temperature of the stream 72a by at least about 10° C., at least about 20° C., at least about 30° C., at least about 40° C., at least about 50° C., at least about 60° C., at least about 70° C., at least about 80° C., at least about 90° C., or at least about 100° C. In other embodiments, the side heater 470 effectively increases the temperature of the stream 72a by about 10° C. to about 200° C., about 50° C. to about 175° C., or about 75° C. to about 150° C. In specific embodiments, the side heater 470 increases the temperature of stream 72a to within at least about 15° C., within at least about 12° C., within at least about 10° C., within at least about 7° C., or within at least about 5° C. of the temperature of stream 73 leaving heat exchanger 440.

By this addition of a further heat source, stream 71 leaving the third heat exchanger 450 can be superheated beyond the ability of the available heat in the second heat exchanger 440 to heat stream 71 if the entire amount of $CO_2$ in the stream was directed through the second heat exchanger 440. By splitting the stream, the heat available in the second heat exchanger 440 can be fully imparted to the partial content of $CO_2$ circulating fluid in stream 71b while the heat available from the side heater 470 can be fully imparted to the partial content of the $CO_2$ circulating fluid in stream 72a. Thus, it can be seen that the temperature of the combined streams entering the first heat exchanger 430 when the alternative splitting method is utilized can be greater than the temperature of stream 73 exiting the second heat exchanger 440 if the full amount of the $CO_2$ circulating fluid in stream 71 is directed to the second heat exchanger 440 instead of being split and separately heated, as described above. In some embodiments, the increased heat gained by the splitting method can be significant enough to limit whether or not the $CO_2$ circulating fluid stream 236 is sufficiently heated prior to entering the combustor.

As seen in FIG. 8, stream 71b leaving the splitter 460 is passed through the second heat exchanger 440 to form stream 73, which is directed to the mixer 480 that combines stream 73 with stream 72b discharged from the side heater 470. The combined stream 74 is then passed through the first heat exchanger 430 to heat the $CO_2$ circulating fluid to a temperature that is substantially close to the temperature of the turbine discharge stream when entering the first heat exchanger 430. This closeness in temperatures of the fluid streams at the hot end of the first heat exchanger can apply to further embodiments of the invention where less than three or more than three heat exchangers are used and can apply to the first heat exchanger through which the $CO_2$ circulating fluid is passed after discharge from the turbine. The ability to achieve this closeness in temperature of the fluid streams at the hot end of the first heat exchanger can be a key characteristic of the invention for attaining desired efficiency levels. In certain embodiments, the difference between the temperature of the turbine discharge stream entering the first heat exchanger in line from the turbine (i.e., after expanding in the turbine) and the temperature of the $CO_2$ circulating fluid stream leaving the heat exchanger for recycling into the combustor can be less than about 80° C., less than about 75° C., less than about 70° C., less than about 65° C., less than about 60° C., less than about 55° C., less than about 50° C., less than about 45° C., less than about 40° C., less than about 35° C., less than about 30° C., less than about 25° C., less than about 20° C., or less than about 15° C.

As can be seen from the foregoing, the efficiency of the systems and methods of the present invention can be greatly facilitated by precise control of the temperature difference at the hot end of heat exchanger 420 (or the first heat exchanger 430 in the series illustrated in FIG. 8) between the turbine discharge stream 50 and the recycled $CO_2$ circulating fluid stream 236. In preferred embodiments, this temperature difference is less than 50° C. Although not wishing to be bound by theory, it has been found according to the present invention that heat available for heating the recycled $CO_2$ circulating fluid (e.g., heat withdrawn from the turbine discharge stream in the one or more heat exchangers) can be inadequate for sufficiently heating the total stream of recycled $CO_2$ circulating fluid. The present invention has realized that this can be overcome by dividing stream 71 so that stream 71b enters the heat exchanger 440 and stream 72a enters the external heat source 470 that provides the additional, external source of heat that raises the temperature of stream 72b leaving external heat source 470 to be substantially close to the temperature of stream 73 leaving the heat exchanger 440, as already described above. Streams 72b and 73 then combine to form stream 74. The flow-rate of stream 71b (and also stream 72a) can be controlled by the temperature difference at the cold end of heat exchanger 440. The amount of external heat required to overcome the heat inadequacy described above can be minimized by making the temperature of stream 56 as low as possible and then minimizing the cold end temperature difference of heat exchanger 440. The water vapor present in stream 56 arising from the combustion products reaches its dew point at a temperature that depends on the composition of the stream 56 and its pressure. Below this temperature the condensation of water greatly increases the effective mCp of stream 56 to stream 60 and provides all the heat required to heat the total recycle stream 70 to stream 71. The temperature of stream 56 leaving heat exchanger 440 preferably can be within about 5° C. of the dew point of stream 56. The temperature difference at the cold end of heat exchanger 440 between streams 56 and 71 preferably can be at least about 3° C., at least about 6° C., at least about 9° C., at least about 12° C., at least about 15° C., at least about 18° C., or at least about 20° C.

Returning to FIG. 5, the $CO_2$ circulating fluid 236 can be preheated prior to being recycled into the combustor 220, such as described in relation to the at least one heat exchanger 420, which receives the hot turbine discharge stream 50 after passage through the expansion turbine 320. To maximize the efficiency of the cycle, it can be useful to operate the expansion turbine 320 at as high an inlet temperature as possible consistent with the available materials of construction of the hot gas inlet path and the highly stressed turbine blades, as well as the maximum temperature allowable in the heat exchanger 420 consistent with the system operating pressures. The hot inlet path of the turbine inlet stream and the first rows of turbine blades can be cooled by any useful means. In some embodiments, efficiency can be maximized by using part of the high pressure, recycle $CO_2$ circulating fluid. Specifically, the lower temperature $CO_2$ circulating fluid (e.g., in the range of about 50° C. to about 200° C.) can be withdrawn from the cycle before the cold end of the heat exchanger 420 or from an intermediate point in the heat exchanger 420 when a series of multiple heat exchanger units is utilized (e.g., from streams 71, 72a, 71b, 72b, 73, or 74 in FIG. 8). The blade cooling fluid can be discharged from holes in the turbine blade and be input directly into the turbine flow.

Operation of a high efficiency burner, such as the transpiration cooled combustor described herein, can produce a combustion gas which is an oxidizing gas with excess oxygen concentration (such as in the range of about 0.1% to about 5% molar). Alternately, the combustor can produce a combustion gas which is a reducing gas with certain concentrations of one or more of $H_2$, $CO$, $CH_4$, $H_2S$, and $NH_3$. This is particularly beneficial in that it becomes possible according to the invention to use a power turbine with only one turbine unit or a series of turbine units (e.g., 2, 3, or more units). Beneficially, in specific embodiments using a series of units, all of the units can operate with the same inlet temperature, and this allows for maximizing power output for a given first turbine feed pressure and overall pressure ratio.

One example of a turbine unit 320 utilizing two turbines 330, 340 operated in series in the reducing mode is shown in FIG. 9. As seen therein, the combustion product stream 40 is directed to the first turbine 330. In such embodiments, the combustion product stream 40 is designed (e.g., through control of the fuel used, the amount of $O_2$ used, and the operating conditions of the combustor) to be a reducing gas with one or more combustible components therein, as described above. The combustion product stream 40 is expanded across the first turbine 330 to produce power (such as in association with an electric generator, not shown in this illustration) and form a first discharge stream 42. Prior to introduction into the second turbine 340, a predetermined amount of $O_2$ can be added to the first turbine discharge stream 42 to combust the flammable components present in the first turbine discharge stream 42. This leaves excess oxygen while raising the inlet temperature at the second turbine unit 340 to substantially the same value as the inlet temperature for the first turbine unit 330. For example, the temperature of the discharge stream 42 from the first turbine unit 330 may be in the range of about 500° C. to about 1,000° C. When in the reducing mode, the addition of the $O_2$ to the discharge stream 42 at this temperature can cause the gas in the stream to be heated by combustion of the excess fuel gas to a temperature in the range of about 700° C. to about 1,600° C., which is substantially the same temperature range as combustion product stream 40 exiting the combustion chamber 220 prior to entering the first turbine unit 330. In other words, the operating temperature at the inlet of each of the two turbines is substantially the same. In specific embodiments, the operating temperature at the inlet of the turbines differs by no more than about 10%, no more than about 9%, no more than about 8%, no more than about 7%, or no more than about 6%, no more than about 5%, no more than about 4%, no more than about 3%, no more than about 2%, or no more than about 1%. Similar re-heat steps for further turbine units also could be accomplished to the extent residual fuel remains. Combustion can be enhanced by the use of a suitable catalyst in the oxygen fed combustion space, if required.

In certain embodiment, a power cycle as described herein can be used to retrofit existing power stations, such as by introducing a high temperature, high pressure heating fluid (e.g., the turbine discharge stream described herein) into the steam superheating cycle of a conventional Rankine cycle power station. This could be a coal fired or a nuclear power station with a boiling water reactor (BWR) or pressurized water reactor (PWR) heat cycle. This effectively increases the efficiency and power output of the steam Rankine power station by superheating the steam to a far higher temperature than the maximum temperature of superheated steam produced in the existing system. In the case of a pulverized coal fired boiler, the steam temperatures are currently up to a maximum of about 600° C. while the steam conditions in a nuclear power station are generally up to about 320° C. Using the superheating possible with the heat exchange in the present inventive systems and methods, the steam temperature can be raised to over 700° C. This leads to direct conversion of heat energy to extra shaft power since the additional fuel burned to superheat the steam is converted to extra power in the steam based power station without increasing the quantity of steam condensed. This may be accomplished by providing a secondary heat exchange unit. For example, the turbine discharge stream descried in relation to the present, inventive methods and systems could be directed through the secondary heat exchange unit prior to passage through the primary heat exchange unit, as otherwise described herein. The heat obtained in the secondary heat exchange unit could be used to superheat the steam from the boiler, as described above. The superheated steam could be directed to one or more turbines to generate power. The turbine discharge stream, after passage through the secondary heat exchange unit, could then be directed to the primary heat exchange unit, as otherwise described herein. Such system and method is described in Example 2 and illustrated in FIG. 12. In addition, it is possible to take low pressure steam from the inlet of the final steam turbine and use this for heating part of the recycled $CO_2$ circulating fluid, as described above. In specific embodiments, condensate from the steam power station can be heated to an intermediate temperature prior to de-aeration using the $CO_2$ circulating fluid stream, which leaves the cold end of the heat exchanger unit (for example, at a temperature about 80° C. in some embodiments). This heating normally uses bleed steam taken from the inlet to the final LP steam turbine stage so the net effect on the steam power station efficiency of the deficit for the present side-stream heating is compensated by the preheating of condensate, which conserves bleed steam.

The above-described general method for power production (i.e., a power cycle) can be implemented according to the invention using a suitable power production system as described herein. Generally, a power production system according to the invention may comprise any of the components described herein in relation to the power production method. For example, a power production system may comprise a combustor for combusting a carbon containing fuel in the presence of $O_2$ and a $CO_2$ circulating fluid. Specifically, the combustor may be a transpiration cooled combustor, as described herein; however, other combustors capable of operating under the conditions otherwise described herein also could be used. The combustor specifically may be characterized in relation to the combustion conditions under which it operates, as well as specific components of the combustor itself. In some embodiments, the system may comprise one or more injectors for providing the carbon containing fuel (and optionally a fluidizing medium) the $O_2$, and the $CO_2$ circulating fluid. The system may include components for liquid slag removal. The combustor may produce a fuel gas at a temperature at which solid ash particles can be effectively filtered from the gas, and the gas can be mixed with quench $CO_2$ and be burned in a second combustor. The combustor can include at last one combustion stage that combusts the carbon containing fuel in the presence of the $CO_2$ circulating fluid to provide a combustion product stream comprising $CO_2$ at a pressure and temperature as described herein.

The system further may comprise a power production turbine in fluid communication with the combustor. The turbine can have an inlet for receiving the combustion product stream and an outlet for release of a turbine discharge stream comprising $CO_2$. Power can be produced as the fluid stream expands, the turbine being designed to maintain the fluid stream at a desired pressure ratio ($I_p/O_p$), as described herein.

The system further can comprise at least one heat exchanger in fluid communication with the turbine for receiving the turbine discharge stream and cooling the stream to form a cooled $CO_2$ circulating fluid stream. Likewise, the at least one heat exchanger can be used for heating the $CO_2$ circulating fluid that is input into the combustor. The heat exchanger(s) specifically may be characterized in relation to the materials from which it is constructed that allows for operation under specific conditions as described herein.

The system also can comprise one or more devices for separating the $CO_2$ circulating fluid stream exiting the heat exchanger into $CO_2$ and one or more further components for recovery or disposal. Specifically, the system may comprise means for separating water (or other impurities described herein) from the $CO_2$ circulating fluid stream.

The system further can comprise one or more devices (e.g., compressors) in fluid communication with the at least one heat exchanger (and/or in fluid communication with one or more of the separation devices) for compressing the purified $CO_2$ circulating fluid. Moreover, the system can comprise means for separating the $CO_2$ circulating fluid into two streams, one stream for passage through the heat exchanger and into the combustor and a second stream for delivery into a pressurized pipeline (or other means for sequestration and/or disposal of the $CO_2$).

In some embodiments, even further components may be included in the system. For example, the system may comprise an $O_2$ separation unit for delivery of $O_2$ into the combustor (or into an injector or similar device for mixing the $O_2$ with one or more further materials). In some embodiments, the air separation unit may generate heat. Thus, it can be useful for the system to further comprise one or more heat transfer components that transfers heat from the air separation unit to the $CO_2$ circulating fluid stream upstream from the combustor. In further embodiments, a system according to the invention may comprise any and all of the components otherwise described herein in relation the power generation cycle and the methods of generating power.

In further embodiments, the invention encompasses systems and methods particularly useful in power production using a fuel (such as coal) that leaves an incombustible residue on combustion. In certain embodiments, such incombustible materials can be removed from the combustion product stream through use of an appropriate device, such as a contaminant removal apparatus illustrated in FIG. 4. In other embodiments, however, it can be useful to manage incombustible materials though use of a multi-combustor system and method, such as illustrated in FIG. 10.

As shown in FIG. 10, the coal fuel 254 can be passed through a mill apparatus 900 to provide a powdered coal. In other embodiments, the coal fuel 254 could be provided in a particularized condition. In specific embodiments, the coal may have an average particle size of about 10 μm to about 500 μm, about 25 μm to about 400 μm, or about 50 μm to about 200 μm. In other embodiments, the coal may be described in that greater than 50%, 60%, 70%, 80%, 90%, 91%, 92%, 93%, 94%, 95%, 96%, 97%, 98%, 99%, or 99.5% of the coal particles have an average size of less than about 500 μm, 450 μm, 400 μm, 350 μm, 300 μm, 250 μm, 200 μm, 150 μm, or 100 μm. The powdered coal can be mixed with a fluidizing substance to provide the coal in the form of a slurry. In FIG. 10, the powdered coal is combined in the mixer 910 with a $CO_2$ side draw 68 from the recycled $CO_2$ circulating fluid. In FIG. 10, the $CO_2$ side draw 68 is withdrawn from stream 67, which has undergone processing to provide the $CO_2$ circulating fluid in a supercritical, high density state. In specific embodiments, the $CO_2$ used to form the coal slurry can have a density of about 450 kg/m³ to about 1,100 kg/m³. More particularly, the $CO_2$ side draw 68 may cooperate with the particulate coal to form a slurry 255 having, for example, between about 10 weight % and about 75 weight % or between about 25 weight % and about 55 weight % of the particulate coal. Moreover, the $CO_2$ from the side draw 68 used to form the slurry may be at a temperature of less than about 0° C., less than about −10° C., less than about −20° C., or less than about −30° C. In further embodiments, the $CO_2$ from the side draw 68 used to form the slurry may be at a temperature of about 0° C. to about −60° C., about −10° C. to about −50° C., or about −18° C. to about −40° C.

The powdered coal/$CO_2$ slurry 255 is transferred from the mixer 910 via pump 920 to a partial oxidation combustor 930. An $O_2$ stream is formed using an air separation unit 30 that separates air 241 into purified $O_2$, as described herein. The $O_2$ stream is split into $O_2$ stream 243, which is directed to the partial oxidation combustor 930, and $O_2$ stream 242, which is directed to the combustor 220. In the embodiment of FIG. 10, a $CO_2$ stream 86 is withdrawn from the recycled $CO_2$ circulating fluid stream 85 for use in cooling the partial oxidation combustor 930. In further embodiments, $CO_2$ for use in cooling the partial oxidation combustor 930 may be taken from stream 236 instead of stream 86 or, the $CO_2$ may be taken from both stream 86 and stream 236. Preferably, the amount of $CO_2$ withdrawn is sufficient to cool the temperature of stream 256 such that ash is present in a solid form that can be safely removed. As otherwise described herein, the $CO_2$, coal, and $O_2$ are provided to the partial oxidation combustor 930 in ratios such that the coal is only partially oxidized to produce a partially oxidized combustion product stream 256 comprising $CO_2$ along with one or more of $H_2$, CO, $CH_4$, $H_2S$, and $NH_3$. The $CO_2$, coal, and $O_2$ also are introduced into the partial oxidation combustor 930 in necessary ratios such that the temperature of the partially oxidized combustion product stream 256 is sufficiently low that all of the ash present in the stream 256 is in the form of solid particles that can be easily removed by one or more cyclone separators and/or filters. The embodiment of FIG. 10 illustrates ash removal via filter 940. In specific embodiments, the temperature of the partially oxidized combustion stream 256 can be less than about 1,100° C., less than about 1,000° C., less than about 900° C., less than about 800° C., or less than about 700° C. In further embodiments, the temperature of the partially oxidized combustion stream 256 can be about 300° C. to about 1,000° C., about 400° C. to about 950° C., or about 500° C. to about 900° C.

The filtered, partially oxidized combustion stream 257 can be directly input into the second combustor 220, which can be a transpiration cooled combustor, as otherwise described herein. This input is provided along with the $O_2$ stream 242, and the recycled $CO_2$ circulating fluid stream 236. Combustion at this point can proceed similarly as otherwise described herein. The combustible materials in the partially oxidized combustion stream 256 are combusted in combustor 220 in the presence of $O_2$ and $CO_2$ to provide the combustion stream 40. This stream is expanded across a turbine 320 to produce power (e.g., via generator 1209). The turbine discharge stream 50 is passed through a heat exchanger unit 420 (which may be a series of heat exchangers, such as described in relation to FIG. 8). The $CO_2$ circulating fluid stream 60 is passed through the cold water heat exchanger 530 to form stream 61, which is passed to separator 540 for removal of secondary components (e.g., $H_2O$, $SO_2$, $SO_4$, $NO_2$, $NO_3$, and Hg) in stream 62. The separator 540 may be substantially similar to the column 1330 described in relation to FIG. 12 below. Preferably, the separator 540 comprises a reactor that provides a contactor with sufficient residence times such that the impurities can react with water to form materials (e.g., acids) that are easily removed. The purified $CO_2$ circulating fluid stream 65 is passed through a first compressor 630 to form stream 66, which is cooled with cold water heat exchanger 640 to provide the supercritical, high density $CO_2$ circulating fluid 67. As described above, a portion of stream 67 can be withdrawn as stream 68 for use as the fluidizing medium in the mixer 910 to form the coal slurry stream 255. The supercritical, high density $CO_2$ circulating fluid stream 67 otherwise is further pressurized in compressor 650 to form the pressurized, supercritical, high density $CO_2$ circulating fluid stream 70. A portion of the $CO_2$ in stream 70 may be withdrawn at point 720, as described herein in relation to FIG. 5 and FIG. 11 to provide stream 80 to a $CO_2$ pipeline or other means of sequestration. The remaining portion of the CO2 proceeds as pressurized, supercritical, high density $CO_2$ circulating fluid stream 85, a portion of which may be withdrawn as stream 86 to use for cooling of the partial oxidation combustor 930, as described above. Otherwise, the stream 85 is passed back through the heat exchanger 420 (or series of heat exchangers, as described in relation to FIG. 8) to heat the stream and ultimately form the recycled $CO_2$ circulating fluid stream 236 for input to the combustor 220. As described above, an external heat source may be used in combination with heat exchanger unit 420 to provide the necessary efficiency. Likewise, other system and method parameters as otherwise described herein can be applied to the system and method according to FIG. 10, such as stream temperatures and pressures, as well as other operating conditions for the turbine unit 320, the heat exchanger unit 420, the separation unit 520, and the compressor unit 630.

EXPERIMENTAL

The invention is further described below in relation to specific examples. The examples are provided to illustrate certain embodiments of the invention and should not be construed as limiting of the invention.

Example 1

System and Method for Power Production with Methane Combustion Using a Recycled $CO_2$ Circulating Fluid One specific example of a system and method according to the present invention is illustrated in FIG. 11. The following description describes the system in relation to a specific cycle under specific conditions using computer modeling.

In this model, a methane ($CH_4$) fuel stream 254 at a temperature of 134° C. and a pressure of 30.5 MPa is combined with a recycled $CO_2$ circulating fluid stream 236 at a temperature of 860° C. and a pressure of 30.3 MPa (and thus in a supercritical fluid state) in a mixer 252 prior to introduction into a transpiration cooled combustor 220. An air separation unit 30 is used to provide concentrated $O_2$ 242 at a temperature of 105° C. and a pressure of 30.5 MPa. The air separation unit also produces heat (Q) that is drawn off for use in the process. The $O_2$ 242 is combined in the combustor 220 with the methane fuel stream 254 and the $CO_2$ circulating fluid 236 where combustion occurs to provide combustion product stream 40 at a temperature of 1189° C. and a pressure of 30 MPa. The $CO_2$, $O_2$, and methane are provided in a molar ratio of about 35:2:1 (i.e., lbmol/hr—pound moles per hour). Combustion in this embodiment uses energy input at a rate of 344,935 Btu/hr (363,932 kJ/hr).

The combustion product stream 40 is expanded across the turbine 320 to produce the turbine discharge stream 50 at a temperature of 885° C. and a pressure of 5 MPa (the $CO_2$ in the turbine discharge stream 50 being in a gaseous state).

Expansion of the combustion product stream 40 across the turbine 320 produces power at a rate of 83.5 kilowatts per hour (kW/hr).

The turbine discharge stream 50 is then passed through a series of three heat exchangers to successively cool the stream for removal of secondary components. Passage through the first heat exchanger 430 produces stream 52 at a temperature of 237° C. and a pressure of 5 MPa. Stream 52 is passed through the second heat exchanger 440 to produce stream 56 at a temperature of 123° C. and a pressure of 5 MPa. Stream 56 is passed through the third heat exchanger 450 to produce stream 60 at a temperature of 80° C. and a pressure of 5 MPa.

After passage of the recycle $CO_2$ circulating fluid through the series of heat exchangers, the stream 60 is even further cooled by passage through a cold water heat exchanger 530. Water (C) at a temperature of 24° C. is cycled through the cold water heat exchanger 530 to cool the $CO_2$ circulating fluid stream 60 to a temperature of 27° C. and thus condense any water present in the $CO_2$ circulating fluid stream. The cooled $CO_2$ circulating fluid stream 61 is then passed through a water separation unit 540 such that liquid water is removed and discharged as stream 62a. The "dried" $CO_2$ circulating fluid stream 65 is discharged from the water separation unit 540 at a temperature of 34° C. and a pressure of 3 MPa.

The dry $CO_2$ circulating fluid stream 65 (which is still in a gaseous state) is next passed through a first compression unit 630 in a two step pressurization scheme. The $CO_2$ circulating fluid stream is pressurized to 8 MPa, which likewise raises the temperature of the $CO_2$ circulating fluid stream to 78° C. This requires a power input of 5.22 kW/hr. This supercritical fluid $CO_2$ circulating fluid stream 66 is then passed through a second cold water heat exchanger 640 where the supercritical fluid $CO_2$ circulating fluid stream 66 is cooled with water at a temperature of 24° C. to produce a cooled supercritical fluid $CO_2$ circulating fluid stream 67 at a temperature of 27° C., a pressure of 8 MPa, and a density of 762 kg/m$^3$. This stream is then passed through a second compression unit 650 to form the pressurized $CO_2$ circulating fluid stream 70 at a temperature of 69° C. and a pressure of 30.5 MPa. This requires a power input of 8.23 kW/hr. This stream is passed through a pipeline splitter 720 whereby 1 lbmol of $CO_2$ is directed to a pressurized pipeline via stream 80, and 34.1 lbmol of $CO_2$ is directed as stream 85 back through the series of three heat exchangers to re-heat the $CO_2$ circulating fluid stream prior to entry into the combustor 220.

The pressurized $CO_2$ circulating fluid stream 85 is passed through the third heat exchanger 450 to form stream 71 at a temperature of 114° C. and a pressure of 30.5 MPa. Stream 71 is passed through splitter 460 such that 27.3 lbmol of $CO_2$ is directed as stream 71b to the second heat exchanger 440, and 6.8 lbmol of $CO_2$ is directed in stream 72a through a side heater 470. Stream 71b and stream 72a each have a temperature of 114° C. at a pressure of 30.5 MPa. The side heater 470 uses heat (Q) from the air separator unit 30 to provide additional heat to the $CO_2$ circulating fluid stream. Passage of stream 71b through the second heat exchanger 440 produces stream 73 at a temperature of 224° C. and a pressure of 30.5 MPa. Passage of stream 72a through the side heater 470 forms stream 72b which likewise is at a temperature of 224° C. and a pressure of 30.4 MPa. Streams 73 and 72b are combined in the mixer 480 to form stream 74 at a temperature of 224° C. and a pressure of 30.3 MPa. Stream 74 is then passed through the first heat exchanger 430 to provide the recycled $CO_2$ circulating fluid stream 236 at a temperature of 860° C. and a pressure of 30.0 MPa for inlet back into the combustor 220.

Efficiency for the foregoing, modeled cycle was calculated based on the energy generated in comparison to the LHV of the methane fuel and the additional energy input into the system, as described above. Under the modeled conditions, an efficiency of approximately 53.9% was achieved. This is particularly surprising in that such an excellent efficiency can be achieved while simultaneously preventing atmospheric discharge of any $CO_2$ (particularly any $CO_2$ arising from combustion of the carbon containing fuel).

Example 2

System and Method for Power Production with a Pulverized Coal Power Station Retrofit to Use a Recycled $CO_2$ Circulating Fluid Another specific example of a system and method according to the present invention is illustrated in FIG. 12. The following description describes the system in relation to a specific cycle under specific conditions using mathematical modeling.

In this model, the ability to retrofit a system and method as described herein to a conventional pulverized coal fired power station is illustrated.

An $O_2$ stream 1056 at a pressure 30.5 MPa is introduced into a transpiration cooled combustor 220 along with a carbon containing fuel 1055 (e.g., coal-derived gas produced by partial oxidation) at a pressure of 30.5 MPa and a $CO_2$ circulating fluid stream 1053 at a pressure of 30.5 MPa. The $O_2$ may be received from an air separator or similar device that can produce heat (Q), which can be drawn off for use in the system, such as to produce steam for expansion or to add heat to a cooled $CO_2$ circulating fluid stream. Combustion of the fuel in the combustor 220 produces a combustion product stream 1054 at a temperature of 1,150° C. and a pressure of 30.0 MPa. This stream is expanded across a turbine 320 (which may generally be referred to as a primary power production turbine) to produce power by driving an electric generator 1209. The expansion turbine discharge stream 1001 at a temperature of 775° C. and a pressure of about 3.0 MPa is introduced into the hot end of a heat exchanger 1100 where the heat from the turbine discharge stream 1001 is used to superheat the high pressure steam flow 1031 and the intermediate pressure steam flow 1032 produced in a conventional pulverized coal fired power station 1800. Boiler feed water 1810 and coal 1810 are input to the power station 1800 to produce the steam flows 1031 and 1032 by combustion of the coal 1810. The transfer of heat in the heat exchanger superheats the steam flows 1031 and 1032 from a temperature of about 550° C. to a temperature of about 750° C. to form the steam flows 1033 and 1034, which are returned to the power station as described below. This method achieves very high steam temperatures without the need for expensive high temperature alloys to be used in the large steam boilers of a conventional power station burning coal at near atmospheric pressure. The steam flows 1033 and 1034 are expanded in a three stage turbine 1200 (which may generally be referred to as a secondary power production turbine) driving an electric generator 1210. The steam 1035 exiting the turbine 1200 is condensed in a condenser 1220. Treated condensate 1036 is pumped to high pressure in with a feed water pump 1230 and then is vaporized and superheated in the coal fired boiler 1800 for discharge into the heat exchanger 1100, as described above. This system is used to increase the power output and efficiency of an existing coal fired power station.

The heat exchanger 100 is a Heatric type diffusion bonded plate heat exchanger with chemically milled passages typically constructed with a high temperature, high nickel content alloy, such as 617 alloy, which is capable of handling high pressures and temperatures allowing significant steam superheat and operation under oxidizing conditions. This heat exchanger is a high efficiency heat transfer unit with high heat transfer coefficients for all fluids.

The remaining portion of the system and method illustrated in FIG. 12 is similar in structure and operation to the systems and methods otherwise described herein. Specifically, the expansion turbine discharge stream 1001 is cooled in the heat exchanger 1100 and leaves the cool end of the heat exchanger 1100 as discharge stream 1037, which is at a temperature of 575° C. This stream 1037 is then passed through a second heat exchanger 1300 where it is cooled to a temperature of 90° C. and a pressure of 2.9 MPa to from stream 1038. This stream is further cooled against a portion of the condensate 1057 from the power station condenser 1230 in a third heat exchanger 1310 to a temperature of 40° C. to form stream 1039, which is further cooled to a temperature of 27° C. against cooling water in a cold water heat exchanger 1320 to form stream 1040 at a pressure of 2.87 MPa. The heat exchanger 1300 can be a Heatric 310 stainless steel diffusion bonded unit.

The cooled stream 1040 at 30° C. is fed into the base of a packed column 1330, which is equipped with a circulation pump 1340 that provides a counter-current weak acid circulation stream giving counter-current contacting between the incoming gas and the scrubbing weak acid. The $SO_2$, $SO_3$, NO, and $NO_2$ are converted to $HNO_3$ and $H_2SO_4$ and absorbed in the liquid together with condensed water and any other water soluble components. The net liquid product from the column 1330 is removed in line 1042, and the pressure is reduced to atmospheric pressure and enters a separator 1360. Dissolved $CO_2$ flashes off in line 1043, is compressed using a pump 1350 to a pressure of 2.85 MPa, and flows as stream 1044 to join with stream 1045 leaving the top of column 1330. These combined streams form the $CO_2$ circulating fluid that will be recycled back into the combustor. Dilute $H_2SO_4$ and $HNO_3$ in water leaves as stream 1046 from the base of the separator 1360. The concentrations depend on the fuel composition and the temperature in the contactor column 1330. Note that nitric acid preferably is present in the acid stream 1046, as nitric acid will react with any mercury present and remove this impurity completely.

The recycled $CO_2$ circulating fluid stream entering the compressor 1380 is first dried to a dew point of about –60° C. in a desiccant dryer and then purified to remove $O_2$, $N_2$, and Ar using a low temperature separation scheme, such as shown in European patent application EP1952874 A1, which is incorporated herein by reference.

The compressed, recycled $CO_2$ circulating fluid stream 1047 leaving compressor 1380 at a pressure of 8.5 MPa is cooled against cooling water at 27° C. in a cold water heat exchanger 1370 forming dense, supercritical $CO_2$ fluid stream 1048, which is pumped to a pressure of 30.5 MPa and a temperature of 74° C. in the pump 1390 to form the high pressure, recycled $CO_2$ circulating fluid stream 1050. A portion of the $CO_2$ is removed from the stream 1050 as a $CO_2$ product stream 1049 to be sequestered or otherwise disposed of without discharge to the atmosphere. In this embodiment, the $CO_2$ product stream 1049 is reduced in pressure to the required pipeline pressure of about 20 MPa and passed into a $CO_2$ pipeline.

The remaining portion of the high pressure, recycled $CO_2$ circulating fluid stream (now stream 1051) enters the cold end of the heat exchanger 1300. This stream, which is a dense supercritical fluid at 74° C., must receive a considerable amount of low grade heat to convert it to a fluid with a much lower specific heat at a temperature of 237° C. In this embodiment, such low grade heat is provided by an LP steam stream 1052 at a pressure of 0.65 MPa taken from the steam stream entering the low pressure steam turbine of the conventional power station together with adiabatic heat of compression derived from the air compressors in the cryogenic oxygen plant supplying the $O_2$ stream 1056. The low pressure steam exits the heat exchanger 1300 as stream 1301. Optionally, all of the heat can be provided by using a number of available steam streams from the coal fired power station at pressures up to 3.8 MPa. This energy also could be provided from the heat (Q) formed by the air separation unit, as described above. The side stream heating of part of the recycle $CO_2$ stream provides a large part of the heat required at the cold end of the heat exchanger 1300 and allows a small temperature difference of only about 25° C. at the hot end of the heat exchanger 1300, which increases overall efficiency.

The high pressure, high temperature, recycled $CO_2$ circulating fluid stream 1053 leaves the heat exchanger 1300 at a temperature of 550° C. and enters the combustor 220, where it is used to cool the combustion gases derived from combustion of a natural gas stream 1055 (in this embodiment) with the 97% molar oxygen stream 1056 to produce the combustion product stream 1054, as described above. In this embodiment, the turbine hot path and the first rows of turbine blades are cooled using a $CO_2$ stream 1058 taken from the pump discharge stream 1050 at a temperature of 74° C.

If the system described above is operated as a stand alone power station with natural gas fuel simulated by pure $CH_4$, then the recycle $CO_2$ stream 1053 enters the combustor at a temperature of about 750° C. and the turbine exhaust 1001 enters the heat exchanger 1300 at a temperature of about 775° C.

The efficiency of the stand alone power system in this embodiment is 53.9% (LHV). This figure includes the power consumption for the cryogenic $O_2$ plant and the natural gas feed and $CO_2$ compressors. If the fuel was a simulated coal with a heating value of 27.92 Mj/kg (e.g., partially oxidized with ash removed in a first combustor and filtration unit followed by the combustion of the fuel gas and $CO_2$ mixture in a second combustor), then the efficiency would be 54% (LHV). In both cases virtually 100% of the $CO_2$ derived from carbon in the fuel would be produced at 20 MPa pipeline pressure.

The system and method described above and illustrated in FIG. 12 with coal fuel can be characterized as being applied to a power station with specific parameters described below. The effect of converting a pulverized coal fired power station according to the present invention is calculated as follows:

| Steam conditions | HP steam: | 16.6 MPa, 565° C., flow: 473 14 kg/sec |
|---|---|---|
| | LP steam: | 4.02 MPa, 565° C., flow: 371.62 kg/sec |
| | Net power output: | 493.7. Mw |
| | Coal for existing station: | 1256.1 Mw |
| | Efficiency (LHV) net: | 39.31% |
| | $CO_2$ capture %: | 0 |

Converted plant with existing station upgrade incorporating a presently disclosed system and method:

| $CO_2$ power system net power output: | 371.7 Mw |
|---|---|
| Existing station net power: | 639.1 Mw |
| Total net power: | 1010.8 Mw |
| Coal for $CO_2$ power system: | 1053.6 Mw |

-continued

| | |
|---|---|
| Coal for existing station: | 1256.1 Mw |
| Overall efficiency (LHV) net: | 43.76% |
| $CO_2$ capture %: | 45.6%* |

*Note that no $CO_2$ is captured from the existing station in this example.

Many modifications and other embodiments of the invention will come to mind to one skilled in the art to which this invention pertains having the benefit of the teachings presented in the foregoing descriptions and associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of power generation comprising:
 introducing a fuel, $O_2$, and a $CO_2$ circulating fluid into a combustor, the $CO_2$ being introduced at a pressure of at least about 12 MPa and a temperature of at least about 400° C.;
 combusting the fuel to provide a combustion product stream comprising $CO_2$, the combustion product stream having a temperature of at least about 800° C.;
 expanding the combustion product stream across a turbine to generate power, the turbine having an inlet for receiving the combustion product stream and an outlet for release of a turbine discharge stream comprising $CO_2$, wherein the pressure ratio of the combustion product stream at the inlet compared to the turbine discharge stream at the outlet is less than about 12;
 withdrawing heat from the turbine discharge stream by passing the turbine discharge stream through a primary heat exchange unit to provide a cooled turbine discharge stream;
 removing from the cooled turbine discharge stream one or more secondary components that are present in the cooled turbine discharge stream in addition to $CO_2$ to provide a purified, cooled turbine discharge stream;
 compressing the purified, cooled turbine discharge stream with a first compressor to a pressure above the $CO_2$ critical pressure to provide a supercritical $CO_2$ circulating fluid stream;
 cooling the supercritical $CO_2$ circulating fluid stream to a temperature where its density is at least about 200 kg/m$^3$;
 passing the supercritical, high density $CO_2$ circulating fluid through a second compressor to pressurize the $CO_2$ circulating fluid to the pressure required for input to the combustor;
 passing the supercritical, high density, high pressure $CO_2$ circulating fluid through the same primary heat exchange unit such that the withdrawn heat from the turbine discharge stream is used to increase the temperature of the $CO_2$ circulating fluid;
 supplying an additional quantity of heat from a source other than withdrawn heat from the turbine discharge stream to all or a portion of the supercritical, high density, high pressure $CO_2$ circulating fluid one or more of prior to, during, or after passing through the primary heat exchange unit; and
 recycling the heated, supercritical, high density $CO_2$ circulating fluid into the combustor;
 wherein the temperature of the heated, supercritical, high density $CO_2$ circulating fluid entering the combustor is less than the temperature of the turbine discharge stream by no more than about 50° C.

2. The method of claim 1, wherein said withdrawing step cools the turbine discharge stream to a temperature below its water dew point.

3. The method of claim 1, wherein said removing step comprises further cooling the turbine discharge stream against an ambient temperature cooling medium.

4. The method of claim 3, wherein said further cooling condenses water together with the one or more secondary components to form a solution comprising one or more of $H_2SO_4$, $HNO_3$, HCl, and mercury.

5. The method of claim 1, wherein said compressing with the first compressor pressurizes the cooled turbine discharge stream to a pressure of less than about 12 MPa.

6. The method of claim 1, wherein a product $CO_2$ stream is withdrawn from the supercritical, high density, high pressure $CO_2$ circulating fluid stream prior to passing through the primary heat exchange unit.

7. The method of claim 6, wherein the product $CO_2$ stream comprises substantially all of the $CO_2$ formed by combustion of the carbon in the carbon containing fuel.

8. The method of claim 6, wherein the product $CO_2$ stream is at a pressure compatible with direct input into a high pressure $CO_2$ pipeline.

9. The method of claim 1, wherein said combusting is carried out at a temperature of at least about 1,200° C.

10. The method of claim 1, wherein the fuel comprises a stream of partial combustion products.

11. The method of claim 10, comprising combusting a carbon containing fuel with $O_2$ in the presence of a $CO_2$ circulating fluid, the carbon containing fuel, $O_2$, and $CO_2$ circulating fluid being provided in ratios such that the carbon containing fuel is only partially oxidized to produce the partially oxidized combustion product stream comprising an incombustible component, $CO_2$, and one or more of $H_2$, CO, $CH_4$, $H_2S$, and $NH_3$.

12. The method of claim 11, wherein the carbon containing fuel, $O_2$, and $CO_2$ circulating fluid being provided in ratios such that the temperature of the partially oxidized combustion product stream is sufficiently low that all of the incombustible component in the stream is in the form of solid particles.

13. The method of claim 12, wherein the temperature of the partially oxidized combustion product stream is about 500° C. to about 900° C.

14. The method of claim 12, further comprising passing the partially oxidized combustion product stream through one or more filters.

15. The method of clam 14, wherein the filter reduces the residual amount of incombustible component to less than about 2 mg/m$^3$ of the partially oxidized combustion product.

16. The method of claim 11, wherein the fuel comprises coal, lignite, or petroleum coke.

17. The method of claim 16, wherein the fuel is in a particulate form and is provided as a slurry with $CO_2$.

18. The method of claim 17, wherein particulate fuel is such that greater than 90% of the particles have an average size of less than about 500 μm.

19. The method of claim 18, wherein greater than 99% of the particles have an average size of less than about 100 μm.

20. The method of claim 1, wherein the $CO_2$ circulating fluid is introduced at a pressure of at least about 15 MPa.

21. The method of claim 1, wherein the $CO_2$ circulating fluid is introduced at a pressure of at least about 20 MPa.

22. The method of claim 1, wherein the $CO_2$ circulating fluid is introduced at a temperature of at least about 600° C.

23. The method of claim 1, wherein the $CO_2$ circulating fluid is introduced at a temperature of at least about 700° C.

24. The method of claim 1, wherein the combustion product stream has a temperature of at least about 1,000° C.

25. The method of claim 1, wherein the combustion product stream has a pressure that is at least about 90% of the pressure of the $CO_2$ introduced into the combustor.

26. The method of claim 25, wherein the combustion product stream pressure is at least about 95% of the pressure of the $CO_2$ introduced into the combustor.

27. The method of claim 1, wherein the pressure ratio of the combustion product stream at the inlet compared to the turbine discharge stream at the outlet is about 1.5 to about 10.

28. The method of claim 27, wherein the pressure ratio of the combustion product stream at the inlet compared to the turbine discharge stream at the outlet is about 2 to about 8.

29. The method of claim 1, wherein the fuel is a carbon containing fuel, and wherein the ratio of $CO_2$ in the $CO_2$ circulating fluid to the carbon containing fuel introduced to the combustor, on a molar basis, is about 10 to about 50.

30. The method of claim 29, wherein the ratio of $CO_2$ in the $CO_2$ circulation fluid to $O_2$ introduced to the combustor, on a molar basis, is about 10 to about 30.

31. The method of claim 1, wherein the $CO_2$ in the turbine discharge stream is in a gaseous state.

32. The method of claim 31, wherein the turbine discharge stream has a pressure of less than or equal to 7 MPa.

33. The method of claim 1, wherein the primary heat exchange unit comprises a series of at least three heat exchangers.

34. The method of claim 33, wherein the first heat exchanger in the series receives the turbine discharge stream and reduces the temperature thereof, the first heat exchanger being formed of a high temperature alloy that withstands a temperature of at least about 700° C.

35. The method of claim 33, wherein the step of withdrawing heat comprises passing the turbine discharge stream sequentially through a first heat exchanger, a second heat exchanger, and a third heat exchanger, and wherein the method comprises increasing the temperature of the supercritical, high density, high pressure $CO_2$ circulating fluid by passing the fluid through the third heat exchanger to form a first heated stream, splitting the first heated stream into a second heated stream and a third heated stream, passing the second heated stream through the second heat exchanger to form a fourth heated stream, passing the third heated stream through a side heater to supply the additional quantity of heat and form a fifth heated stream, combining the fourth and fifth heated streams from the second heat exchanger and the side heater to form a sixth heated stream, and passing the sixth heated stream through the first heat exchanger to provide the supercritical, high density, high pressure $CO_2$ circulating fluid.

36. The method of claim 35, wherein the molar ratio of $CO_2$ in the second heated stream passed through the second heat exchanger and the third heated stream passed through the side heater is about 1:2 to about 20:1.

37. The method of claim 35, wherein the molar ratio of $CO_2$ in the second heated stream passed through the second heat exchanger and the third heated stream passed through the side heater is about 2:1 to about 16:1.

38. The method of claim 35, wherein the molar ratio of $CO_2$ in the second heated stream passed through the second heat exchanger and the third heated stream passed through the side heater is about 2:1 to about 8:1.

39. The method of claim 35, wherein the side heater comprises an air separation unit.

40. The method of claim 39, wherein the side heater comprises a cryogenic air separation unit with two compressors, both of which are operated adiabatically with no inter-stage cooling.

41. The method of claim 39, wherein the side heater comprises a cryogenic air separation unit with two compressors, both of which are operated adiabatically, and wherein the method comprises removing the heat of compression in aftercoolers against a circulating heat transfer fluid which transfers the heat of compression.

42. The method of claim 35, wherein amount of heat imparted by the side heater increases the temperature of the third heated stream by at least about 10° C.

43. The method of claim 35, wherein amount of heat imparted by the side heater increases the temperature of the third heated stream by at least about 20° C.

44. The method of claim 1, wherein the supercritical, high density $CO_2$ circulating fluid stream after passage through the second compressor has a pressure of at least about 15 MPa.

45. The method of claim 44, wherein the supercritical, high density $CO_2$ circulating fluid stream after passage through the second compressor has a pressure of at least about 25 MPa.

46. The method of claim 1, wherein the supercritical $CO_2$ circulating fluid stream is cooled to a temperature where its density is at least about 400 kg/m$^3$.

47. The method of claim 1, wherein said additional quantity of heat comprises heat withdrawn from an $O_2$ separation unit.

48. The method of claim 1, wherein the $O_2$ is provided in an amount such that part of the fuel is oxidized to oxidation products comprising one or more of $CO_2$, $H_2O$, and $SO_2$, and the remaining part of the fuel is oxidized to one or more combustible components selected from the group consisting of $H_2$, CO, $CH_4$, $H_2S$, $NH_3$, and combinations thereof.

49. The method of claim 48, wherein the turbine comprises two units each having an inlet and an outlet, and wherein the operating temperature at the inlet of each unit is substantially the same.

50. The method of claim 49, comprising adding an amount of $O_2$ to the fluid stream at the outlet of the first turbine unit.

51. The method of claim 1, wherein the turbine discharge stream is an oxidizing fluid comprising an excess amount of $O_2$.

52. The method of claim 1, wherein the $CO_2$ circulating fluid is introduced to the combustor as a mixture with one or both of the $O_2$ and the fuel.

53. The method of claim 1, wherein the combustor comprises a transpiration cooled combustor.

54. The method of claim 53, wherein the $CO_2$ circulating fluid is introduced to the transpiration cooled combustor as all or part of a transpiration cooling fluid directed through one or more transpiration fluid supply passages formed in the transpiration cooled combustor.

55. The method of claim 53, wherein said combusting is carried out at a temperature of at least about 1,300° C.

56. The method of claim 53, wherein said combusting is carried out at a temperature of at least about 1,200° C.

57. The method of claim 1, wherein the $O_2$ is provided as a stream wherein the molar concentration of the $O_2$ is at least 85%.

58. The method of claim 57, wherein the molar concentration of the $O_2$ is about 85% to about 99.8%.

59. The method of claim 1, wherein the turbine discharge stream is passed directly into the primary heat exchanger unit without passage through a further combustor.

60. The method of claim 1, wherein the efficiency of the combustion is greater than 50%, said efficiency being calculated as the ratio of the net power generated in relation to the total lower heating value thermal energy of the carbon containing fuel combusted to generate the power.

61. The method of claim 1, further comprising, between said combusting step and said expanding step, passing the combustion product stream through at least one apparatus for removing contaminants in a solid or liquid state.

62. The method of claim 1, further comprising, between said expanding step and said withdrawing step, passing the turbine discharge stream through a secondary heat exchange unit.

63. The method of claim 62, wherein said secondary heat exchange unit uses heat from the turbine discharge stream to heat one or more streams derived from a steam power system.

64. The method of claim 63, wherein the steam power system comprises a conventional boiler system.

65. The method of claim 64, wherein the conventional boiler system comprises a coal fired power station.

66. The method of claim 63, wherein the steam power system comprises a nuclear reactor.

67. The method of claim 63, wherein the one or more heated steam streams are passed through one or more turbines to generate power.

68. The method of claim 1, wherein the additional heat is provided directly to the $CO_2$ circulating fluid after passage through the second compressor but prior to passage through the primary heat exchanger.

69. The method of claim 1, wherein the additional heat is provided directly to the heat exchanger.

70. The method of claim 1, primary heat exchange unit comprises a series of at least three heat exchangers, and wherein the additional heat is provided by heating a sidestream comprising a portion of the $CO_2$ circulating fluid, the side stream being present between two of the heat exchangers.

71. A method of power generation comprising:

combusting a fuel in the presence of $O_2$ and a $CO_2$ circulating fluid in a combustor, the $CO_2$ being introduced at a pressure of at least about 12 MPa and a temperature of at least about 400° C., to provide a combustion product stream comprising $CO_2$ and having a temperature of at least about 800° C.;

expanding the combustion product stream across a turbine to generate power and provide a turbine discharge stream comprising $CO_2$, wherein the pressure ratio of the combustion product stream to the turbine discharge stream is less than about 12;

passing the turbine discharge stream through a heat exchanger unit to provide a cooled discharge stream;

removing from the cooled turbine discharge stream one or more secondary components other than $CO_2$ to provide a purified discharge stream;

compressing the purified discharge stream to provide a supercritical $CO_2$ circulating fluid stream;

cooling the supercritical $CO_2$ circulating fluid stream to provide a high density $CO_2$ circulating fluid with a density of at least about 200 kg/m$^3$;

pumping the high density $CO_2$ circulating fluid to a pressure suitable for input to the combustor;

heating the pressurized $CO_2$ circulating fluid by passing through the heat exchanger unit using heat recuperated from the turbine discharge stream;

further heating all or a potion of the pressurized $CO_2$ circulating fluid with heat that is not withdrawn from the turbine discharge stream, the further heating being one or more of prior to, during, or after passing through the heat exchanger; and recycling the heated, pressurized $CO_2$ circulating fluid into the combustor;

wherein the temperature of the heated, pressurized $CO_2$ circulating fluid entering the combustor is less than the temperature of the turbine discharge stream by no more than about 50° C.

72. A method of power generation comprising:

combusting a fuel in the presence of $O_2$ and a $CO_2$ circulating fluid in a combustor, the $CO_2$ being introduced at a pressure of at least about 12 MPa and a temperature of at least about 400° C., to provide a combustion product stream comprising $CO_2$ and having a temperature of at least about 800° C.;

expanding the combustion product stream across a turbine to generate power and provide a turbine discharge stream comprising $CO_2$, wherein the pressure ratio of the combustion product stream to the turbine discharge stream is less than about 12;

passing the turbine discharge stream through a heat exchanger unit to provide a cooled discharge stream;

removing from the cooled turbine discharge stream one or more secondary components other than $CO_2$ to provide a purified discharge stream;

compressing the purified discharge stream to provide a supercritical $CO_2$ circulating fluid stream;

cooling the supercritical $CO_2$ circulating fluid stream to provide a high density $CO_2$ circulating fluid with a density of at least about 200 kg/m$^3$;

pumping the high density $CO_2$ circulating fluid to a pressure suitable for input to the combustor;

heating the pressurized $CO_2$ circulating fluid by passing through the heat exchanger unit using heat recuperated from the turbine discharge stream;

further heating all or a potion of the pressurized $CO_2$ circulating fluid with heat formed by an air separation unit, the further heating being one or more of prior to, during, or after passing through the heat exchanger; and recycling the heated, pressurized $CO_2$ circulating fluid into the combustor;

wherein the temperature of the heated, pressurized $CO_2$ circulating fluid entering the combustor is less than the temperature of the turbine discharge stream by no more than about 50° C.

* * * * *